US010667981B2

(12) United States Patent
Osterhout et al.

(10) Patent No.: US 10,667,981 B2
(45) Date of Patent: Jun. 2, 2020

(54) READING ASSISTANCE SYSTEM FOR VISUALLY IMPAIRED

(71) Applicant: Mentor Acquisition One, LLC, Plantation, FL (US)

(72) Inventors: Ralph F. Osterhout, San Francisco, CA (US); John N. Border, Eaton, NH (US); John D. Haddick, Mill Valley, CA (US); Ed Riehle, San Francisco, CA (US)

(73) Assignee: Mentor Acquisition One, LLC, Plantation, FL (US)

( * ) Notice: Subject to any disclaimer, the term of this patent is extended or adjusted under 35 U.S.C. 154(b) by 0 days.

(21) Appl. No.: 15/056,573

(22) Filed: Feb. 29, 2016

(65) Prior Publication Data

US 2017/0248788 A1   Aug. 31, 2017

(51) Int. Cl.
*G09B 21/00* (2006.01)
*G02B 27/01* (2006.01)
(Continued)

(52) U.S. Cl.
CPC .............. *A61H 3/061* (2013.01); *G02B 7/023* (2013.01); *G02B 27/0172* (2013.01); *G02B 27/0176* (2013.01); *G06F 3/011* (2013.01); *G06F 3/012* (2013.01); *G06F 3/013* (2013.01); *G06F 3/04815* (2013.01); *G06K 9/00604* (2013.01); *G06K 9/00671* (2013.01); *G06K 9/2081* (2013.01); *G06K 9/3258* (2013.01); *G06T 3/40* (2013.01); *G06T 5/003* (2013.01); *G06T 5/009* (2013.01); *G06T 11/60* (2013.01); *G09B 21/008* (2013.01); *H04N 5/23264* (2013.01); *H04N 5/23293* (2013.01); *H04N 5/23296* (2013.01); *H04N 7/183* (2013.01); *H04N 7/185* (2013.01); *A61H 2003/063* (2013.01); *A61H 2201/0188* (2013.01); *A61H 2201/1604* (2013.01); *A61H 2201/165* (2013.01); *A61H 2201/501* (2013.01); *A61H 2201/5043* (2013.01); *A61H 2201/5048* (2013.01); *A61H 2201/5058* (2013.01);
(Continued)

(58) Field of Classification Search
CPC .......... G02B 27/017; G02B 2027/0178; G02B 2027/0138; G02B 27/0172; G02B 27/0093; G02B 27/0101; G02B 27/0149; G02B 7/023; G06T 19/006; G06T 11/60; G06T 2207/30176; A61H 3/061
See application file for complete search history.

(56) References Cited

U.S. PATENT DOCUMENTS 1,897,833 A   2/1933   Benway
4,788,535 A   11/1988  Chikara et al.
(Continued)

FOREIGN PATENT DOCUMENTS

EP   368898 A1   5/1990
EP   777867 A1   6/1997
(Continued)

OTHER PUBLICATIONS

US 8,743,465 B2, 06/2014, Totani et al. (withdrawn)
(Continued)

*Primary Examiner* — Obafemi O Sosanya
(74) *Attorney, Agent, or Firm* — Morrison & Foerster LLP

(57) ABSTRACT

Aspects of the present disclosure relate aids for the visually impaired.

22 Claims, 57 Drawing Sheets

(51) Int. Cl.

| | | |
|---|---|---|
| G06F 3/01 | (2006.01) | |
| G06T 11/60 | (2006.01) | |
| H04N 5/232 | (2006.01) | |
| G02B 7/02 | (2006.01) | |
| G06T 3/40 | (2006.01) | |
| A61H 3/06 | (2006.01) | |
| H04N 7/18 | (2006.01) | |
| G06K 9/00 | (2006.01) | |
| G06F 3/0481 | (2013.01) | |
| G06T 5/00 | (2006.01) | |
| G06K 9/20 | (2006.01) | |
| G06K 9/32 | (2006.01) | |

(52) U.S. Cl.
CPC ............ *A61H 2201/5061* (2013.01); *A61H 2201/5064* (2013.01); *A61H 2201/5071* (2013.01); *A61H 2201/5082* (2013.01); *A61H 2201/5084* (2013.01); *A61H 2201/5092* (2013.01); *G02B 2027/014* (2013.01); *G02B 2027/0127* (2013.01); *G02B 2027/0138* (2013.01); *G02B 2027/0147* (2013.01); *G02B 2027/0156* (2013.01); *G02B 2027/0178* (2013.01); *G06T 2207/20208* (2013.01); *G06T 2207/20221* (2013.01)

(56) References Cited

U.S. PATENT DOCUMENTS

| | | |
|---|---|---|
| D327,674 S | 7/1992 | Kuo |
| 5,579,026 A | 11/1996 | Tabata |
| D376,790 S | 12/1996 | Goulet et al. |
| 5,596,451 A | 1/1997 | Handschy et al. |
| 5,717,422 A | 2/1998 | Fergason et al. |
| 5,808,800 A | 9/1998 | Handschy et al. |
| 5,818,381 A | 10/1998 | Williams |
| 6,028,608 A | 2/2000 | Jenkins |
| 6,195,136 B1 | 2/2001 | Handschy et al. |
| 6,198,395 B1 | 3/2001 | Sussman |
| 6,359,723 B1 | 3/2002 | Handschy et al. |
| 6,369,952 B1 | 4/2002 | Rallison et al. |
| 6,392,656 B1 | 5/2002 | Someya et al. |
| D470,144 S | 2/2003 | Li |
| 6,535,182 B2 | 3/2003 | Stanton |
| D473,871 S | 4/2003 | Santos |
| 6,549,231 B1 | 4/2003 | Matsui |
| 6,675,030 B2 | 1/2004 | Ciurczak et al. |
| 6,847,336 B1 | 1/2005 | Lemelson et al. |
| 6,972,771 B2 | 12/2005 | Nakano et al. |
| 6,987,787 B1 | 1/2006 | Mick |
| 7,088,234 B2 | 8/2006 | Naito et al. |
| D541,226 S | 4/2007 | Wakisaka et al. |
| 7,199,934 B2 | 4/2007 | Yamasaki |
| 7,206,134 B2 | 4/2007 | Weissman et al. |
| D571,816 S | 6/2008 | Corcoran et al. |
| 7,735,230 B2 | 6/2010 | Barany |
| 7,777,723 B2 | 8/2010 | Namiki et al. |
| 7,812,842 B2 | 10/2010 | Gordon et al. |
| 7,830,370 B2 | 11/2010 | Yamazaki et al. |
| 7,855,743 B2 | 12/2010 | Sako et al. |
| D631,881 S | 2/2011 | Quinn et al. |
| D631,882 S | 2/2011 | Odgers |
| 7,928,926 B2 | 4/2011 | Yamamoto et al. |
| 8,004,765 B2 | 8/2011 | Amitai |
| 8,014,666 B2 | 9/2011 | Neiman |
| 8,018,579 B1 | 9/2011 | Krah et al. |
| 8,166,421 B2 | 4/2012 | Magal et al. |
| 8,228,315 B1 | 7/2012 | Starner et al. |
| 8,378,924 B2 | 2/2013 | Jacobsen et al. |
| D680,112 S | 4/2013 | Monahan |
| 8,427,396 B1 | 4/2013 | Kim |
| 8,473,241 B2 | 6/2013 | Foxlin |
| 8,494,215 B2 | 7/2013 | Kimchi et al. |
| D689,862 S | 9/2013 | Liu |
| D690,684 S | 10/2013 | Lee et al. |
| 8,564,883 B2 | 10/2013 | Totani et al. |
| 8,570,273 B1 | 10/2013 | Smith |
| 8,576,276 B2 | 11/2013 | Bar-Zeev et al. |
| 8,576,491 B2 | 11/2013 | Takagi et al. |
| 8,587,869 B2 | 11/2013 | Totani et al. |
| 8,594,467 B2 | 11/2013 | Lu et al. |
| 8,662,686 B2 | 3/2014 | Takagi et al. |
| 8,670,183 B2 | 3/2014 | Clavin et al. |
| 8,681,073 B1 | 3/2014 | Robbins et al. |
| 8,698,157 B2 | 4/2014 | Hanamura |
| 8,711,487 B2 | 4/2014 | Takeda et al. |
| 8,743,052 B1 | 6/2014 | Keller et al. |
| 8,745,058 B1 | 6/2014 | Garcia-Barrio |
| 8,750,541 B1 | 6/2014 | Dong et al. |
| 8,752,963 B2 | 6/2014 | McCulloch et al. |
| 8,787,006 B2 | 7/2014 | Golko et al. |
| 8,803,867 B2 | 8/2014 | Oikawa |
| 8,823,071 B2 | 9/2014 | Oyamada |
| 8,832,557 B2 | 9/2014 | Tang et al. |
| 8,837,880 B2 | 9/2014 | Takeda et al. |
| D716,813 S | 11/2014 | Deng |
| 8,922,530 B2 | 12/2014 | Pance |
| 8,947,323 B1 | 2/2015 | Geiss et al. |
| 8,948,935 B1 | 2/2015 | Peeters et al. |
| 8,970,495 B1 | 3/2015 | Weaver et al. |
| 8,982,471 B1 | 3/2015 | Starner et al. |
| D728,573 S | 5/2015 | Deng |
| 9,129,157 B2 | 9/2015 | Chao et al. |
| 9,213,403 B1* | 12/2015 | Raffle .................... G06F 3/011 |
| 9,229,233 B2 | 1/2016 | Osterhout et al. |
| 9,229,234 B2 | 1/2016 | Osterhout |
| 9,230,501 B1 | 1/2016 | Starner et al. |
| 9,235,051 B2 | 1/2016 | Salter et al. |
| 9,286,728 B2 | 3/2016 | Osterhout et al. |
| 9,294,660 B2 | 3/2016 | O'Neill et al. |
| 9,423,612 B2 | 8/2016 | Border et al. |
| 9,529,192 B2* | 12/2016 | Border ............... G02B 27/0093 |
| 9,746,686 B2 | 8/2017 | Haddick |
| 9,784,973 B2 | 10/2017 | Osterhout et al. |
| 9,841,602 B2 | 12/2017 | Osterhout et al. |
| 9,852,545 B2 | 12/2017 | Osterhout et al. |
| 2001/0050817 A1 | 12/2001 | Travers et al. |
| 2002/0021498 A1 | 2/2002 | Ohtaka et al. |
| 2002/0044152 A1 | 4/2002 | Abbott |
| 2002/0057280 A1 | 5/2002 | Anabuki et al. |
| 2002/0126396 A1 | 9/2002 | Dolgoff et al. |
| 2002/0181115 A1 | 12/2002 | Massof et al. |
| 2004/0008177 A1 | 1/2004 | Ahn et al. |
| 2004/0030448 A1 | 2/2004 | Solomon |
| 2004/0101178 A1 | 5/2004 | Fedorovskaya et al. |
| 2004/0150631 A1 | 8/2004 | Fleck et al. |
| 2005/0052613 A1 | 3/2005 | Kidouchim |
| 2006/0022993 A1 | 2/2006 | Hammond et al. |
| 2006/0072820 A1 | 4/2006 | Porjo et al. |
| 2006/0132457 A1 | 6/2006 | Rimas-Ribikauskas et al. |
| 2006/0183986 A1 | 8/2006 | Rice et al. |
| 2007/0030243 A1 | 2/2007 | Ishii et al. |
| 2007/0035563 A1 | 2/2007 | Biocca et al. |
| 2007/0058868 A1 | 3/2007 | Seino et al. |
| 2007/0109284 A1 | 5/2007 | Yamazaki et al. |
| 2008/0005702 A1 | 1/2008 | Skourup et al. |
| 2008/0036653 A1 | 2/2008 | Huston et al. |
| 2008/0036875 A1 | 2/2008 | Jones |
| 2008/0071559 A1 | 3/2008 | Arrasvuori |
| 2008/0219025 A1 | 9/2008 | Spitzer et al. |
| 2009/0279180 A1 | 11/2009 | Amitai et al. |
| 2009/0307828 A1 | 12/2009 | Ludlow |
| 2010/0056274 A1 | 3/2010 | Uusitalo et al. |
| 2010/0085325 A1 | 4/2010 | King-Smith et al. |
| 2010/0130140 A1 | 5/2010 | Waku et al. |
| 2010/0141555 A1 | 6/2010 | Rorberg et al. |
| 2010/0194682 A1 | 8/2010 | Orr et al. |
| 2010/0225473 A1 | 9/2010 | Leuthardt et al. |
| 2010/0245387 A1 | 9/2010 | Bachelder |
| 2011/0007081 A1 | 1/2011 | Gordon |
| 2011/0089325 A1 | 4/2011 | Ottney |
| 2011/0102234 A1 | 5/2011 | Adams et al. |
| 2011/0118870 A1 | 5/2011 | Sugihara et al. |

(56) References Cited

U.S. PATENT DOCUMENTS

| | | |
|---|---|---|
| 2011/0130958 A1 | 6/2011 | Stahl et al. |
| 2011/0131495 A1 | 6/2011 | Bull et al. |
| 2011/0164047 A1 | 7/2011 | Pence et al. |
| 2011/0164163 A1 | 7/2011 | Bilbrey et al. |
| 2011/0170061 A1 | 7/2011 | Gordon et al. |
| 2011/0175925 A1 | 7/2011 | Kane et al. |
| 2011/0196610 A1 | 8/2011 | Waldman et al. |
| 2011/0199171 A1 | 8/2011 | Prest et al. |
| 2011/0199202 A1 | 8/2011 | De Mers et al. |
| 2011/0201213 A1 | 8/2011 | Dabov et al. |
| 2011/0202823 A1 | 8/2011 | Berger et al. |
| 2011/0221672 A1 | 9/2011 | Osterhout et al. |
| 2011/0221896 A1 | 9/2011 | Haddick et al. |
| 2011/0249230 A1 | 10/2011 | Blum |
| 2012/0032874 A1 | 2/2012 | Mukawa |
| 2012/0033080 A1 | 2/2012 | Watanabe et al. |
| 2012/0038641 A1 | 2/2012 | Levantovsky et al. |
| 2012/0050493 A1 | 3/2012 | Ernst et al. |
| 2012/0062850 A1 | 3/2012 | Travis |
| 2012/0075168 A1 | 3/2012 | Osterhout et al. |
| 2012/0088543 A1 | 4/2012 | Lindner et al. |
| 2012/0092329 A1 | 4/2012 | Koo et al. |
| 2012/0113514 A1 | 5/2012 | Rodman |
| 2012/0127284 A1 | 5/2012 | Bar-Zeev et al. |
| 2012/0188245 A1 | 7/2012 | Hyatt et al. |
| 2012/0212398 A1 | 8/2012 | Border et al. |
| 2012/0212593 A1 | 8/2012 | Na'aman et al. |
| 2012/0223885 A1 | 9/2012 | Perez |
| 2012/0242698 A1 | 9/2012 | Haddick et al. |
| 2012/0250152 A1 | 10/2012 | Larson et al. |
| 2012/0264510 A1 | 10/2012 | Wigdor et al. |
| 2012/0293548 A1 | 11/2012 | Perez et al. |
| 2012/0294478 A1 | 11/2012 | Publicover et al. |
| 2012/0306850 A1 | 12/2012 | Balan et al. |
| 2012/0327040 A1 | 12/2012 | Simon et al. |
| 2012/0327116 A1 | 12/2012 | Liu et al. |
| 2013/0009366 A1 | 1/2013 | Hannegan et al. |
| 2013/0009907 A1 | 1/2013 | Rosenberg et al. |
| 2013/0027337 A1 | 1/2013 | Chen et al. |
| 2013/0044042 A1 | 2/2013 | Olsson et al. |
| 2013/0044130 A1 | 2/2013 | Geisner et al. |
| 2013/0063496 A1 | 3/2013 | Basler et al. |
| 2013/0069924 A1 | 3/2013 | Robinson et al. |
| 2013/0077049 A1 | 3/2013 | Bohn et al. |
| 2013/0083009 A1 | 4/2013 | Geisner et al. |
| 2013/0083055 A1 | 4/2013 | Piemonte et al. |
| 2013/0100259 A1 | 4/2013 | Ramaswamy |
| 2013/0120841 A1 | 5/2013 | Shpunt et al. |
| 2013/0135198 A1 | 5/2013 | Hodge et al. |
| 2013/0154913 A1 | 6/2013 | Genc et al. |
| 2013/0154918 A1 | 6/2013 | Vaught et al. |
| 2013/0162632 A1 | 6/2013 | Varga et al. |
| 2013/0163980 A1 | 6/2013 | Lazaridis et al. |
| 2013/0194389 A1 | 8/2013 | Vaught et al. |
| 2013/0196757 A1 | 8/2013 | Latta et al. |
| 2013/0207970 A1 | 8/2013 | Shpunt et al. |
| 2013/0215235 A1 | 8/2013 | Russell |
| 2013/0230215 A1 | 9/2013 | Gurman et al. |
| 2013/0241948 A1 | 9/2013 | Kimura |
| 2013/0257622 A1 | 10/2013 | Davalos et al. |
| 2013/0265227 A1 | 10/2013 | Julian et al. |
| 2013/0300652 A1 | 11/2013 | Raffle et al. |
| 2013/0314555 A1 | 11/2013 | Vartanian et al. |
| 2013/0321265 A1 | 12/2013 | Bychkov et al. |
| 2013/0321271 A1 | 12/2013 | Bychkov et al. |
| 2013/0335301 A1 | 12/2013 | Wong et al. |
| 2013/0335435 A1 | 12/2013 | Ambrus et al. |
| 2013/0336629 A1 | 12/2013 | Mulholland et al. |
| 2013/0342591 A1 | 12/2013 | Sagan et al. |
| 2014/0028704 A1 | 1/2014 | Wu et al. |
| 2014/0043682 A1 | 2/2014 | Hussey et al. |
| 2014/0062854 A1 | 3/2014 | Cho |
| 2014/0062962 A1* | 3/2014 | Jang ............... G06F 3/03545 |
| | | 345/175 |
| 2014/0063473 A1 | 3/2014 | Pasolini |
| 2014/0078282 A1 | 3/2014 | Aoki et al. |
| 2014/0125668 A1 | 5/2014 | Steed et al. |
| 2014/0129328 A1 | 5/2014 | Mathew |
| 2014/0146394 A1 | 5/2014 | Tout et al. |
| 2014/0147829 A1 | 5/2014 | Jerauld |
| 2014/0152530 A1 | 6/2014 | Venkatesha et al. |
| 2014/0152558 A1 | 6/2014 | Salter et al. |
| 2014/0152676 A1 | 6/2014 | Rohn et al. |
| 2014/0159995 A1 | 6/2014 | Adams et al. |
| 2014/0160055 A1 | 6/2014 | Margolis et al. |
| 2014/0160137 A1 | 6/2014 | Martin et al. |
| 2014/0160157 A1 | 6/2014 | Poulos et al. |
| 2014/0160170 A1 | 6/2014 | Lyons |
| 2014/0168716 A1 | 6/2014 | King et al. |
| 2014/0168735 A1 | 6/2014 | Yuan et al. |
| 2014/0176591 A1 | 6/2014 | Klein et al. |
| 2014/0176603 A1 | 6/2014 | Kumar et al. |
| 2014/0177023 A1 | 6/2014 | Gao et al. |
| 2014/0198055 A1* | 7/2014 | Barkway ............. G06F 3/04886 |
| | | 345/173 |
| 2014/0204759 A1 | 7/2014 | Guo et al. |
| 2014/0213280 A1 | 7/2014 | Sandel et al. |
| 2014/0225814 A1 | 8/2014 | English et al. |
| 2014/0240313 A1 | 8/2014 | Varga |
| 2014/0247286 A1 | 9/2014 | Chi et al. |
| 2014/0253588 A1 | 9/2014 | Mandela et al. |
| 2014/0253605 A1 | 9/2014 | Border et al. |
| 2014/0267419 A1 | 9/2014 | Ballard et al. |
| 2014/0361971 A1 | 12/2014 | Sala |
| 2014/0372957 A1 | 12/2014 | Kipman et al. |
| 2014/0375680 A1 | 12/2014 | Ackerman et al. |
| 2014/0375683 A1 | 12/2014 | Massey et al. |
| 2014/0378810 A1* | 12/2014 | Davis ..................... G06T 5/40 |
| | | 600/407 |
| 2015/0022542 A1 | 1/2015 | Baba |
| 2015/0029222 A1 | 1/2015 | Hofmann |
| 2015/0134143 A1 | 5/2015 | Willenborg |
| 2015/0146004 A1 | 5/2015 | Kritt et al. |
| 2015/0153572 A1 | 6/2015 | Miao et al. |
| 2015/0161822 A1 | 6/2015 | Basu |
| 2015/0169038 A1 | 6/2015 | Kim |
| 2015/0172545 A1 | 6/2015 | Szabo |
| 2015/0177514 A1 | 6/2015 | Maimone et al. |
| 2015/0193098 A1 | 7/2015 | Kauffmann et al. |
| 2015/0205126 A1 | 7/2015 | Schowengerdt |
| 2015/0205351 A1 | 7/2015 | Osterhout et al. |
| 2015/0205373 A1 | 7/2015 | Osterhout et al. |
| 2015/0205378 A1 | 7/2015 | Osterhout |
| 2015/0205384 A1 | 7/2015 | Osterhout et al. |
| 2015/0205385 A1 | 7/2015 | Osterhout et al. |
| 2015/0205387 A1 | 7/2015 | Osterhout et al. |
| 2015/0205388 A1 | 7/2015 | Osterhout |
| 2015/0205401 A1 | 7/2015 | Osterhout |
| 2015/0205402 A1 | 7/2015 | Osterhout |
| 2015/0205494 A1 | 7/2015 | Scott et al. |
| 2015/0205566 A1 | 7/2015 | Osterhout |
| 2015/0226966 A1 | 8/2015 | Osterhout |
| 2015/0226967 A1 | 8/2015 | Osterhout et al. |
| 2015/0228099 A1 | 8/2015 | Osterhout |
| 2015/0228119 A1 | 8/2015 | Osterhout et al. |
| 2015/0228120 A1 | 8/2015 | Osterhout et al. |
| 2015/0235429 A1 | 8/2015 | Miller et al. |
| 2015/0253573 A1 | 9/2015 | Sako et al. |
| 2015/0254882 A1 | 9/2015 | Englert et al. |
| 2015/0277113 A1 | 10/2015 | Border et al. |
| 2015/0277118 A1 | 10/2015 | Border et al. |
| 2015/0277122 A1 | 10/2015 | Border |
| 2015/0277549 A1 | 10/2015 | Border |
| 2015/0279010 A1 | 10/2015 | Cianfrone et al. |
| 2015/0279104 A1 | 10/2015 | Border et al. |
| 2015/0279107 A1 | 10/2015 | Border et al. |
| 2015/0279108 A1 | 10/2015 | Border |
| 2015/0302646 A1 | 10/2015 | Osterhout et al. |
| 2015/0302647 A1 | 10/2015 | Osterhout et al. |
| 2015/0304368 A1 | 10/2015 | Vaccari et al. |
| 2015/0316766 A1 | 11/2015 | Weaver et al. |
| 2015/0331240 A1 | 11/2015 | Mount et al. |
| 2015/0331241 A1 | 11/2015 | Haddick et al. |
| 2015/0332032 A1 | 11/2015 | Alameh et al. |

(56) References Cited

U.S. PATENT DOCUMENTS

| | | | |
|---|---|---|---|
| 2015/0338915 A1 | 11/2015 | Publicover et al. | |
| 2016/0000316 A1 | 1/2016 | Copland et al. | |
| 2016/0026873 A1 | 1/2016 | Wexler et al. | |
| 2016/0045810 A1 | 2/2016 | Minkovitch | |
| 2016/0048019 A1 | 2/2016 | Haddick et al. | |
| 2016/0048023 A1 | 2/2016 | Haddick et al. | |
| 2016/0048160 A1 | 2/2016 | Haddick et al. | |
| 2016/0049008 A1 | 2/2016 | Haddick et al. | |
| 2016/0054566 A1 | 2/2016 | Osterhout et al. | |
| 2016/0077342 A1 | 3/2016 | Osterhout et al. | |
| 2016/0089272 A1 | 3/2016 | Li et al. | |
| 2016/0117972 A1 | 4/2016 | Yoshiyama et al. | |
| 2016/0131912 A1 | 5/2016 | Border et al. | |
| 2016/0140826 A1 | 5/2016 | Sahiholnasab et al. | |
| 2016/0147063 A1 | 5/2016 | Border et al. | |
| 2016/0147064 A1 | 5/2016 | Border et al. | |
| 2016/0147065 A1 | 5/2016 | Border et al. | |
| 2016/0189426 A1 | 6/2016 | Thomas et al. | |
| 2016/0202946 A1 | 7/2016 | Osterhout et al. | |
| 2016/0239985 A1 | 8/2016 | Haddick et al. | |
| 2016/0240008 A1 | 8/2016 | Haddick et al. | |
| 2016/0306173 A1 | 10/2016 | Tsukahara et al. | |
| 2016/0360160 A1 | 12/2016 | Eizenberg | |
| 2017/0025091 A1 | 1/2017 | Haddick et al. | |
| 2017/0099433 A1 | 4/2017 | Cleveland | |
| 2017/0122771 A1* | 5/2017 | Keal | G01C 25/005 |
| 2017/0148216 A1 | 5/2017 | Birman | |
| 2017/0186230 A1 | 6/2017 | Ivers et al. | |
| 2017/0200296 A1* | 7/2017 | Jones | G06T 11/60 |
| 2017/0246070 A1 | 8/2017 | Osterhout et al. | |
| 2017/0248792 A1 | 8/2017 | Border | |
| 2017/0249860 A1 | 8/2017 | Osterhout et al. | |
| 2017/0249861 A1 | 8/2017 | Border | |
| 2017/0249862 A1 | 8/2017 | Border | |
| 2017/0256029 A1 | 9/2017 | Shams et al. | |
| 2017/0307880 A1 | 10/2017 | Shrubsole | |
| 2017/0329141 A1 | 11/2017 | Border et al. | |
| 2018/0004008 A1 | 1/2018 | Froissard | |
| 2018/0059421 A1 | 3/2018 | Osterhout et al. | |

FOREIGN PATENT DOCUMENTS

| | | |
|---|---|---|
| EP | 2486450 A1 | 8/2012 |
| EP | 2502410 A1 | 9/2012 |
| JP | 2011085829 A | 4/2011 |
| WO | WO9600401 A1 | 1/1996 |
| WO | 2011143655 A1 | 11/2011 |
| WO | 2012058175 A1 | 5/2012 |
| WO | 2013050650 A1 | 4/2013 |
| WO | 2013103825 A1 | 7/2013 |
| WO | 2013110846 A1 | 8/2013 |
| WO | 2013170073 A1 | 11/2013 |
| WO | 2014155072 A2 | 10/2014 |
| WO | WO2014168499 A1 | 10/2014 |
| WO | 2017151494 A1 | 9/2017 |

OTHER PUBLICATIONS

US 8,792,178 B2, 07/2014, Totani et al. (withdrawn)

"Continental Head-Up Display Augmented Reality HUD", http://continental-head-up-display.com/ (2014) (last visited: Jan. 31, 2017), pp. 1-10.

"Genius Ring Mice", http://www.geniusnet.com/Genius/wSite/productCompare/compare.jsp, Dec. 23, 2014, 1 page.

"Meet Nod, the Bluetooth Ring That Wants to Replace Your Mouse", http://www.pcmag.com/article2/0,2817,2457238,00.asp, Apr. 29, 2014, 6 pages.

Gonzalez, Rafael C. et al., "Digital Image Processing Second Edition", http://users.dcc.uchile.cl/~jsaavedr/libros/dip_gw.pdf, Prentice Hall Inc ISBN 0-201-18075-8, 2002, 1-190.

Hopkins, George W. et al., "In-Vivo NIR Diffuse-Reflectance Tissue Spectroscopy of Human Subjects", http://citeseerx.ist.psu.edu/viewdoc/download?doi=10.1.1.596.955&rep=rep1&type=pdf, Hewlett Packard Company 1999, 1999, 1-11.

Huang, Jin-Bin , "Image Completion Using Planar Structure Guidelines", ACM Transactions on Graphics, vol. 33, No. 4, Article 129, Jul. 2014, 1-10.

Janin, Adam L. et al., "Calibration of Head-Mounted Displays for Augmented Reality Applications", Research and Technology Boeing Computer Services MS 7L-48 P.O. Box 24346 Seattle, WA 98124-0346 Virtual Reality Annual International Symposium, 1993., 1993 IEEE,, 1993, 10 Pages.

Logbar Inc., "Ring: Shortcut Everything", https://www.kickstarter.com/projects/1761670738/ring-shortcut-everything, Jun. 2012, 22 pages.

Mastandrea, Nick, "Mycestro, The Next Generation 3D Mouse", https://www.kickstarter.com/projects/mycestro/mycestrotm-the-next-generation-3d-mouse, Dec. 2014, 22 pages.

PCT/US2017/019665, "Application Serial No. PCT/US2017/019665, International Search Report and the Written Opinion dated May 19, 2017", 8 pages.

Petty, C. et al., "Screeing Controlled Substances Using the Near-Infrared Fourier Transform Raman Techniquie", http://www.nicoletcz.cz/userfiles/file/vjecy/AN51242_Screening%20Controlled%20Substances.pdf, ThermoScientific Application Note 51242, 1996, 2008.

Schedwill, "Bidirectional OLED Microdisplay", Fraunhofer Research Institution for Organics, Materials and Electronic Device Comedd, Apr. 11, 2014, 2 pages.

Vogel, et al., "Data glasses controlled by eye movements", Information and communication, Fraunhofer-Gesellschaft, Sep. 22, 2013, 2 pages.

Walton, Zach , "Wear This Smartphone Controller on Your Finger", http://www.webpronews.com/wear-this-smartphone-controller-on-your-finger-2012-06, 5 pages.

Final Office Action dated Oct. 7, 2019, for U.S. Appl. No. 15/063,682, filed Mar. 8, 2016, 13 pages.

Final Office Action dated Dec. 14, 2018, for U.S. Appl. No. 15/063,682, filed Mar. 8, 2016, 12 pages.

Non-Final Office Action dated Apr. 5, 2018, for U.S. Appl. No. 15/063,682, filed Mar. 8, 2016, 14 pages.

Non-Final Office Action dated May 22, 2019, for U.S. Appl. No. 15/063,682, filed Mar. 8, 2016, 16 pages.

* cited by examiner

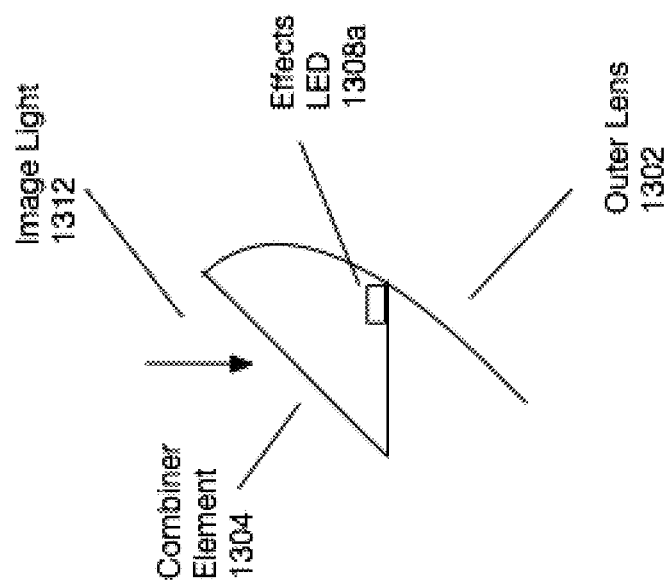

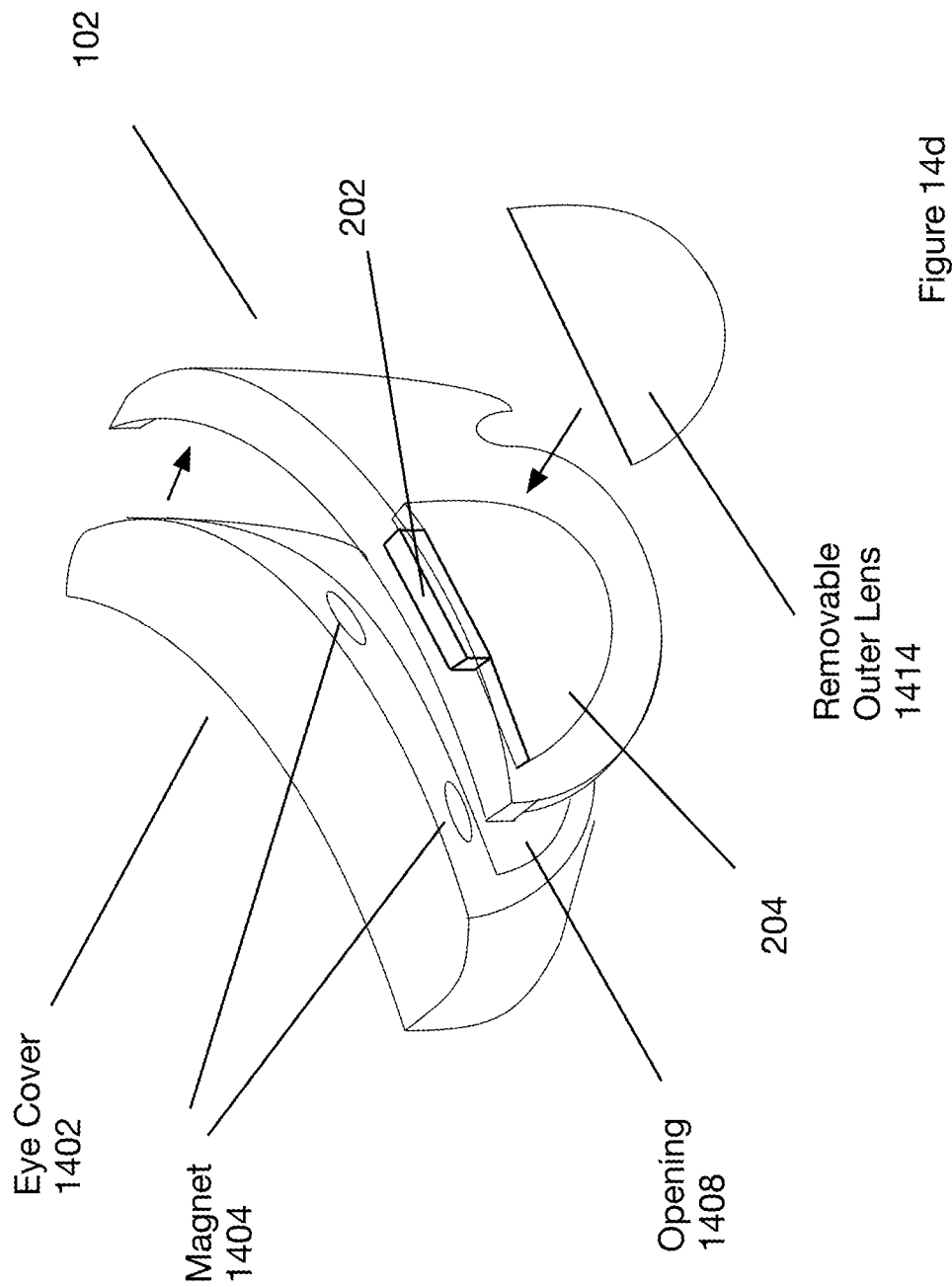

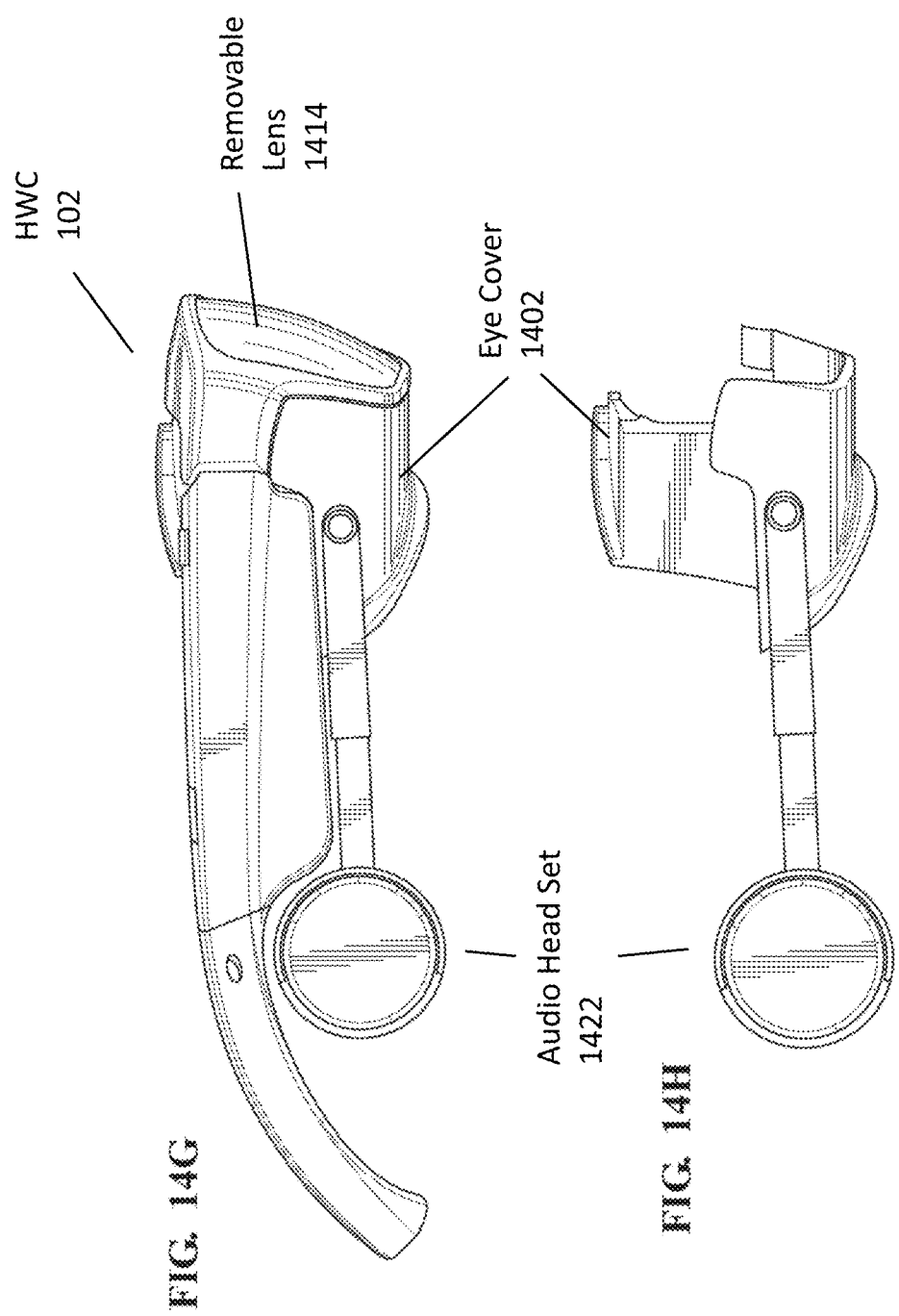

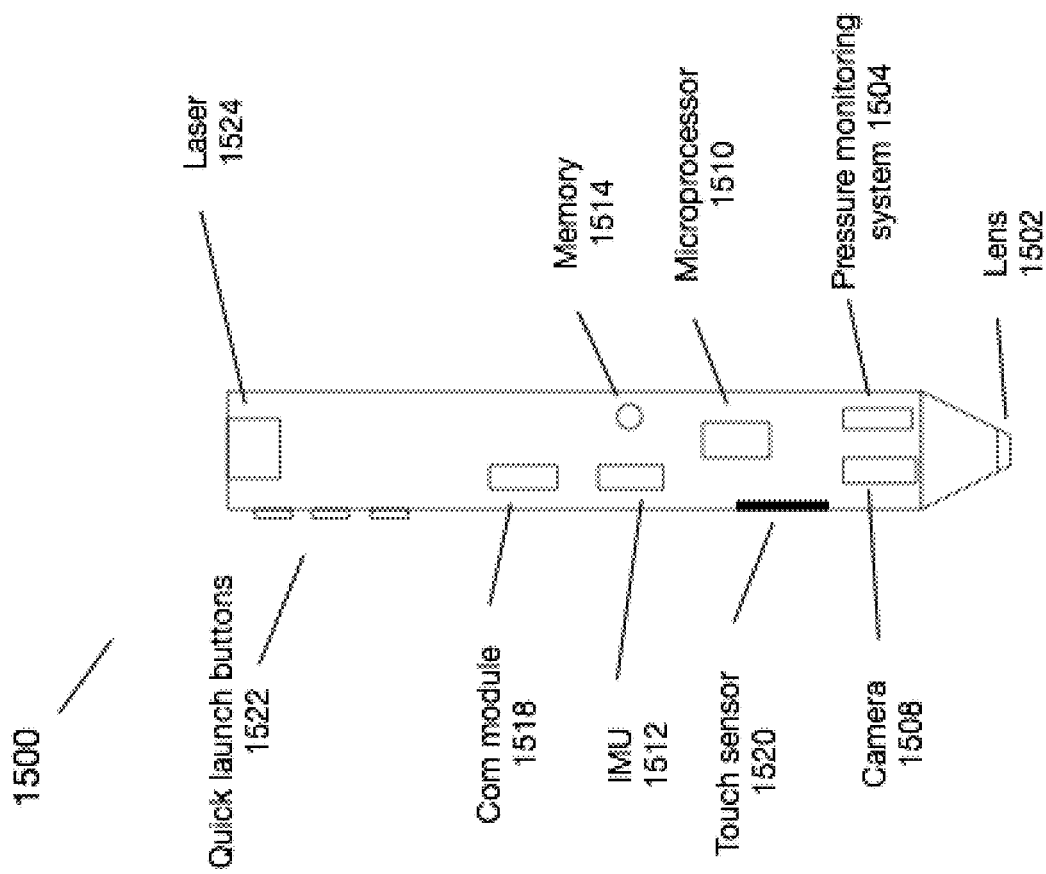

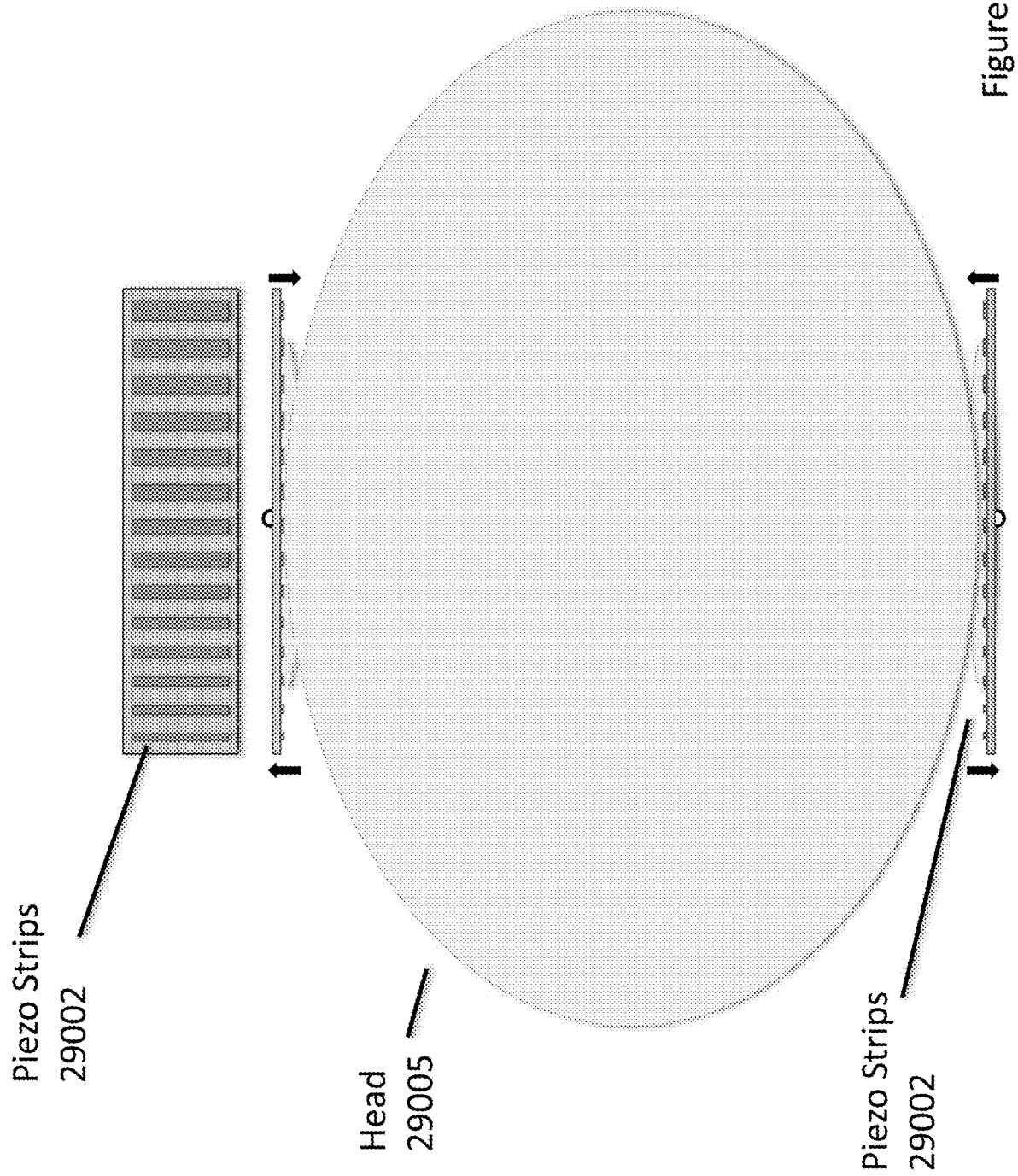

Targeting by head position

After identification words may be highlighted read

Spaghetti | with meatballs

READING ASSISTANCE SYSTEM FOR VISUALLY IMPAIRED

BACKGROUND

Field of the Invention

This disclosure relates to head-worn computer systems adapted to assist visually impaired people.

Description of Related Art

Head mounted displays (HMDs) and particularly HMDs that provide a see-through view of the environment are valuable instruments. The presentation of content in the see-through display can be a complicated operation when attempting to ensure that the user experience is optimized. Improved systems and methods for presenting content in the see-through display are required to improve the user experience.

SUMMARY

Aspects of the present disclosure relate to methods and systems for providing visual assistance to the visually impaired.

These and other systems, methods, objects, features, and advantages of the present disclosure will be apparent to those skilled in the art from the following detailed description of the preferred embodiment and the drawings. All documents mentioned herein are hereby incorporated in their entirety by reference.

BRIEF DESCRIPTION OF THE DRAWINGS

Embodiments are described with reference to the following Figures. The same numbers may be used throughout to reference like features and components that are shown in the Figures:

FIGS. 13a to 13c illustrate peripheral lighting systems in accordance with the principles of the present disclosure.

FIGS. 14a to 14h illustrate light suppression systems in accordance with the principles of the present disclosure.

FIG. 15 illustrates an external user interface in accordance with the principles of the present disclosure.

FIGS. 29 and 29a illustrate haptic systems in accordance with the principles of the present disclosure.

While the disclosure has been described in connection with certain preferred embodiments, other embodiments would be understood by one of ordinary skill in the art and are encompassed herein.

DETAILED DESCRIPTION OF THE PREFERRED EMBODIMENT(S)

Aspects of the present disclosure relate to head-worn computing ("HWC") systems. HWC involves, in some instances, a system that mimics the appearance of head-worn glasses or sunglasses. The glasses may be a fully developed computing platform, such as including computer displays presented in each of the lenses of the glasses to the eyes of the user. In embodiments, the lenses and displays may be configured to allow a person wearing the glasses to see the environment through the lenses while also seeing, simultaneously, digital imagery, which forms an overlaid image that is perceived by the person as a digitally augmented image of the environment, or augmented reality ("AR").

HWC involves more than just placing a computing system on a person's head. The system may need to be designed as a lightweight, compact and fully functional computer display, such as wherein the computer display includes a high resolution digital display that provides a high level of emersion comprised of the displayed digital content and the see-through view of the environmental surroundings. User interfaces and control systems suited to the HWC device may be required that are unlike those used for a more conventional computer such as a laptop. For the HWC and associated systems to be most effective, the glasses may be equipped with sensors to determine environmental conditions, geographic location, relative positioning to other points of interest, objects identified by imaging and movement by the user or other users in a connected group, compass heading, head tilt, where the user is looking and the like. The HWC may then change the mode of operation to match the conditions, location, positioning, movements, and the like, in a method generally referred to as a contextually aware HWC. The glasses also may need to be connected, wirelessly or otherwise, to other systems either locally or through a network. Controlling the glasses may be achieved through the use of an external device, automatically through contextually gathered information, through user gestures captured by the glasses sensors, and the like. Each technique may be further refined depending on the software application being used in the glasses. The glasses may further be used to control or coordinate with external devices that are associated with the glasses.

Figure 1:
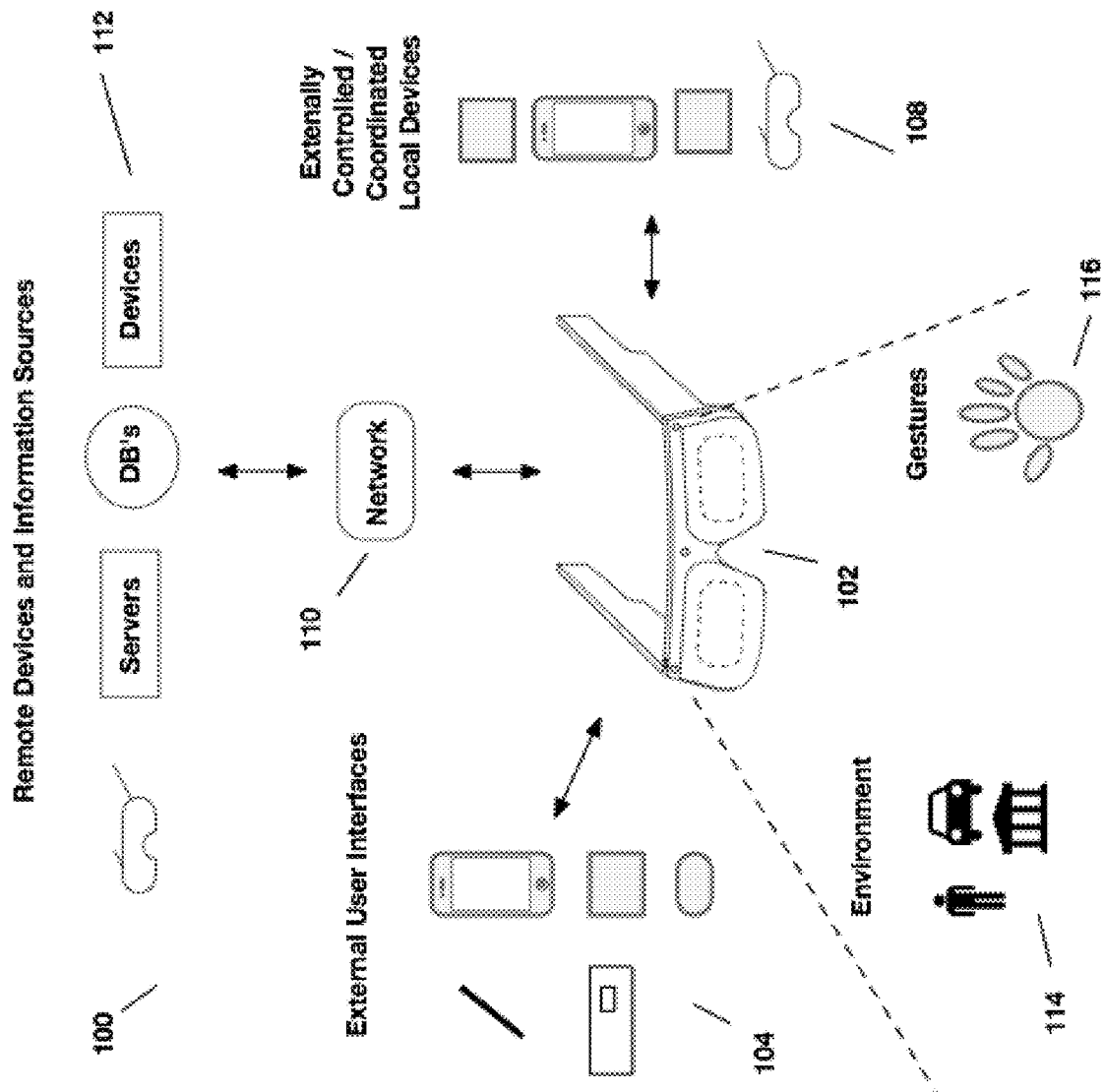
FIG. 1 illustrates a head worn computing system in accordance with the principles of the present disclosure.

Referring to FIG. 1, an overview of the HWC system 100 is presented. As shown, the HWC system 100 comprises a HWC 102, which in this instance is configured as glasses to be worn on the head with sensors such that the HWC 102 is aware of the objects and conditions in the environment 114. In this instance, the HWC 102 also receives and interprets control inputs such as gestures and movements 116. The HWC 102 may communicate with external user interfaces 104. The external user interfaces 104 may provide a physical user interface to take control instructions from a user of the HWC 102 and the external user interfaces 104 and the HWC 102 may communicate bi-directionally to affect the user's command and provide feedback to the external device 108. The HWC 102 may also communicate bi-directionally with externally controlled or coordinated local devices 108. For example, an external user interface 104 may be used in connection with the HWC 102 to control an externally controlled or coordinated local device 108. The externally controlled or coordinated local device 108 may provide feedback to the HWC 102 and a customized GUI may be presented in the HWC 102 based on the type of device or specifically identified device 108. The HWC 102 may also interact with remote devices and information sources 112 through a network connection 110. Again, the external user interface 104 may be used in connection with the HWC 102 to control or otherwise interact with any of the remote devices 108 and information sources 112 in a similar way as when the external user interfaces 104 are used to control or otherwise interact with the externally controlled or coordinated local devices 108. Similarly, HWC 102 may interpret gestures 116 (e.g captured from forward, downward, upward, rearward facing sensors such as camera(s), range finders, IR sensors, etc.) or environmental conditions sensed in the environment 114 to control either local or remote devices 108 or 112.

We will now describe each of the main elements depicted on FIG. 1 in more detail; however, these descriptions are intended to provide general guidance and should not be construed as limiting. Additional description of each element may also be further described herein.

The HWC 102 is a computing platform intended to be worn on a person's head. The HWC 102 may take many different forms to fit many different functional requirements. In some situations, the HWC 102 will be designed in the form of conventional glasses. The glasses may or may not have active computer graphics displays. In situations where the HWC 102 has integrated computer displays the displays may be configured as see-through displays such that the digital imagery can be overlaid with respect to the user's view of the environment 114. There are a number of see-through optical designs that may be used, including ones that have a reflective display (e.g. LCoS, DLP), emissive displays (e.g. OLED, LED), hologram, TIR waveguides, and the like. In embodiments, lighting systems used in connection with the display optics may be solid state lighting systems, such as LED, OLED, quantum dot, quantum dot LED, etc. In addition, the optical configuration may be monocular or binocular. It may also include vision corrective optical components. In embodiments, the optics may be packaged as contact lenses. In other embodiments, the HWC 102 may be in the form of a helmet with a see-through shield, sunglasses, safety glasses, goggles, a mask, fire helmet with see-through shield, police helmet with see through shield, military helmet with see-through shield, utility form customized to a certain work task (e.g. inventory control, logistics, repair, maintenance, etc.), and the like.

The HWC 102 may also have a number of integrated computing facilities, such as an integrated processor, integrated power management, communication structures (e.g. cell net, WiFi, Bluetooth, local area connections, mesh connections, remote connections (e.g. client server, etc.)), and the like. The HWC 102 may also have a number of positional awareness sensors, such as GPS, electronic compass, altimeter, tilt sensor, IMU, and the like. It may also have other sensors such as a camera, rangefinder, hyperspectral camera, Geiger counter, microphone, spectral illumination detector, temperature sensor, chemical sensor, biologic sensor, moisture sensor, ultrasonic sensor, and the like.

The HWC 102 may also have integrated control technologies. The integrated control technologies may be contextual based control, passive control, active control, user control, and the like. For example, the HWC 102 may have an integrated sensor (e.g. camera) that captures user hand or body gestures 116 such that the integrated processing system can interpret the gestures and generate control commands for the HWC 102. In another example, the HWC 102 may have sensors that detect movement (e.g. a nod, head shake, and the like) including accelerometers, gyros and other inertial measurements, where the integrated processor may interpret the movement and generate a control command in response. The HWC 102 may also automatically control itself based on measured or perceived environmental conditions. For example, if it is bright in the environment the HWC 102 may increase the brightness or contrast of the displayed image. In embodiments, the integrated control technologies may be mounted on the HWC 102 such that a user can interact with it directly. For example, the HWC 102 may have a button(s), touch capacitive interface, and the like.

As described herein, the HWC 102 may be in communication with external user interfaces 104. The external user interfaces may come in many different forms. For example, a cell phone screen may be adapted to take user input for control of an aspect of the HWC 102. The external user interface may be a dedicated UI (e.g. air mouse, finger mounted mouse), such as a keyboard, touch surface, button(s), joy stick, and the like. In embodiments, the external controller may be integrated into another device such as a ring, watch, bike, car, and the like. In each case, the external user interface 104 may include sensors (e.g. IMU, accelerometers, compass, altimeter, and the like) to provide additional input for controlling the HWD 104.

As described herein, the HWC 102 may control or coordinate with other local devices 108. The external devices 108 may be an audio device, visual device, vehicle, cell phone, computer, and the like. For instance, the local external device 108 may be another HWC 102, where information may then be exchanged between the separate HWCs 108.

Similar to the way the HWC 102 may control or coordinate with local devices 106, the HWC 102 may control or coordinate with remote devices 112, such as the HWC 102 communicating with the remote devices 112 through a network 110. Again, the form of the remote device 112 may have many forms. Included in these forms is another HWC 102. For example, each HWC 102 may communicate its GPS position such that all the HWCs 102 know where all of HWC 102 are located.

Figure 2:
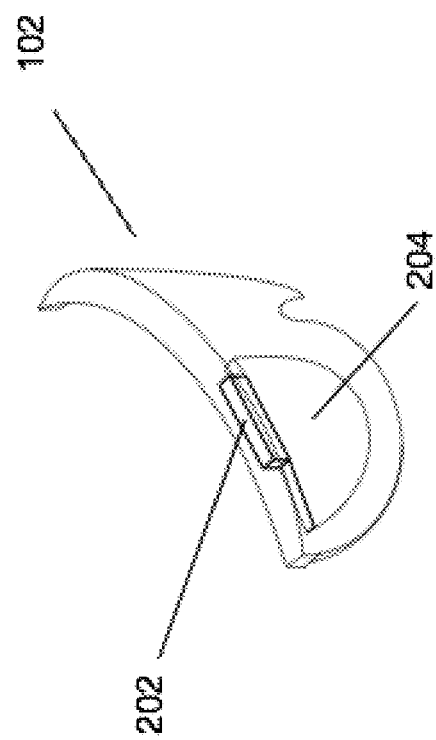
FIG. 2 illustrates a head worn computing system with optical system in accordance with the principles of the present disclosure.

FIG. 2 illustrates a HWC 102 with an optical system that includes an upper optical module 202 and a lower optical module 204. While the upper and lower optical modules 202 and 204 will generally be described as separate modules, it should be understood that this is illustrative only and the present disclosure includes other physical configurations, such as that when the two modules are combined into a single module or where the elements making up the two modules are configured into more than two modules. In embodiments, the upper module 202 includes a computer controlled display (e.g. LCoS, FLCoS, DLP, OLED, backlit LCD, etc.) and image light delivery optics. In embodiments, the lower module includes eye delivery optics that are configured to receive the upper module's image light and deliver the image light to the eye of a wearer of the HWC. In FIG. 2, it should be noted that while the upper and lower optical modules 202 and 204 are illustrated in one side of the HWC such that image light can be delivered to one eye of the wearer, that it is envisioned by the present disclosure that embodiments will contain two image light delivery systems, one for each eye.

Figure 3:
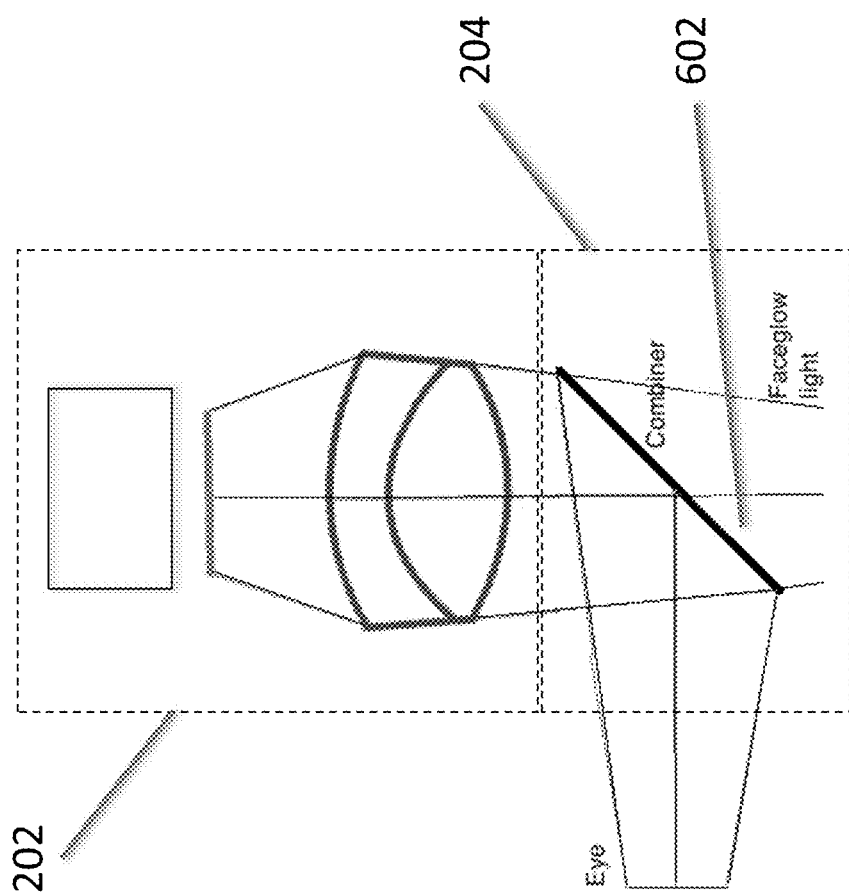
FIG. 3 illustrates upper and lower optical modules in accordance with the principles of the present disclosure.

FIG. 3 illustrates a combination of an upper optical module 202 with a lower optical module 204. In this embodiment, the image light projected from the upper optical module 202 may or may not be polarized. The image light is reflected off a flat combiner element 602 such that it is directed towards the user's eye. Wherein, the combiner element 602 is a partial mirror that reflects image light while transmitting a substantial portion of light from the environment so the user can look through the combiner element and see the environment surrounding the HWC.

The combiner 602 may include a holographic pattern, to form a holographic mirror. If a monochrome image is desired, there may be a single wavelength reflection design for the holographic pattern on the surface of the combiner 602. If the intention is to have multiple colors reflected from the surface of the combiner 602, a multiple wavelength holographic mirror maybe included on the combiner surface. For example, in a three-color embodiment, where red, green and blue pixels are generated in the image light, the holographic mirror may be reflective to wavelengths substantially matching the wavelengths of the red, green and blue light provided in the image light. This configuration can be used as a wavelength specific mirror where pre-determined wavelengths of light from the image light are reflected to the user's eye. This configuration may also be made such that substantially all other wavelengths in the visible pass through the combiner element 602 so the user has a substantially clear view of the environmental surroundings when looking through the combiner element 602. The transparency between the user's eye and the surrounding may be approximately 80% when using a combiner that is a holographic mirror. Wherein holographic mirrors can be made using lasers to produce interference patterns in the holographic material of the combiner where the wavelengths of the lasers correspond to the wavelengths of light that are subsequently reflected by the holographic mirror.

In another embodiment, the combiner element 602 may include a notch mirror comprised of a multilayer coated substrate wherein the coating is designed to substantially reflect the wavelengths of light provided in the image light by the light source and substantially transmit the remaining wavelengths in the visible spectrum. For example, in the case where red, green and blue light is provided by the light source in the upper optics to enable full color images to be provided to the user, the notch mirror is a tristimulus notch mirror wherein the multilayer coating is designed to substantially reflect narrow bands of red, green and blue light that are matched to the what is provided by the light source and the remaining visible wavelengths are substantially transmitted through the coating to enable a view of the environment through the combiner. In another example where monochrome images are provided to the user, the notch mirror is designed to reflect a single narrow band of light that is matched to the wavelength range of the image light provided by the upper optics while transmitting the remaining visible wavelengths to enable a see-thru view of the environment. The combiner 602 with the notch mirror would operate, from the user's perspective, in a manner similar to the combiner that includes a holographic pattern on the combiner element 602. The combiner, with the tristimulus notch mirror, would reflect image light associated with pixels, to the eye because of the match between the reflective wavelengths of the notch mirror and the wavelengths or color of the image light, and the wearer would simultaneously be able to see with high clarity the environmental surroundings. The transparency between the user's eye and the surrounding may be approximately 80% when using the tristimulus notch mirror. In addition, the image provided with the notch mirror combiner can provide higher contrast images than the holographic mirror combiner because the notch mirror acts in a purely reflective manner compared to the holographic mirror which operates through diffraction, and as such the notch mirror is subject to less scattering of the imaging light by the combiner. In another embodiment, the combiner element 602 may include a simple partial mirror that reflects a portion (e.g. 50%) of all wavelengths of light in the visible.

Image light can escape through the combiner 602 and may produce face glow from the optics shown in FIG. 3, as the escaping image light is generally directed downward onto the cheek of the user. When using a holographic mirror combiner or a tristimulus notch mirror combiner, the escaping light can be trapped to avoid face glow. In embodiments, if the image light is polarized before the combiner, a linear polarizer can be laminated, or otherwise associated, to the combiner, with the transmission axis of the polarizer oriented relative to the polarized image light so that any escaping image light is absorbed by the polarizer. In embodiments, the image light would be polarized to provide S polarized light to the combiner for better reflection. As a result, the linear polarizer on the combiner would be oriented to absorb S polarized light and pass P polarized light. This provides the preferred orientation of polarized sunglasses as well.

If the image light is unpolarized, a microlouvered film such as a privacy filter can be used to absorb the escaping image light while providing the user with a see-thru view of the environment. In this case, the absorbance or transmittance of the microlouvered film is dependent on the angle of the light. Where steep angle light is absorbed and light at less of an angle is transmitted. For this reason, in an embodiment, the combiner with the microlouver film is angled at greater than 45 degrees to the optical axis of the image light (e.g. the combiner can be oriented at 50 degrees so the image light from the file lens is incident on the combiner at an oblique angle.

Figure 4:
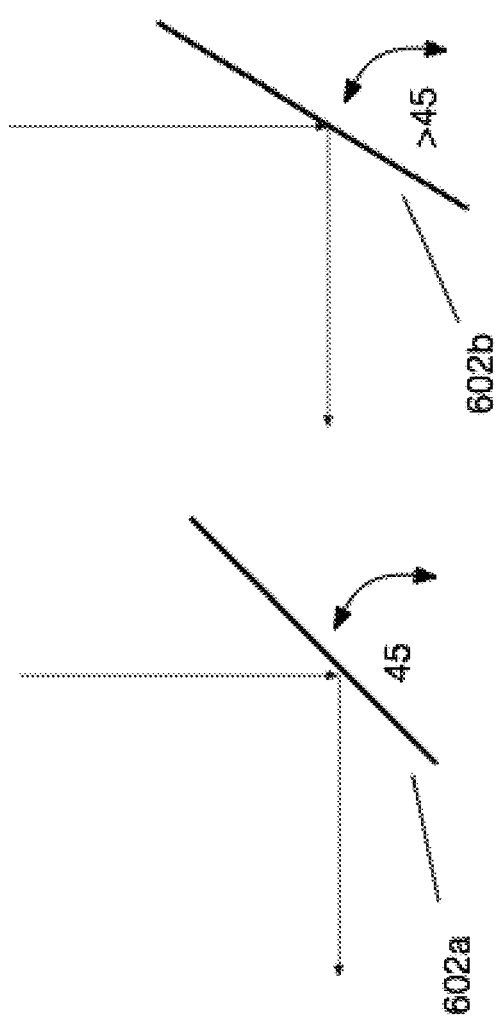
FIG. 4 illustrates angles of combiner elements in accordance with the principles of the present disclosure.

FIG. 4 illustrates an embodiment of a combiner element 602 at various angles when the combiner element 602 includes a holographic mirror. Normally, a mirrored surface reflects light at an angle equal to the angle that the light is incident to the mirrored surface. Typically, this necessitates that the combiner element be at 45 degrees, 602a, if the light is presented vertically to the combiner so the light can be reflected horizontally towards the wearer's eye. In embodiments, the incident light can be presented at angles other than vertical to enable the mirror surface to be oriented at other than 45 degrees, but in all cases wherein a mirrored surface is employed (including the tristimulus notch mirror described previously), the incident angle equals the reflected angle. As a result, increasing the angle of the combiner 602a requires that the incident image light be presented to the combiner 602a at a different angle which positions the upper optical module 202 to the left of the combiner as shown in FIG. 4. In contrast, a holographic mirror combiner, included in embodiments, can be made such that light is reflected at a different angle from the angle that the light is incident onto the holographic mirrored surface. This allows freedom to select the angle of the combiner element 602b independent of the angle of the incident image light and the angle of the light reflected into the wearer's eye. In embodiments, the angle of the combiner element 602b is greater than 45 degrees (shown in FIG. 4) as this allows a more laterally compact HWC design. The increased angle of the combiner element 602b decreases the front to back width of the lower optical module 204 and may allow for a thinner HWC display (i.e. the furthest element from the wearer's eye can be closer to the wearer's face).

Figure 5:
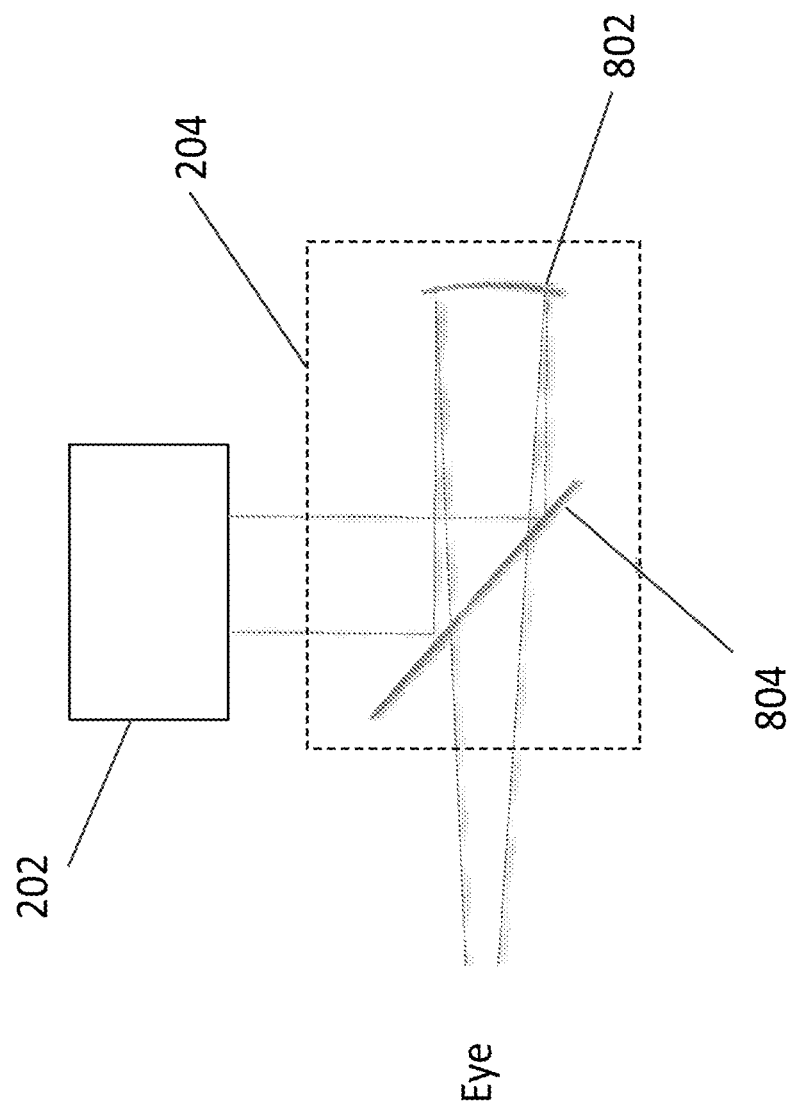
FIG. 5 illustrates upper and lower optical modules in accordance with the principles of the present disclosure.

FIG. 5 illustrates another embodiment of a lower optical module 204. In this embodiment, polarized or unpolarized image light provided by the upper optical module 202, is directed into the lower optical module 204. The image light reflects off a partial mirror 804 (e.g. polarized mirror, notch mirror, holographic mirror, etc.) and is directed toward a curved partially reflective mirror 802. The curved partial mirror 802 then reflects the image light back towards the user's eye, which passes through the partial mirror 804. The user can also see through the partial mirror 804 and the curved partial mirror 802 to see the surrounding environment. As a result, the user perceives a combined image comprised of the displayed image light overlaid onto the see-thru view of the environment. In a preferred embodiment, the partial mirror 804 and the curved partial mirror 802 are both non-polarizing so that the transmitted light from the surrounding environment is unpolarized so that rainbow interference patterns are eliminated when looking at polarized light in the environment such as provided by a computer monitor or in the reflected light from a lake.

While many of the embodiments of the present disclosure have been referred to as upper and lower modules containing certain optical components, it should be understood that the image light production and management functions described in connection with the upper module may be arranged to direct light in other directions (e.g. upward, sideward, etc.). In embodiments, it may be preferred to mount the upper module 202 above the wearer's eye, in which case the image light would be directed downward. In other embodiments it may be preferred to produce light from the side of the wearer's eye, or from below the wearer's eye. In addition, the lower optical module is generally configured to deliver the image light to the wearer's eye and allow the wearer to see through the lower optical module, which may be accomplished through a variety of optical components.

Figure 6:
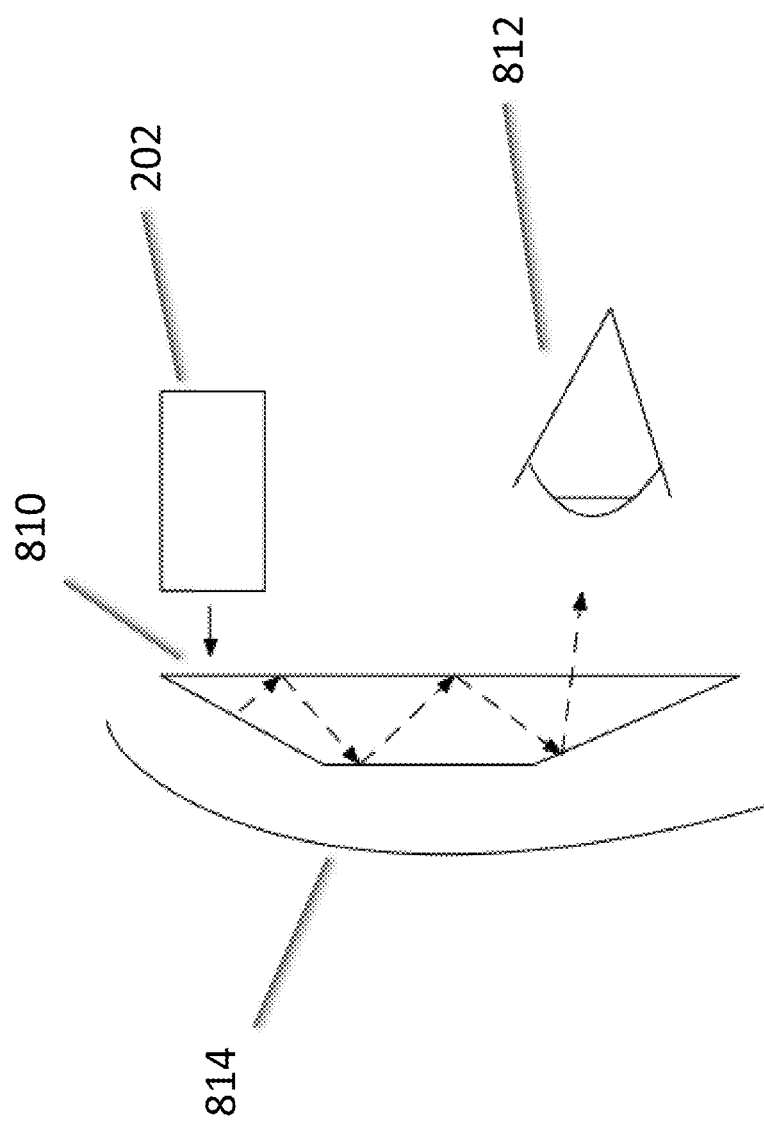
FIG. 6 illustrates upper and lower optical modules in accordance with the principles of the present disclosure.

FIG. 6 illustrates an embodiment of the present disclosure where the upper optical module 202 is arranged to direct image light into a total internal reflection (TIR) waveguide 810. In this embodiment, the upper optical module 202 is positioned above the wearer's eye 812 and the light is directed horizontally into the TIR waveguide 810. The TIR waveguide is designed to internally reflect the image light in a series of downward TIR reflections until it reaches the portion in front of the wearer's eye, where the light passes out of the TIR waveguide 812 in a direction toward the wearer's eye. In this embodiment, an outer shield 814 may be positioned in front of the TIR waveguide 810.

Figure 7:
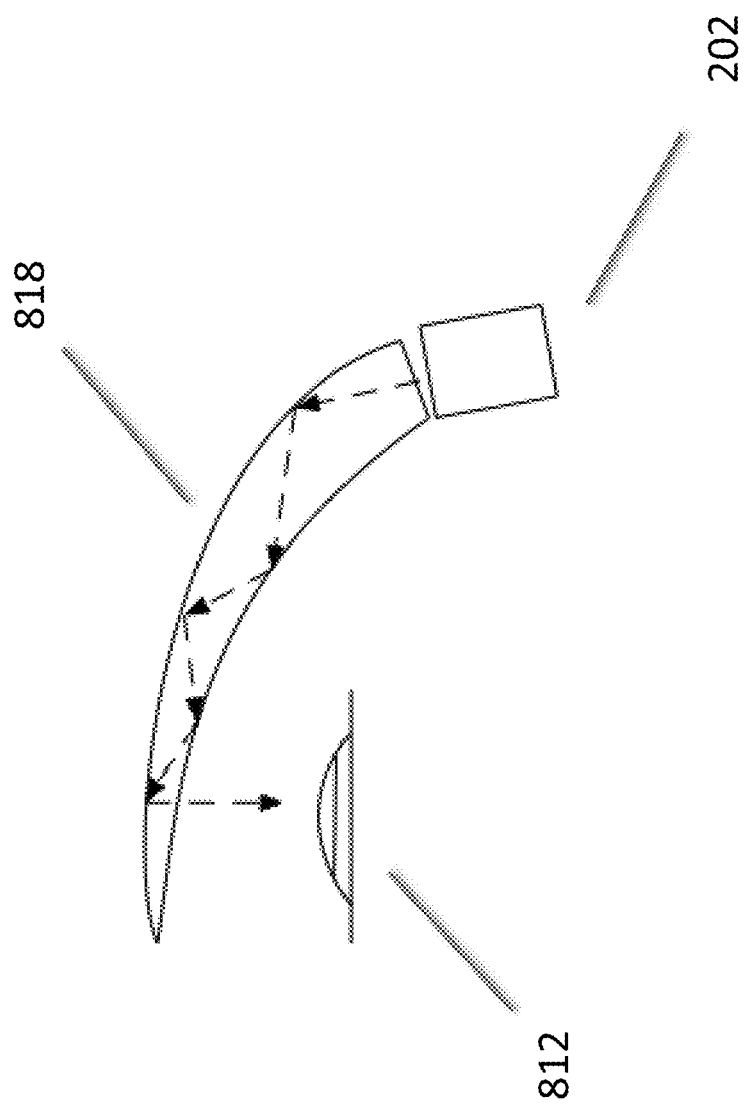
FIG. 7 illustrates upper and lower optical modules in accordance with the principles of the present disclosure.

FIG. 7 illustrates an embodiment of the present disclosure where the upper optical module 202 is arranged to direct image light into a TIR waveguide 818. In this embodiment, the upper optical module 202 is arranged on the side of the TIR waveguide 818. For example, the upper optical module may be positioned in the arm or near the arm of the HWC when configured as a pair of head worn glasses. The TIR waveguide 818 is designed to internally reflect the image light in a series of TIR reflections until it reaches the portion in front of the wearer's eye, where the light passes out of the TIR waveguide 818 in a direction toward the wearer's eye 812.

Figure 8:
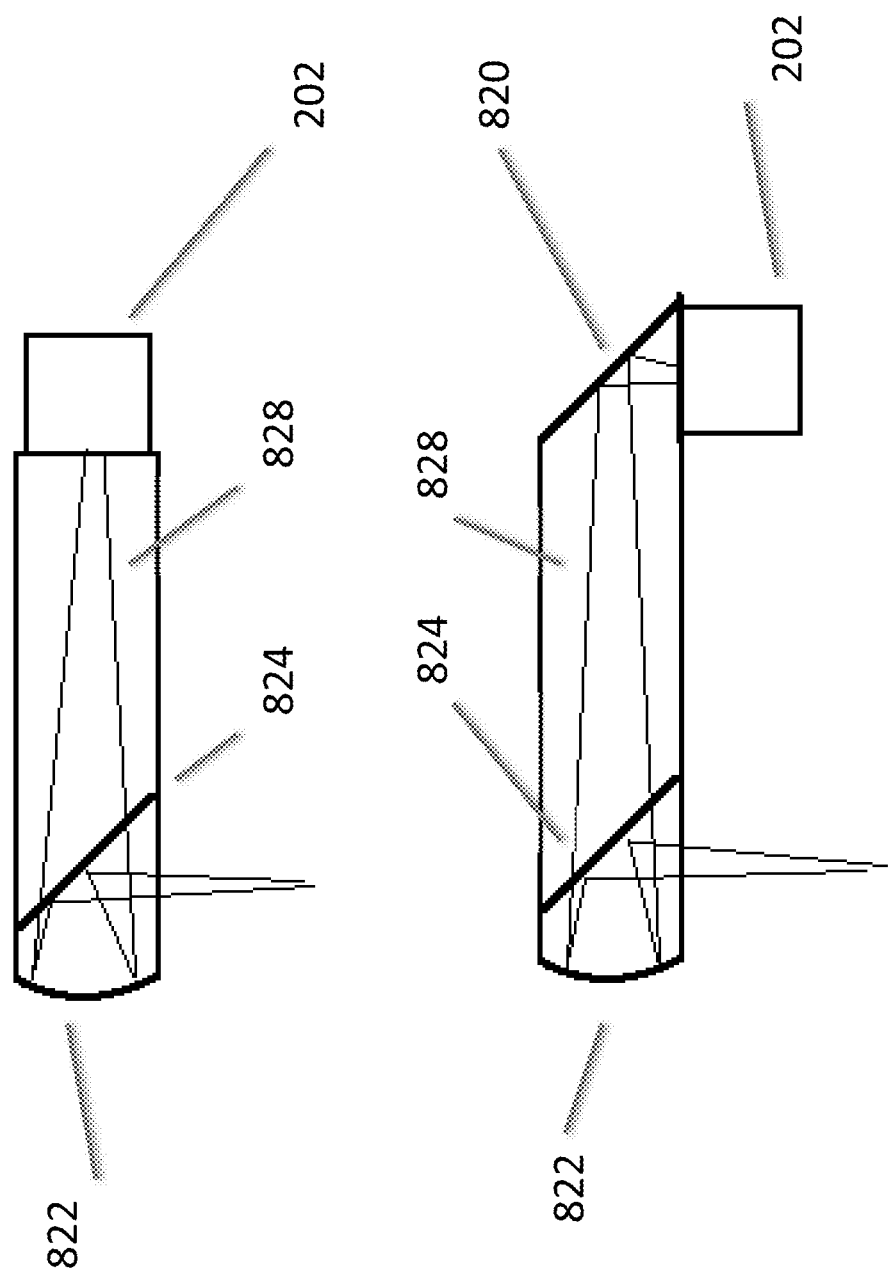
FIG. 8 illustrates upper and lower optical modules in accordance with the principles of the present disclosure.

FIG. 8 illustrates yet further embodiments of the present disclosure where an upper optical module 202 directs polarized image light into an optical guide 828 where the image light passes through a polarized reflector 824, changes polarization state upon reflection of the optical element 822 which includes a ¼ wave film for example and then is reflected by the polarized reflector 824 towards the wearer's eye, due to the change in polarization of the image light. The upper optical module 202 may be positioned behind the optical guide 828 wherein the image light is directed toward a mirror 820 that reflects the image light along the optical guide 828 and towards the polarized reflector 824. Alternatively, in other embodiments, the upper optical module 202 may direct the image light directly along the optical guide 828 and towards the polarized reflector 824. It should be understood that the present disclosure comprises other optical arrangements intended to direct image light into the wearer's eye.

Figure 9:
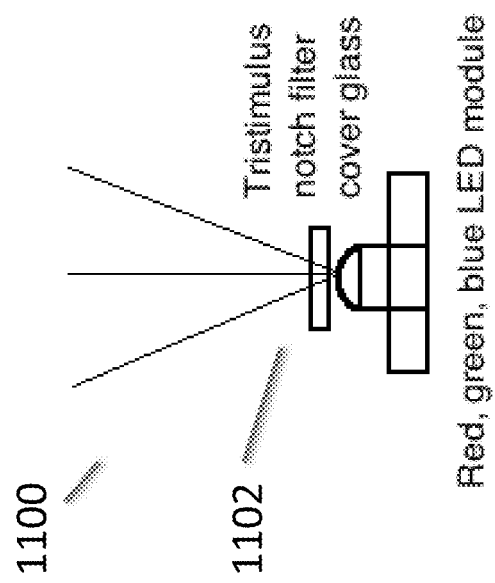
FIGS. 9, 10a, 10b and 11 illustrate light sources and filters in accordance with the principles of the present disclosure.
Figure 10A:
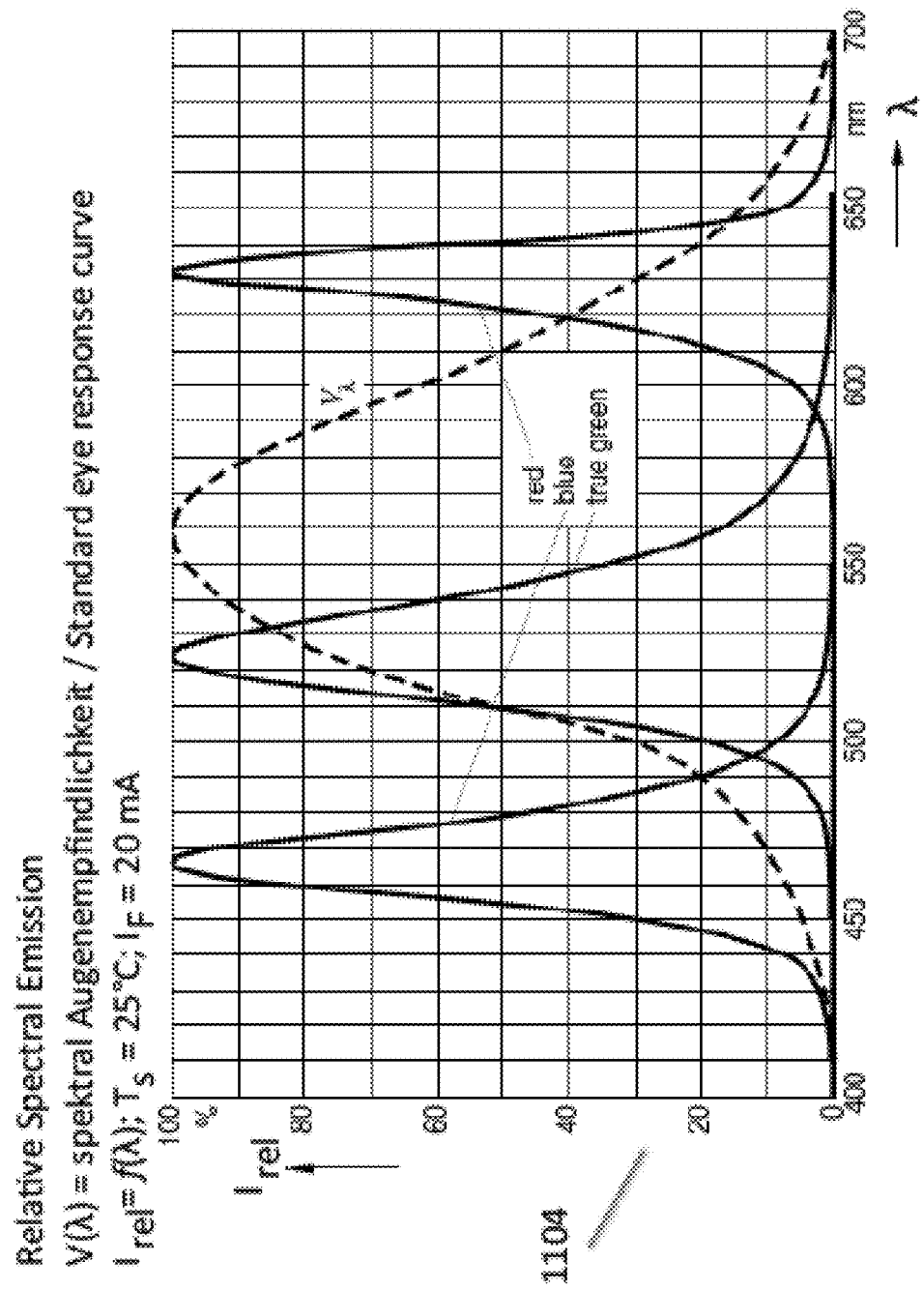
Figure 10B:
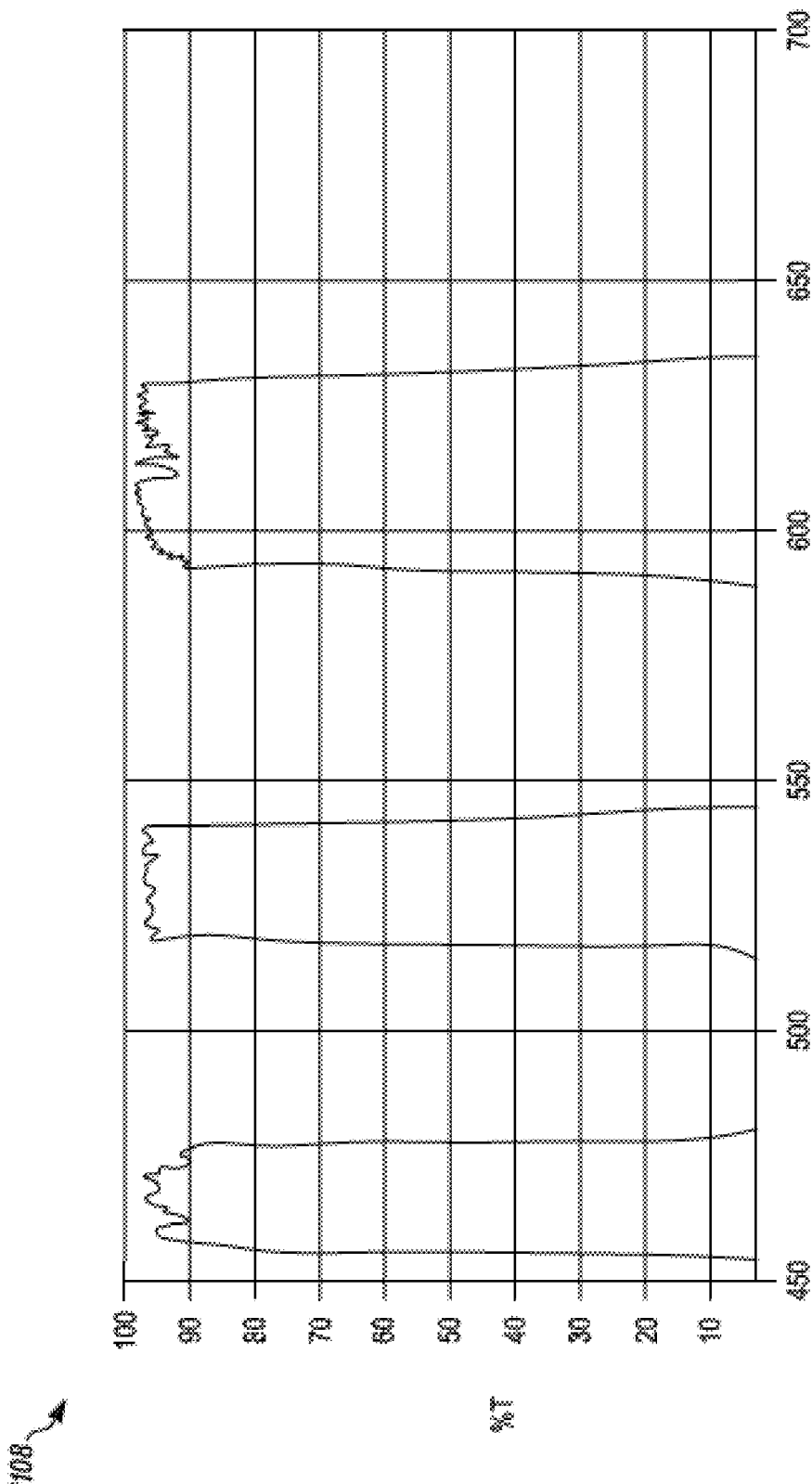
Figure 11:
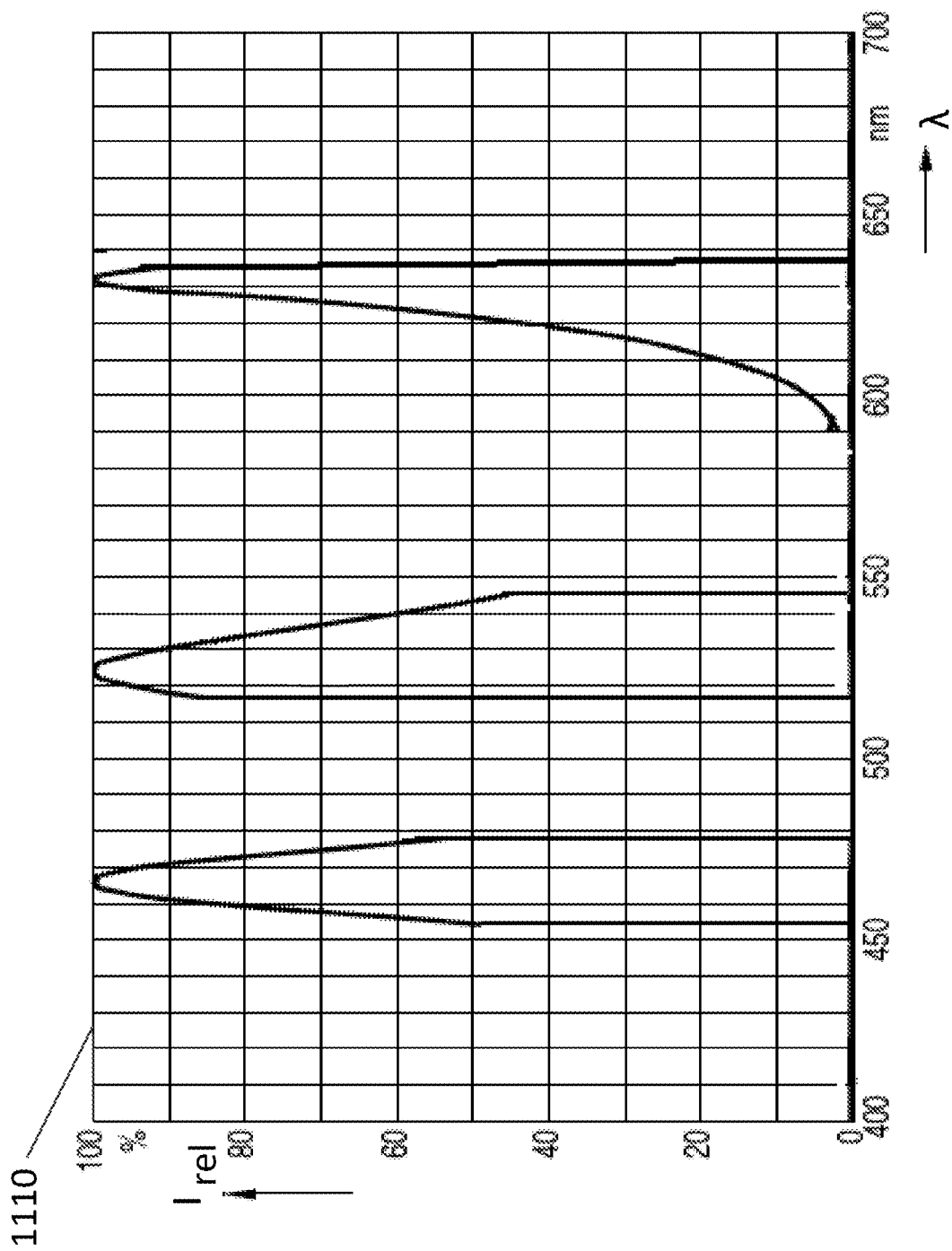

FIG. 9 illustrates a light source 1100 that may be used in association with the upper optics module 202. In embodiments, the light source 1100 may provide light to a backlighting optical system that is associated with the light source 1100 and which serves to homogenize the light and thereby provide uniform illuminating light to an image source in the upper optics. In embodiments, the light source 1100 includes a tristimulus notch filter 1102. The tristimulus notch filter 1102 has narrow band pass filters for three wavelengths, as indicated in FIG. 10b in a transmission graph 1108. The graph shown in FIG. 10a, as 1104 illustrates an output of three different colored LEDs. One can see that the bandwidths of emission are narrow, but they have long tails. The tristimulus notch filter 1102 can be used in connection with such LEDs to provide a light source 1100 that emits narrow filtered wavelengths of light as shown in FIG. 11 as the transmission graph 1110. Wherein the clipping effects of the tristimulus notch filter 1102 can be seen to have cut the tails from the LED emission graph 1104 to provide narrower wavelength bands of light to the upper optical module 202. The light source 1100 can be used in connection with a matched combiner 602 that includes a holographic mirror or tristimulus notch mirror that substantially reflects the narrow bands of image light toward the wearer's eye with a reduced amount of image light that does not get reflected by the combiner, thereby improving efficiency of the head-worn computer (HWC) or head-mounted display (HMD) and reducing escaping light that can cause faceglow.

Figure 12A:
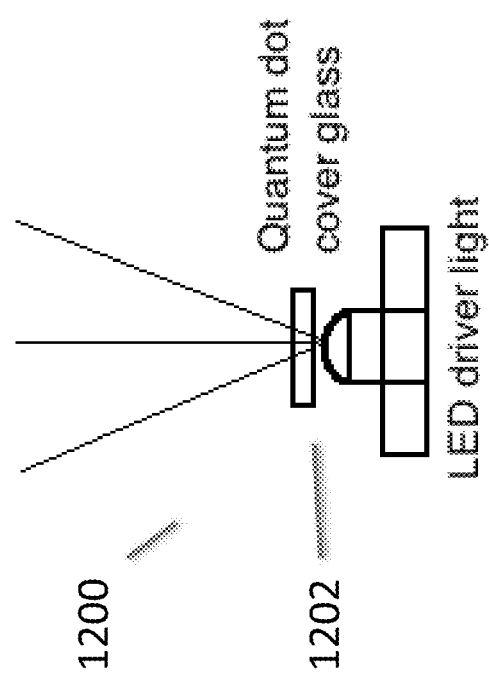
FIGS. 12a to 12c illustrate light sources and quantum dot systems in accordance with the principles of the present disclosure.
Figure 12B:
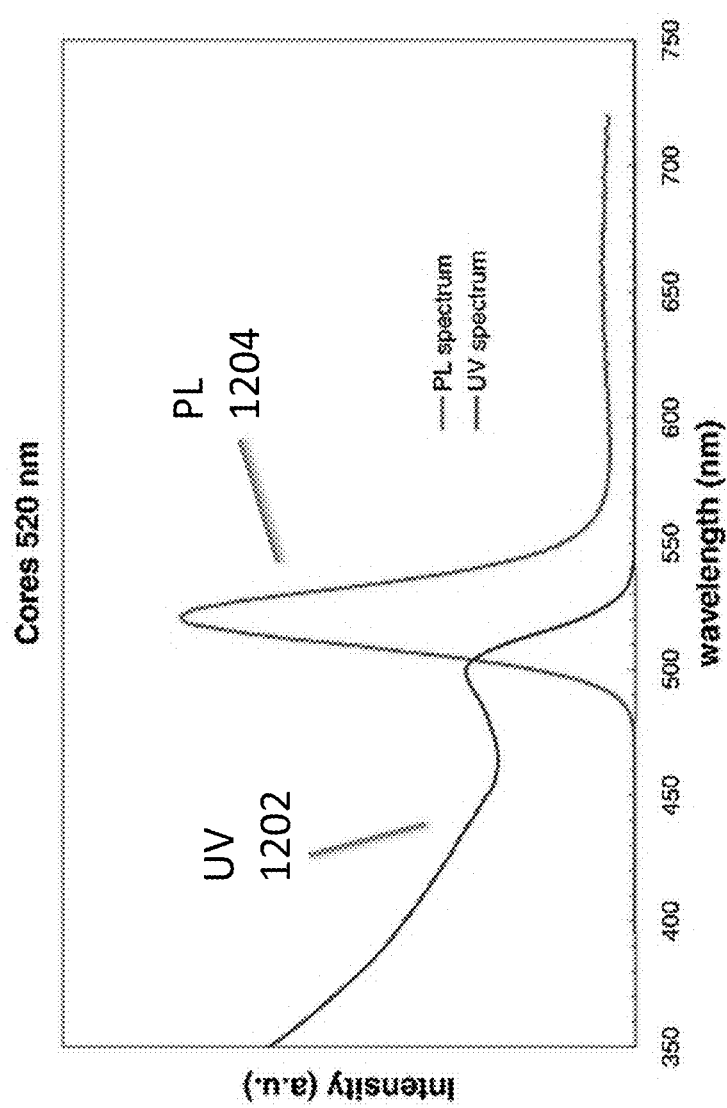
Figure 12C:
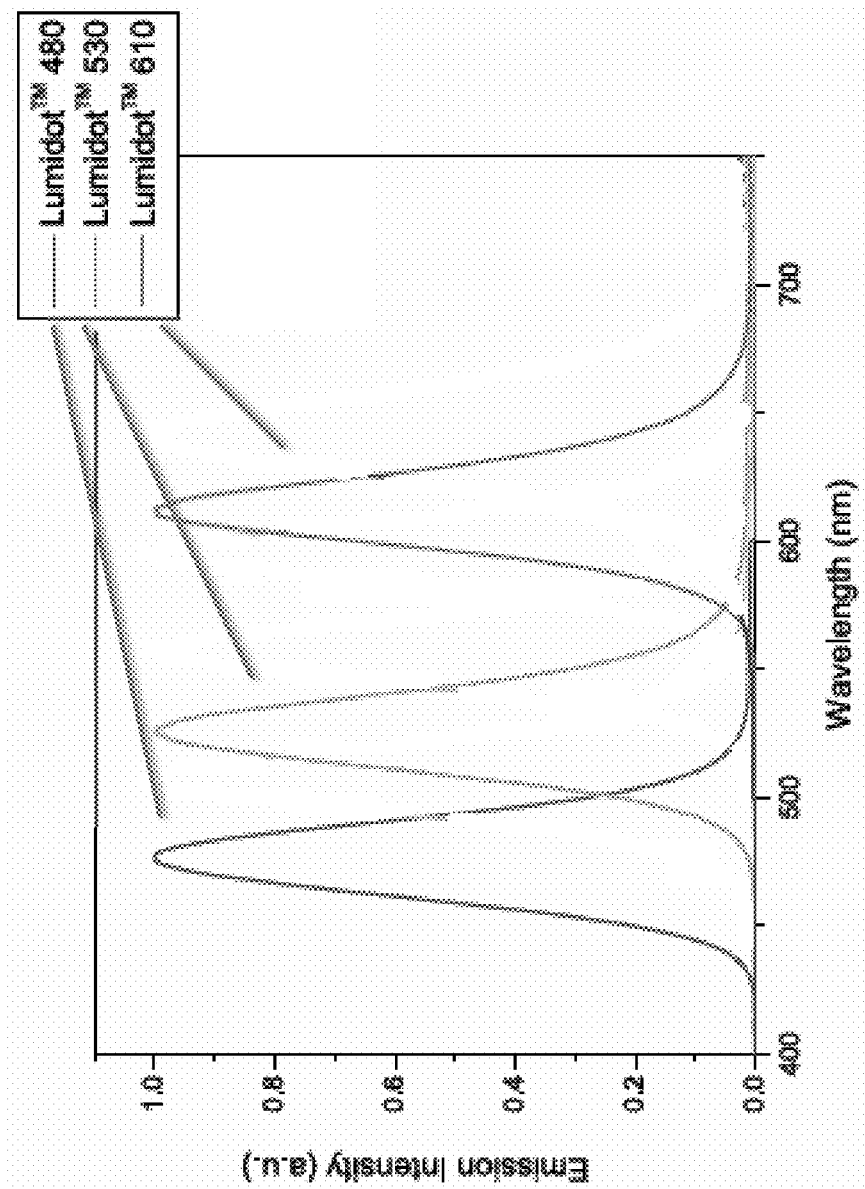

FIG. 12a illustrates another light source 1200 that may be used in association with the upper optics module 202. In embodiments, the light source 1200 may provide light to a backlighting optical system that homogenizes the light prior to illuminating the image source in the upper optics as described previously herein. In embodiments, the light source 1200 includes a quantum dot cover glass 1202. Where the quantum dots absorb light of a shorter wavelength and emit light of a longer wavelength (FIG. 12b shows an example wherein a UV spectrum 1202 applied to a quantum dot results in the quantum dot emitting a narrow band shown as a PL spectrum 1204) that is dependent on the material makeup and size of the quantum dot. As a result, quantum dots in the quantum dot cover glass 1202 can be tailored to provide one or more bands of narrow bandwidth light (e.g. red, green and blue emissions dependent on the different quantum dots included as illustrated in the graph shown in FIG. 12c where three different quantum dots are used. In embodiments, the LED driver light emits UV light, deep blue or blue light. For sequential illumination of different colors, multiple light sources 1200 would be used where each light source 1200 would include a quantum dot cover glass 1202 with at least one type of quantum dot selected to emit at one of each of the desired colors. The light source 1100 can be used in connection with a combiner 602 with a holographic mirror or tristimulus notch mirror to provide narrow bands of image light that are reflected toward the wearer's eye with less wasted image light that does not get reflected.

Another aspect of the present disclosure relates to the generation of peripheral image lighting effects for a person wearing a HWC. In embodiments, a solid state lighting system (e.g. LED, OLED, etc), or other lighting system, may be included inside the optical elements of an lower optical module 204. The solid state lighting system may be arranged such that lighting effects outside of a field of view (FOV) associated with displayed digital content is presented to create an immersive effect for the person wearing the HWC. To this end, the lighting effects may be presented to any portion of the HWC that is visible to the wearer. The solid state lighting system may be digitally controlled by an integrated processor on the HWC. In embodiments, the integrated processor will control the lighting effects in coordination with digital content that is presented within the FOV of the HWC. For example, a movie, picture, game, or other content, may be displayed or playing within the FOV of the HWC. The content may show a bomb blast on the right side of the FOV and at the same moment, the solid state lighting system inside of the upper module optics may flash quickly in concert with the FOV image effect. The effect may not be fast, it may be more persistent to indicate, for example, a general glow or color on one side of the user. The solid state lighting system may be color controlled, with red, green and blue LEDs, for example, such that color control can be coordinated with the digitally presented content within the field of view.

Figure 13A:
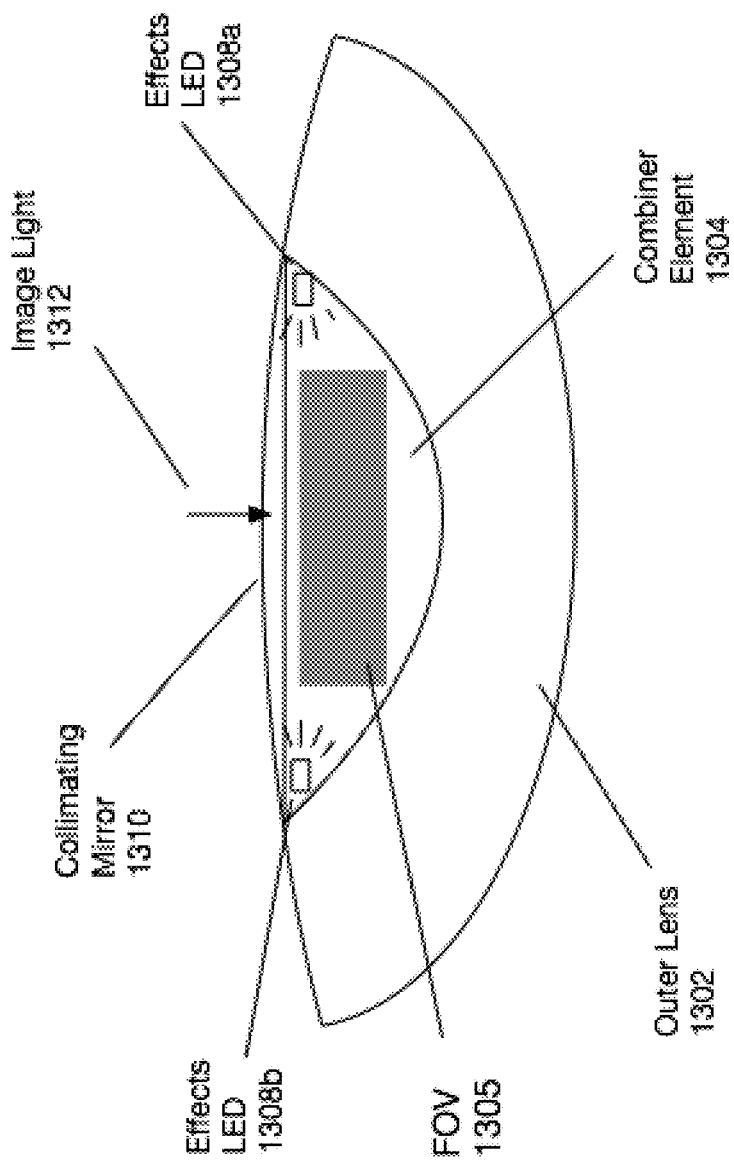

FIG. 13a illustrates optical components of a lower optical module 204 together with an outer lens 1302. FIG. 13a also shows an embodiment including effects LED's 1308a and 1308b. FIG. 13a illustrates image light 1312, as described herein elsewhere, directed into the upper optical module where it will reflect off of the combiner element 1304, as described herein elsewhere. The combiner element 1304 in this embodiment is angled towards the wearer's eye at the top of the module and away from the wearer's eye at the bottom of the module, as also illustrated and described in connection with FIG. 8 (e.g. at a 45 degree angle). The image light 1312 provided by an upper optical module 202 (not shown in FIG. 13a) reflects off of the combiner element 1304 towards the collimating mirror 1310, away from the wearer's eye, as described herein elsewhere. The image light 1312 then reflects and focuses off of the collimating mirror 1304, passes back through the combiner element 1304, and is directed into the wearer's eye. The wearer can also view the surrounding environment through the transparency of the combiner element 1304, collimating mirror 1310, and outer lens 1302 (if it is included). As described herein elsewhere, the image light may or may not be polarized and the see-through view of the surrounding environment is preferably non-polarized to provide a view of the surrounding environment that does not include rainbow interference patterns if the light from the surrounding environment is polarized such as from a computer monitor or reflections from a lake. The wearer will generally perceive that the image light forms an image in the FOV 1305. In embodiments, the outer lens 1302 may be included. The outer lens 1302 is an outer lens that may or may not be corrective and it may be designed to conceal the lower optical module components in an effort to make the HWC appear to be in a form similar to standard glasses or sunglasses.

In the embodiment illustrated in FIG. 13a, the effects LEDs 1308a and 1308b are positioned at the sides of the combiner element 1304 and the outer lens 1302 and/or the collimating mirror 1310. In embodiments, the effects LEDs 1308a are positioned within the confines defined by the combiner element 1304 and the outer lens 1302 and/or the collimating mirror. The effects LEDs 1308a and 1308b are also positioned outside of the FOV 1305 associated with the displayed digital content. In this arrangement, the effects LEDs 1308a and 1308b can provide lighting effects within the lower optical module outside of the FOV 1305. In embodiments the light emitted from the effects LEDs 1308a and 1308b may be polarized and the outer lens 1302 may include a polarizer such that the light from the effects LEDs 1308a and 1308b will pass through the combiner element 1304 toward the wearer's eye and will be absorbed by the outer lens 1302. This arrangement provides peripheral lighting effects to the wearer in a more private setting by not transmitting the lighting effects through the front of the HWC into the surrounding environment. However, in other embodiments, the effects LEDs 1308a and 1308b may be non-polarized so the lighting effects provided are made to be purposefully viewable by others in the environment for entertainment such as giving the effect of the wearer's eye glowing in correspondence to the image content being viewed by the wearer.

Figure 13B:
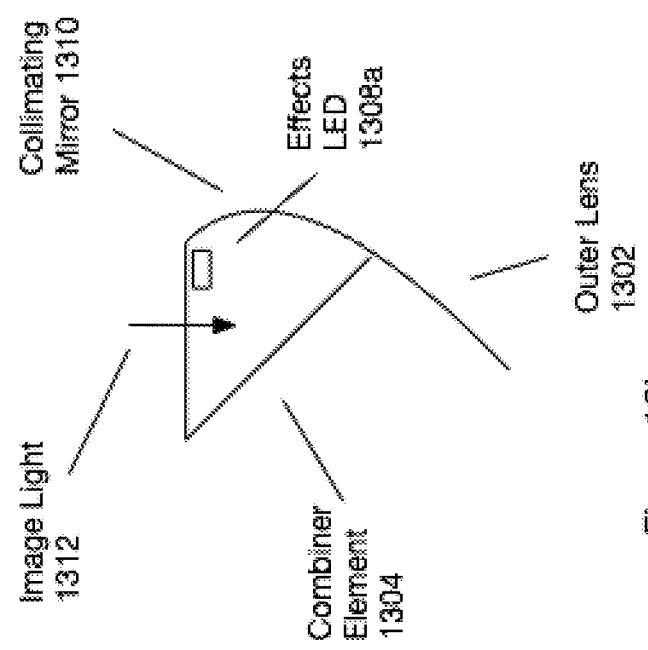

FIG. 13b illustrates a cross section of the embodiment described in connection with FIG. 13a. As illustrated, the effects LED 1308a is located in the upper-front area inside of the optical components of the lower optical module. It should be understood that the effects LED 1308a position in the described embodiments is only illustrative and alternate placements are encompassed by the present disclosure. Additionally, in embodiments, there may be one or more effects LEDs 1308a in each of the two sides of HWC to provide peripheral lighting effects near one or both eyes of the wearer.

FIG. 13c illustrates an embodiment where the combiner element 1304 is angled away from the eye at the top and towards the eye at the bottom (e.g. in accordance with the holographic or notch filter embodiments described herein). In this embodiment, the effects LED 1308a may be located on the outer lens 1302 side of the combiner element 1304 to provide a concealed appearance of the lighting effects. As with other embodiments, the effects LED 1308a of FIG. 13c may include a polarizer such that the emitted light can pass through a polarized element associated with the combiner element 1304 and be blocked by a polarized element associated with the outer lens 1302. Alternatively the effects LED 13087a can be configured such that at least a portion of the light is reflected away from the wearer's eye so that it is visible to people in the surrounding environment. This can be accomplished for example by using a combiner 1304 that is a simple partial mirror so that a portion of the image light 1312 is reflected toward the wearer's eye and a first portion of the light from the effects LED 13087a is transmitted toward the wearer's eye and a second portion of the light from the effects LED 1308a is reflected outward toward the surrounding environment.

FIGS. 14a, 14b, 14c and 14d show illustrations of a HWC that includes eye covers 1402 to restrict loss of image light to the surrounding environment and to restrict the ingress of stray light from the environment. Where the eye covers 1402 can be removably attached to the HWC with magnets 1404.

Another aspect of the present disclosure relates to automatically configuring the lighting system(s) used in the HWC 102. In embodiments, the display lighting and/or effects lighting, as described herein, may be controlled in a manner suitable for when an eye cover 1402 is attached or removed from the HWC 102. For example, at night, when the light in the environment is low, the lighting system(s) in the HWC may go into a low light mode to further control any amounts of stray light escaping from the HWC and the areas around the HWC. Covert operations at night, while using night vision or standard vision, may require a solution which prevents as much escaping light as possible so a user may clip on the eye cover(s) 1402 and then the HWC may go into a low light mode. The low light mode may, in some embodiments, only go into a low light mode when the eye cover 1402 is attached if the HWC identifies that the environment is in low light conditions (e.g. through environment light level sensor detection). In embodiments, the low light level may be determined to be at an intermediate point between full and low light dependent on environmental conditions.

Another aspect of the present disclosure relates to automatically controlling the type of content displayed in the HWC when eye covers 1402 are attached or removed from the HWC. In embodiments, when the eye cover(s) 1402 is attached to the HWC, the displayed content may be restricted in amount or in color amounts. For example, the display(s) may go into a simple content delivery mode to restrict the amount of information displayed. This may be done to reduce the amount of light produced by the display(s). In an embodiment, the display(s) may change from color displays to monochrome displays to reduce the amount of light produced. In an embodiment, the monochrome lighting may be red to limit the impact on the wearer's eyes to maintain an ability to see better in the dark.

Another aspect of the present disclosure relates to a system adapted to quickly convert from a see-through system to a non-see-through or very low transmission see-through system for a more immersive user experience. The conversion system may include replaceable lenses, an eye cover, and optics adapted to provide user experiences in both modes. The outer lenses, for example, may be 'blacked-out' with an opaque cover 1412 to provide an experience where all of the user's attention is dedicated to the digital content and then the outer lenses may be switched out for high see-through lenses so the digital content is augmenting the user's view of the surrounding environment. Another aspect of the disclosure relates to low transmission outer lenses that permit the user to see through the outer lenses but remain dark enough to maintain most of the user's attention on the digital content. The slight see-through can provide the user with a visual connection to the surrounding environment and this can reduce or eliminate nausea and other problems associated with total removal of the surrounding view when viewing digital content.

FIG. 14d illustrates a head-worn computer system 102 with a see-through digital content display 204 adapted to include a removable outer lens 1414 and a removable eye cover 1402. The eye cover 1402 may be attached to the head-worn computer 102 with magnets 1404 or other attachment systems (e.g. mechanical attachments, a snug friction fit between the arms of the head-worn computer 102, etc.). The eye cover 1402 may be attached when the user wants to cut stray light from escaping the confines of the head-worn computer, create a more immersive experience by removing the otherwise viewable peripheral view of the surrounding environment, etc. The removable outer lens 1414 may be of several varieties for various experiences. It may have no transmission or a very low transmission to create a dark background for the digital content, creating an immersive experience for the digital content. It may have a high transmission so the user can see through the see-through display and the outer lens 1414 to view the surrounding environment, creating a system for a heads-up display, augmented reality display, assisted reality display, etc. The outer lens 1414 may be dark in a middle portion to provide a dark background for the digital content (i.e. dark backdrop behind the see-through field of view from the user's perspective) and a higher transmission area elsewhere. The outer lenses 1414 may have a transmission in the range of 2 to 5%, 5 to 10%, 10 to 20% for the immersion effect and above 10% or 20% for the augmented reality effect, for example. The outer lenses 1414 may also have an adjustable transmission to facilitate the change in system effect. For example, the outer lenses 1414 may be electronically adjustable tint lenses (e.g. liquid crystal or have crossed polarizers with an adjustment for the level of cross).

In embodiments, the eye cover 1402 may have areas of transparency or partial transparency to provide some visual connection with the user's surrounding environment. This may also reduce or eliminate nausea or other feelings associated with the complete removal of the view of the surrounding environment.

Figure 14A:
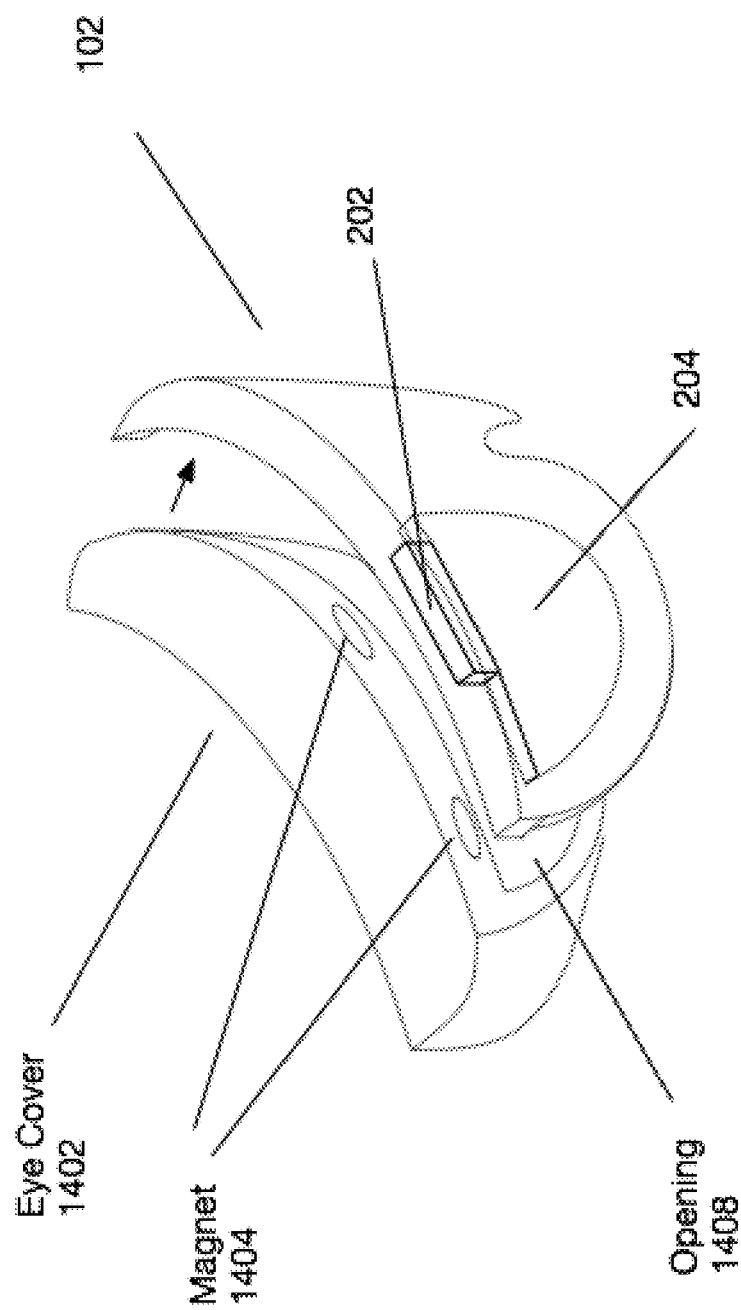
Figure 14B:
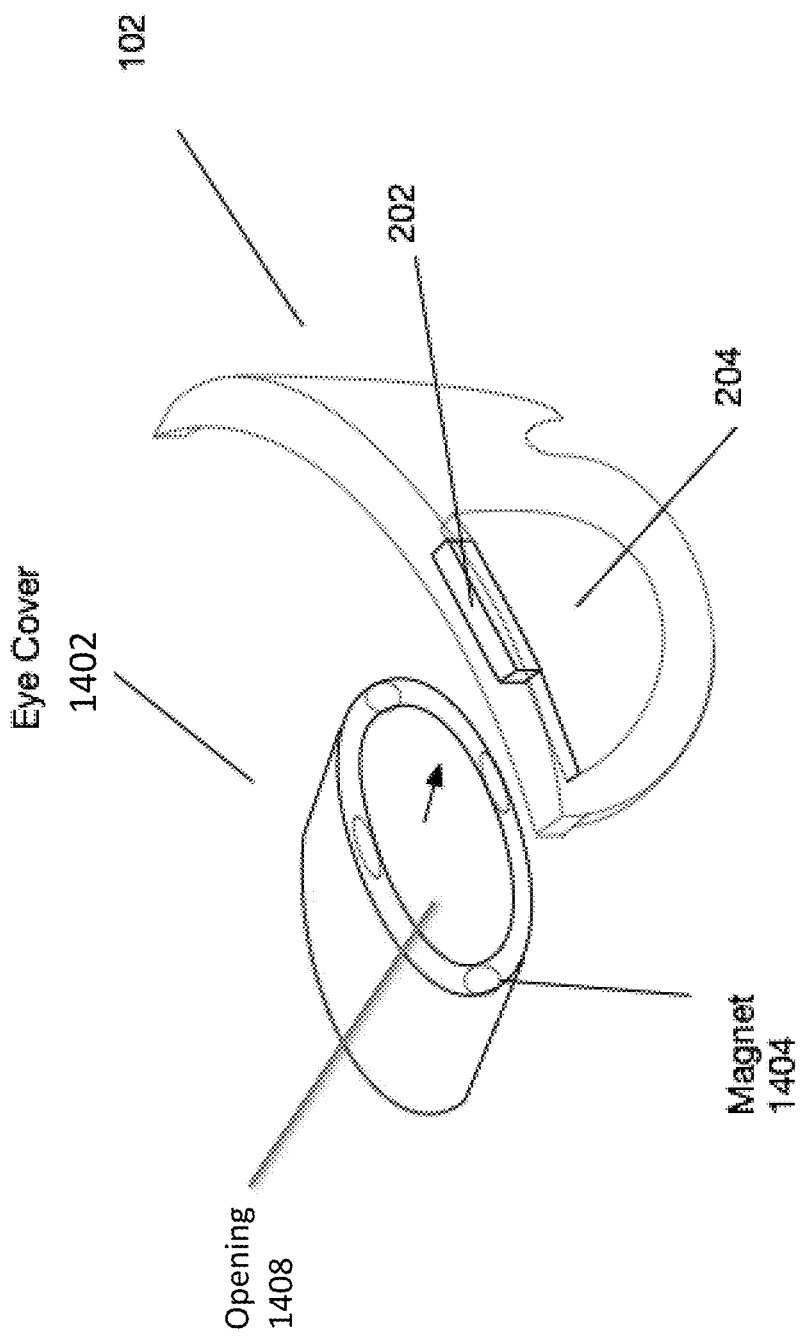
Figure 14C:
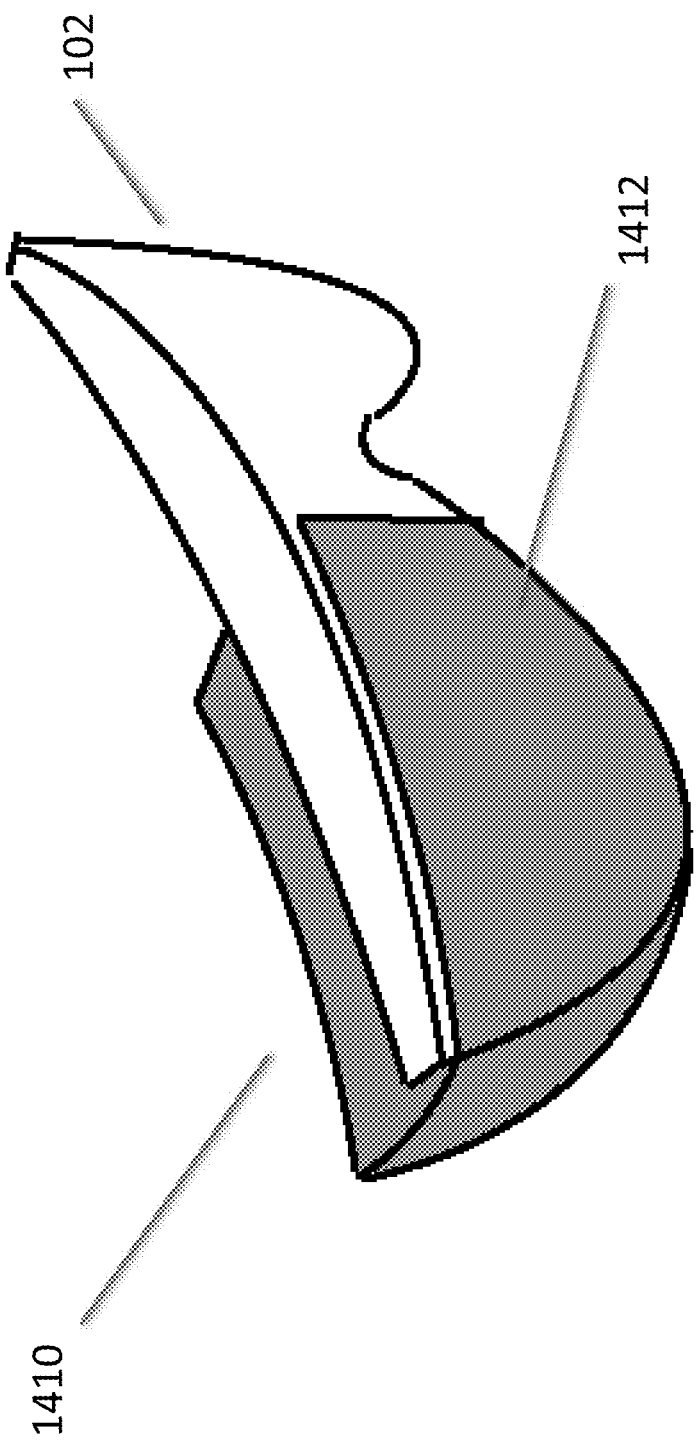
Figure 14E:
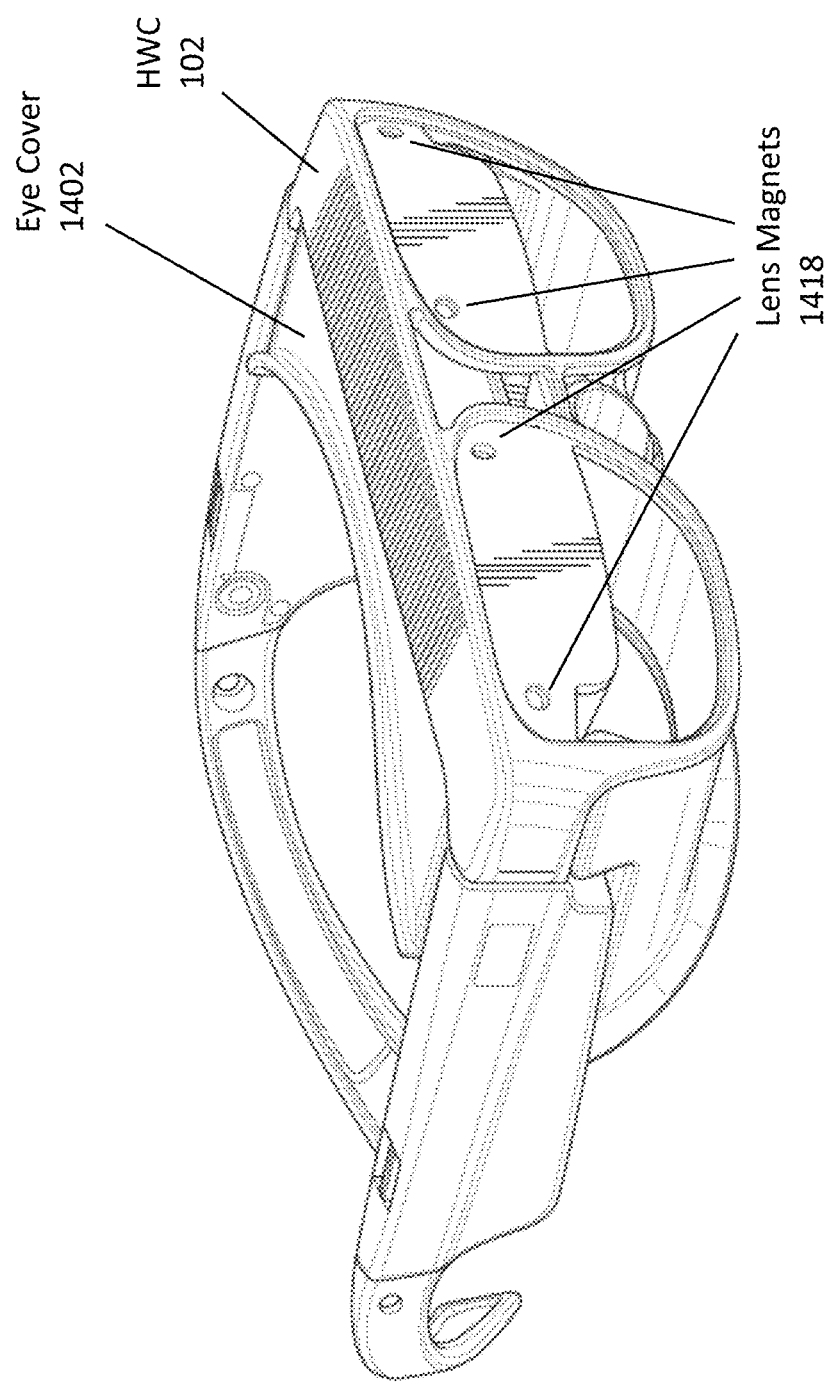

FIG. 14e illustrates a HWC 102 assembled with an eye cover 1402 without outer lenses in place. The outer lenses, in embodiments, may be held in place with magnets 1418 for ease of removal and replacement. In embodiments, the outer lenses may be held in place with other systems, such as mechanical systems.

Figure 14F:
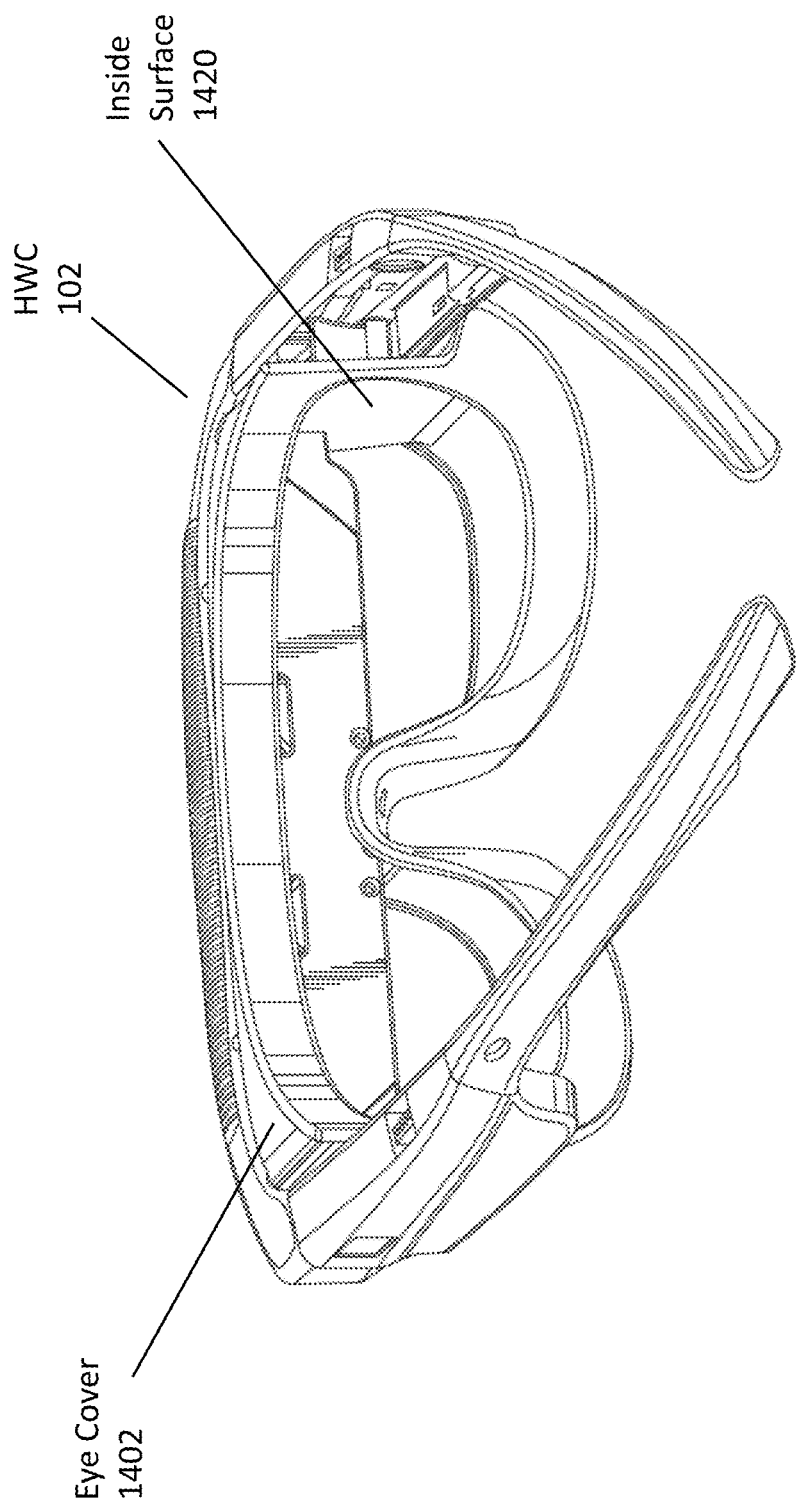

Another aspect of the present disclosure relates to an effects system that generates effects outside of the field of view in the see-through display of the head-worn computer. The effects may be, for example, lighting effects, sound effects, tactile effects (e.g. through vibration), air movement effects, etc. In embodiments, the effect generation system is mounted on the eye cover 1402. For example, a lighting system (e.g. LED(s), OLEDs, etc.) may be mounted on an inside surface 1420, or exposed through the inside surface 1420, as illustrated in FIG. 14f, such that they can create a lighting effect (e.g. a bright light, colored light, subtle color effect) in coordination with content being displayed in the field of view of the see-through display. The content may be a movie or a game, for example, and an explosion may happen on the right side of the content, as scripted, and matching the content, a bright flash may be generated by the effects lighting system to create a stronger effect. As another example, the effects system may include a vibratory system mounted near the sides or temples, or otherwise, and when the same explosion occurs, the vibratory system may generate a vibration on the right side to increase the user experience indicating that the explosion had a real sound wave creating the vibration. As yet a further example, the effects system may have an air system where the effect is a puff of air blown onto the user's face. This may create a feeling of closeness with some fast moving object in the content. The effects system may also have speakers directed towards the user's ears or an attachment for ear buds, etc.

In embodiments, the effects generated by the effects system may be scripted by an author to coordinate with the content. In embodiments, sensors may be placed inside of the eye cover to monitor content effects (e.g. a light sensor to measure strong lighting effects or peripheral lighting effects) that would than cause an effect(s) to be generated.

The effects system in the eye cover may be powered by an internal battery and the battery, in embodiments, may also provide additional power to the head-worn computer 102 as a back-up system. In embodiments, the effects system is powered by the batteries in the head-worn computer. Power may be delivered through the attachment system (e.g. magnets, mechanical system) or a dedicated power system.

The effects system may receive data and/or commands from the head-worn computer through a data connection that is wired or wireless. The data may come through the attachment system, a separate line, or through Bluetooth or other short range communication protocol, for example.

In embodiments, the eye cover 1402 is made of reticulated foam, which is very light and can contour to the user's face. The reticulated foam also allows air to circulate because of the open-celled nature of the material, which can reduce user fatigue and increase user comfort. The eye cover 1402 may be made of other materials, soft, stiff, priable, etc. and may have another material on the periphery that contacts the face for comfort. In embodiments, the eye cover 1402 may include a fan to exchange air between an external environment and an internal space, where the internal space is defined in part by the face of the user. The fan may operate very slowly and at low power to exchange the air to keep the face of the user cool. In embodiments the fan may have a variable speed controller and/or a temperature sensor may be positioned to measure temperature in the internal space to control the temperature in the internal space to a specified range, temperature, etc. The internal space is generally characterized by the space confined space in front of the user's eyes and upper cheeks where the eye cover encloses the area.

Another aspect of the present disclosure relates to flexibly mounting an audio headset on the head-worn computer 102 and/or the eye cover 1402. In embodiments, the audio headset is mounted with a relatively rigid system that has flexible joint(s) (e.g. a rotational joint at the connection with the eye cover, a rotational joint in the middle of a rigid arm, etc.) and extension(s) (e.g. a telescopic arm) to provide the user with adjustability to allow for a comfortable fit over, in or around the user's ear. In embodiments, the audio headset is mounted with a flexible system that is more flexible throughout, such as with a wire-based connection.

FIG. 14g illustrates a head-worn computer 102 with removable lenses 1414 along with a mounted eye cover 1402. The head-worn computer, in embodiments, includes a see-through display (as disclosed herein). The eye cover 1402 also includes a mounted audio headset 1422. The mounted audio headset 1422 in this embodiment is mounted to the eye cover 1402 and has audio wire connections (not shown). In embodiments, the audio wires' connections may connect to an internal wireless communication system (e.g. Bluetooth, NFC, WiFi) to make connection to the processor in the head-worn computer. In embodiments, the audio wires may connect to a magnetic connector, mechanical connector or the like to make the connection.

FIG. 14h illustrates an unmounted eye cover 1402 with a mounted audio headset 1422. As illustrated, the mechanical design of the eye cover is adapted to fit onto the head-worn computer to provide visual isolation or partial isolation and the audio headset.

In embodiments, the eye cover 1402 may be adapted to be removably mounted on a head-worn computer 102 with a see-through computer display. An audio headset 1422 with an adjustable mount may be connected to the eye cover, wherein the adjustable mount may provide extension and rotation to provide a user of the head-worn computer with a mechanism to align the audio headset with an ear of the user. In embodiments, the audio headset includes an audio wire connected to a connector on the eye cover and the eye cover connector may be adapted to removably mate with a connector on the head-worn computer. In embodiments, the audio headset may be adapted to receive audio signals from the head-worn computer 102 through a wireless connection (e.g. Bluetooth, WiFi). As described elsewhere herein, the head-worn computer 102 may have a removable and replaceable front lens 1414. The eye cover 1402 may include a battery to power systems internal to the eye cover 1402. The eye cover 1402 may have a battery to power systems internal to the head-worn computer 102.

In embodiments, the eye cover 1402 may include a fan adapted to exchange air between an internal space, defined in part by the user's face, and an external environment to cool the air in the internal space and the user's face. In embodiments, the audio headset 1422 may include a vibratory system (e.g. a vibration motor, piezo motor, etc. in the armature and/or in the section over the ear) adapted to provide the user with a haptic feedback coordinated with digital content presented in the see-through computer display. In embodiments, the head-worn computer 102 includes a vibratory system adapted to provide the user with a haptic feedback coordinated with digital content presented in the see-through computer display.

In embodiments, the eye cover 1402 is adapted to be removably mounted on a head-worn computer with a see-through computer display. The eye cover 1402 may also include a flexible audio headset mounted to the eye cover 1402, wherein the flexibility provides the user of the head-worn computer 102 with a mechanism to align the audio headset with an ear of the user. In embodiments, the flexible audio headset is mounted to the eye cover 1402 with a magnetic connection. In embodiments, the flexible audio headset may be mounted to the eye cover 1402 with a mechanical connection.

In embodiments, the audio headset 1422 may be spring or otherwise loaded such that the head set presses inward towards the user's ears for a more secure fit.

Referring to FIG. 15, we now turn to describe a particular external user interface 104, referred to generally as a pen 1500. The pen 1500 is a specially designed external user interface 104 and can operate as a user interface, to many different styles of HWC 102. The pen 1500 generally follows the form of a conventional pen, which is a familiar user handled device and creates an intuitive physical interface for many of the operations to be carried out in the HWC system 100. The pen 1500 may be one of several user interfaces 104 used in connection with controlling operations within the HWC system 100. For example, the HWC 102 may watch for and interpret hand gestures 116 as control signals, where the pen 1500 may also be used as a user interface with the same HWC 102. Similarly, a remote keyboard may be used as an external user interface 104 in concert with the pen 1500. The combination of user interfaces or the use of just one control system generally depends on the operation(s) being executed in the HWC's system 100.

While the pen 1500 may follow the general form of a conventional pen, it contains numerous technologies that enable it to function as an external user interface 104. FIG. 15 illustrates technologies comprised in the pen 1500. As can be seen, the pen 1500 may include a camera 1508, which is arranged to view through lens 1502. The camera may then be focused, such as through lens 1502, to image a surface upon which a user is writing or making other movements to interact with the HWC 102. There are situations where the pen 1500 will also have an ink, graphite, or other system such that what is being written can be seen on the writing surface. There are other situations where the pen 1500 does not have such a physical writing system so there is no deposit on the writing surface, where the pen would only be communicating data or commands to the HWC 102. The lens 1502 configuration is described in greater detail herein. The function of the camera 1508 is to capture information from an unstructured writing surface such that pen strokes can be interpreted as intended by the user. To assist in the predication of the intended stroke path, the pen 1500 may include a sensor, such as an IMU 1512. Of course, the IMU could be included in the pen 1500 in its separate parts (e.g. gyro, accelerometer, etc.) or an IMU could be included as a single unit. In this instance, the IMU 1512 is used to measure and predict the motion of the pen 1500. In turn, the integrated microprocessor 1510 would take the IMU information and camera information as inputs and process the information to form a prediction of the pen tip movement.

The pen 1500 may also include a pressure monitoring system 1504, such as to measure the pressure exerted on the lens 1502. As will be described in greater detail herein, the pressure measurement can be used to predict the user's intention for changing the weight of a line, type of a line, type of brush, click, double click, and the like. In embodiments, the pressure sensor may be constructed using any force or pressure measurement sensor located behind the lens 1502, including for example, a resistive sensor, a current sensor, a capacitive sensor, a voltage sensor such as a piezoelectric sensor, and the like.

The pen 1500 may also include a communications module 1518, such as for bi-directional communication with the HWC 102. In embodiments, the communications module 1518 may be a short distance communication module (e.g. Bluetooth). The communications module 1518 may be security matched to the HWC 102. The communications module 1518 may be arranged to communicate data and commands to and from the microprocessor 1510 of the pen 1500. The microprocessor 1510 may be programmed to interpret data generated from the camera 1508, IMU 1512, and pressure sensor 1504, and the like, and then pass a command onto the HWC 102 through the communications module 1518, for example. In another embodiment, the data collected from any of the input sources (e.g. camera 1508, IMU 1512, pressure sensor 1504) by the microprocessor may be communicated by the communication module 1518 to the HWC 102, and the HWC 102 may perform data processing and prediction of the user's intention when using the pen 1500. In yet another embodiment, the data may be further passed on through a network 110 to a remote device 112, such as a server, for the data processing and prediction. The commands may then be communicated back to the HWC 102 for execution (e.g. display writing in the glasses display, make a selection within the UI of the glasses display, control a remote external device 112, control a local external device 108), and the like. The pen may also include memory 1514 for long or short term uses.

The pen 1500 may also include a number of physical user interfaces, such as quick launch buttons 1522, a touch sensor 1520, and the like. The quick launch buttons 1522 may be adapted to provide the user with a fast way of jumping to a software application in the HWC system 100. For example, the user may be a frequent user of communication software packages (e.g. email, text, Twitter, Instagram, Facebook, Google+, and the like), and the user may program a quick launch button 1522 to command the HWC 102 to launch an application. The pen 1500 may be provided with several quick launch buttons 1522, which may be user programmable or factory programmable. The quick launch button 1522 may be programmed to perform an operation. For example, one of the buttons may be programmed to clear the digital display of the HWC 102. This would create a fast way for the user to clear the screens on the HWC 102 for any reason, such as for example to better view the environment. The quick launch button functionality will be discussed in further detail below. The touch sensor 1520 may be used to take gesture style input from the user. For example, the user may be able to take a single finger and run it across the touch sensor 1520 to affect a page scroll.

The pen 1500 may also include a laser pointer 1524. The laser pointer 1524 may be coordinated with the IMU 1512 to coordinate gestures and laser pointing. For example, a user may use the laser 1524 in a presentation to help with guiding the audience with the interpretation of graphics and the IMU 1512 may, either simultaneously or when the laser 1524 is off, interpret the user's gestures as commands or data input.

Figure 16:
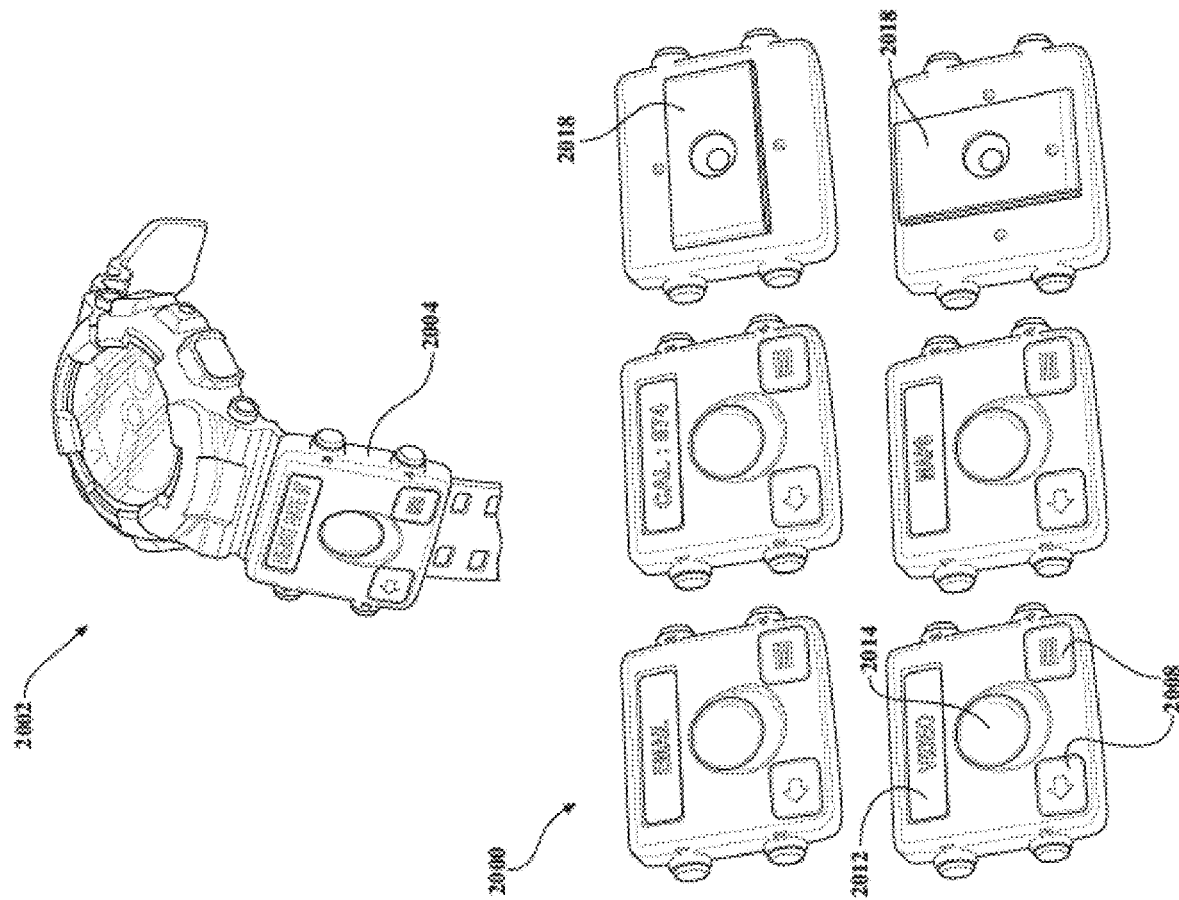
FIG. 16 illustrates external user interfaces in accordance with the principles of the present disclosure.

FIG. 16 illustrates yet another embodiment of the present disclosure. FIG. 16 illustrates a watchband clip-on controller 2000. The watchband clip-on controller may be a controller used to control the HWC 102 or devices in the HWC system 100. The watchband clip-on controller 2000 has a fastener 2018 (e.g. rotatable clip) that is mechanically adapted to attach to a watchband, as illustrated at 2004.

The watchband controller 2000 may have quick launch interfaces 2008 (e.g. to launch applications and choosers as described herein), a touch pad 2014 (e.g. to be used as a touch style mouse for GUI control in a HWC 102 display) and a display 2012. The clip 2018 may be adapted to fit a wide range of watchbands so it can be used in connection with a watch that is independently selected for its function. The clip, in embodiments, is rotatable such that a user can position it in a desirable manner. In embodiments the clip may be a flexible strap. In embodiments, the flexible strap may be adapted to be stretched to attach to a hand, wrist, finger, device, weapon, and the like.

In embodiments, the watchband controller may be configured as a removable and replacable watchband. For example, the controller may be incorporated into a band with a certain width, segment spacing's, etc. such that the watchband, with its incorporated controller, can be attached to a watch body. The attachment, in embodiments, may be mechanically adapted to attach with a pin upon which the watchband rotates. In embodiments, the watchband controller may be electrically connected to the watch and/or watch body such that the watch, watch body and/or the watchband controller can communicate data between them.

The watchband controller 2000 may have 3-axis motion monitoring (e.g. through an IMU, accelerometers, magnetometers, gyroscopes, etc.) to capture user motion. The user motion may then be interpreted for gesture control.

In embodiments, the watchband controller 2000 may comprise fitness sensors and a fitness computer. The sensors may track heart rate, calories burned, strides, distance covered, and the like. The data may then be compared against performance goals and/or standards for user feedback.

Figure 17:
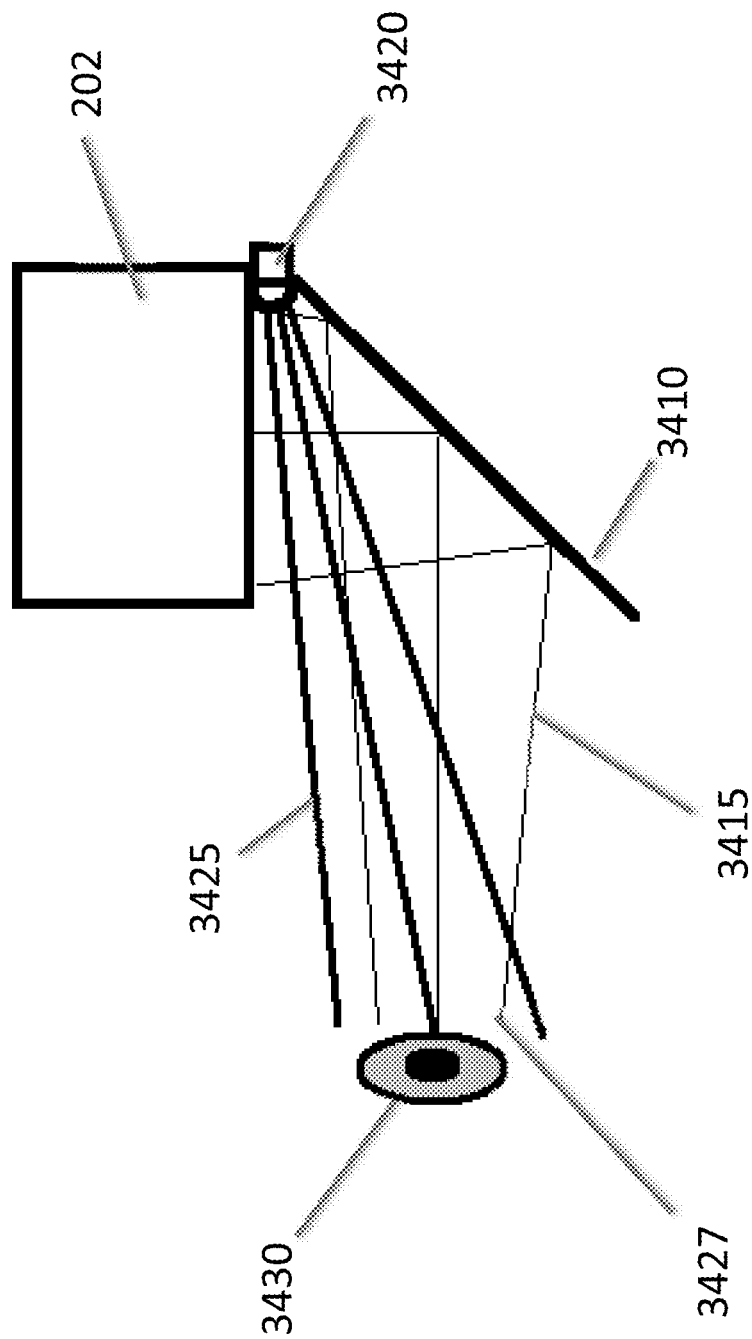
FIGS. 17 and 18 illustrate structured eye lighting systems according to the principles of the present disclosure.
Figure 18:
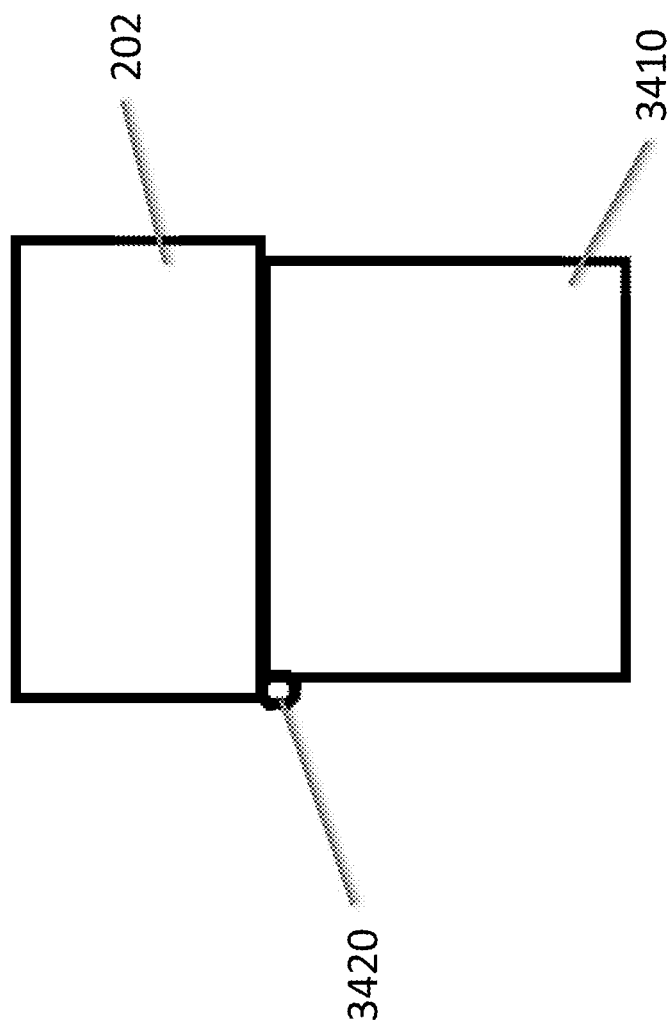

In embodiments directed to capturing images of the wearer's eye, light to illuminate the wearer's eye can be provided by several different sources including: light from the displayed image (i.e. image light); light from the environment that passes through the combiner or other optics; light provided by a dedicated eye light, etc. FIGS. 17 and 18 show illustrations of dedicated eye illumination lights 3420.

FIG. 17 shows an illustration from a side view in which the dedicated illumination eye light 3420 is positioned at a corner of the combiner 3410 so that it doesn't interfere with the image light 3415. The dedicated eye illumination light 3420 is pointed so that the eye illumination light 3425 illuminates the eyebox 3427 where the eye 3430 is located when the wearer is viewing displayed images provided by the image light 3415. FIG. 18 shows an illustration from the perspective of the eye of the wearer to show how the dedicated eye illumination light 3420 is positioned at the corner of the combiner 3410. While the dedicated eye illumination light 3420 is shown at the upper left corner of the combiner 3410, other positions along one of the edges of the combiner 3410, or other optical or mechanical components, are possible as well. In other embodiments, more than one dedicated eye light 3420 with different positions can be used. In an embodiment, the dedicated eye light 3420 is an infrared light that is not visible by the wearer (e.g. 800 nm) so that the eye illumination light 3425 doesn't interfere with the displayed image perceived by the wearer.

In embodiments, the eye imaging camera is inline with the image light optical path, or part of the image light optical path. For example, the eye camera may be positioned in the upper module to capture eye image light that reflects back through the optical system towards the image display. The eye image light may be captured after reflecting off of the image source (e.g. in a DLP configuration where the mirrors can be positioned to reflect the light towards the eye image light camera), a partially reflective surface may be placed along the image light optical path such that when the eye image light reflects back into the upper or lower module that it is reflected in a direction that the eye imaging camera can capture light eye image light. In other embodiments, the eye image light camera is positioned outside of the image light optical path. For example, the camera(s) may be positioned near the outer lens of the platform.

Figure 19:
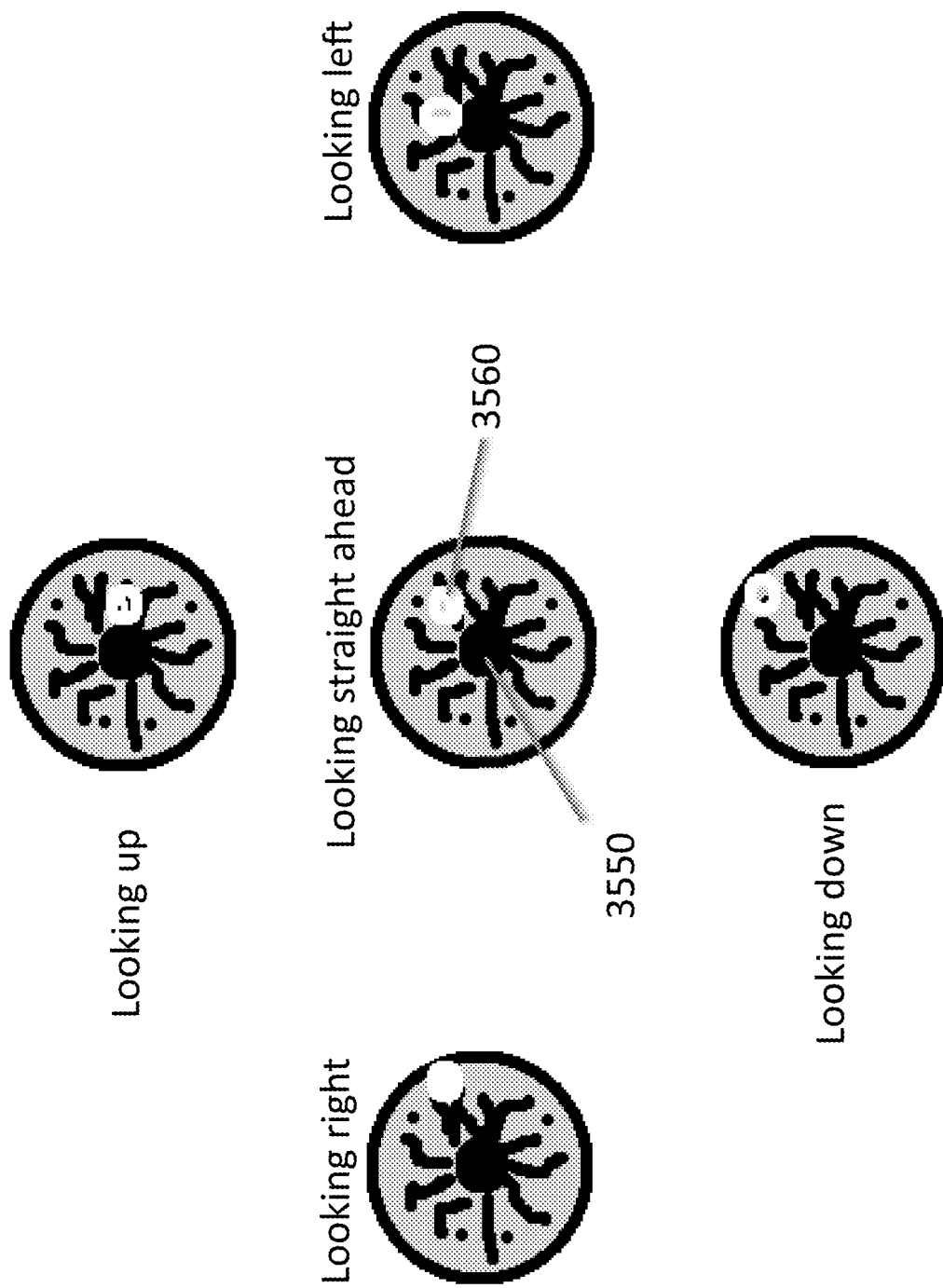
FIG. 19 illustrates eye glint in the prediction of eye direction analysis in accordance with the principles of the present disclosure.

FIG. 19 shows a series of illustrations of captured eye images that show the eye glint (i.e. light that reflects off the front of the eye) produced by a dedicated eye light mounted adjacent to the combiner as previously described herein. In this embodiment of the disclosure, captured images of the wearer's eye are analyzed to determine the relative positions of the iris 3550, pupil, or other portion of the eye, and the eye glint 3560. The eye glint is a reflected image of the dedicated eye light 3420 when the dedicated light is used. FIG. 19 illustrates the relative positions of the iris 3550 and the eye glint 3560 for a variety of eye positions. By providing a dedicated eye light 3420 in a fixed position, combined with the fact that the human eye is essentially spherical, or at least a reliably repeatable shape, the eye glint provides a fixed reference point against which the determined position of the iris can be compared to determine where the wearer is looking, either within the displayed image or within the see-through view of the surrounding environment. By positioning the dedicated eye light 3420 at a corner of the combiner 3410, the eye glint 3560 is formed away from the iris 3550 in the captured images. As a result, the positions of the iris and the eye glint can be determined more easily and more accurately during the analysis of the captured images, since they do not interfere with one another. In a further embodiment, the combiner includes an associated cut filter that prevents infrared light from the environment from entering the HWC and the eye camera is an infrared camera, so that the eye glint 3560 is only provided by light from the dedicated eye light. For example, the combiner can include a low pass filter that passes visible light while reflecting infrared light from the environment away from the eye camera, reflecting infrared light from the dedicated eye light toward the user's eye and the eye camera can include a high pass filter that absorbs visible light associated with the displayed image while passing infrared light associated with the eye image.

In an embodiment of the eye imaging system, the lens for the eye camera is designed to take into account the optics associated with the upper module 202 and the lower module 204. This is accomplished by designing the eye camera to include the optics in the upper module 202 and optics in the lower module 204, so that a high MTF image is produced, at the image sensor in the eye camera, of the wearer's eye. In yet a further embodiment, the eye camera lens is provided with a large depth of field to eliminate the need for focusing the eye camera to enable sharp images of the eye to be captured. Where a large depth of field is typically provided by a high f/# lens (e.g. f/#>5). In this case, the reduced light gathering associated with high f/# lenses is compensated by the inclusion of a dedicated eye light to enable a bright image of the eye to be captured. Further, the brightness of the dedicated eye light can be modulated and synchronized with the capture of eye images so that the dedicated eye light has a reduced duty cycle and the brightness of infrared light on the wearer's eye is reduced.

Figures 20A, 20B:
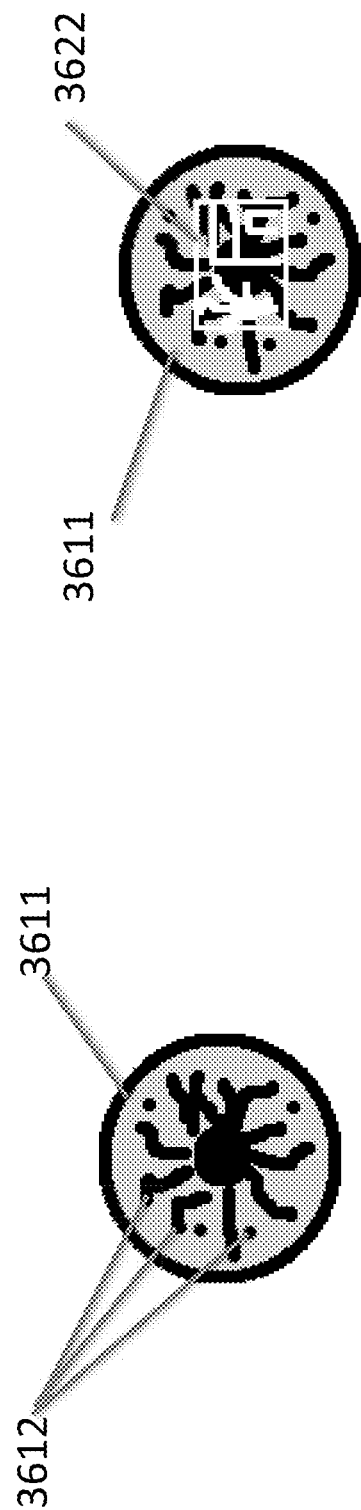
FIG. 20a illustrates eye characteristics that may be used in personal identification through analysis of a system according to the principles of the present disclosure.
FIG. 20b illustrates a digital content presentation reflection off of the wearer's eye that may be analyzed in accordance with the principles of the present disclosure.

In a further embodiment, FIG. 20a shows an illustration of an eye image that is used to identify the wearer of the HWC. In this case, an image of the wearer's eye 3611 is captured and analyzed for patterns of identifiable features 3612. The patterns are then compared to a database of eye images to determine the identity of the wearer. After the identity of the wearer has been verified, the operating mode of the HWC and the types of images, applications, and information to be displayed can be adjusted and controlled in correspondence to the determined identity of the wearer. Examples of adjustments to the operating mode depending on who the wearer is determined to be or not be include: making different operating modes or feature sets available, shutting down or sending a message to an external network, allowing guest features and applications to run, etc.

FIG. 20b is an illustration of another embodiment using eye imaging, in which the sharpness of the displayed image is determined based on the eye glint produced by the reflection of the displayed image from the wearer's eye surface. By capturing images of the wearer's eye 3611, an eye glint 3622, which is a small version of the displayed image can be captured and analyzed for sharpness. If the displayed image is determined to not be sharp, then an automated adjustment to the focus of the HWC optics can be performed to improve the sharpness. This ability to perform a measurement of the sharpness of a displayed image at the surface of the wearer's eye can provide a very accurate measurement of image quality. Having the ability to measure and automatically adjust the focus of displayed images can be very useful in augmented reality imaging where the focus distance of the displayed image can be varied in response to changes in the environment or changes in the method of use by the wearer.

An aspect of the present disclosure relates to controlling the HWC 102 through interpretations of eye imagery. In embodiments, eye-imaging technologies, such as those described herein, are used to capture an eye image or a series of eye images for processing. The image(s) may be processed to determine a user intended action, an HWC predetermined reaction, or other action. For example, the imagery may be interpreted as an affirmative user control action for an application on the HWC 102. Or, the imagery may cause, for example, the HWC 102 to react in a pre-determined way such that the HWC 102 is operating safely, intuitively, etc.

Figure 21:
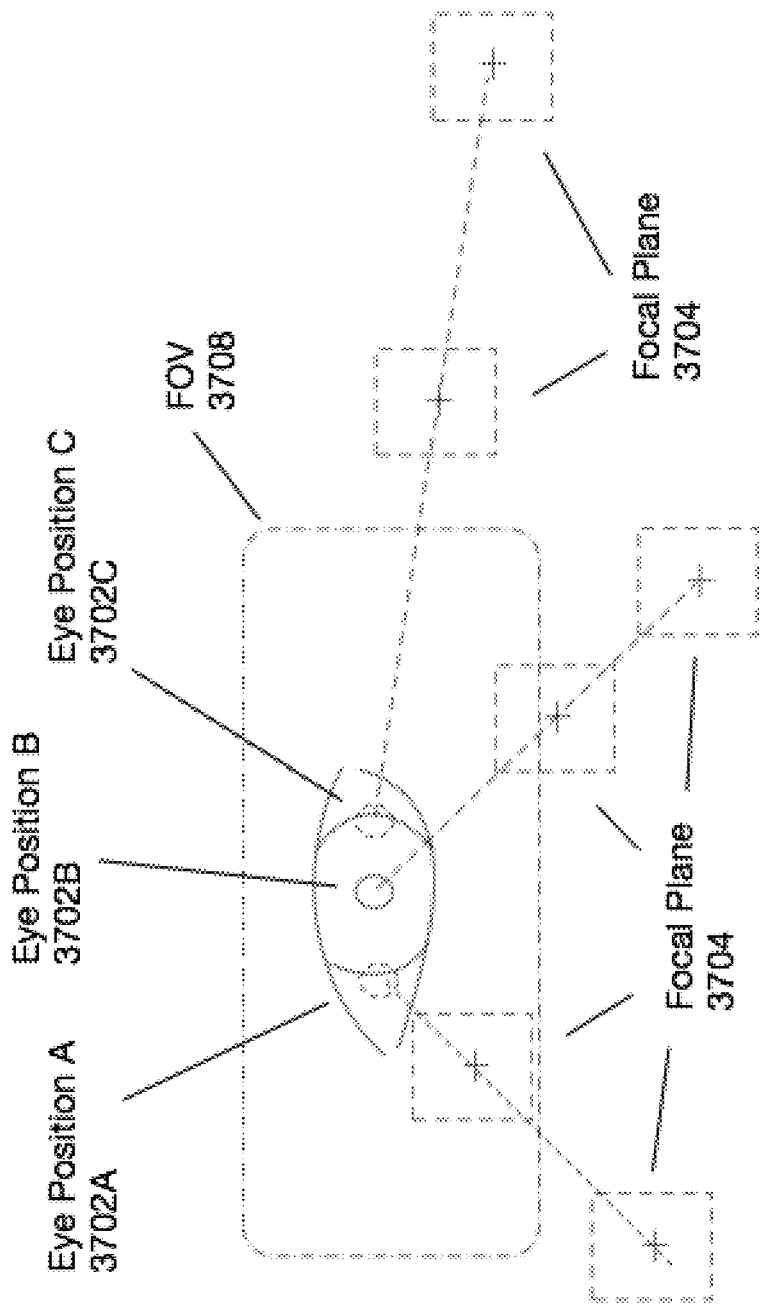
FIG. 21 illustrates eye imaging along various virtual target lines and various focal planes in accordance with the principles of the present disclosure.

FIG. 21 illustrates an eye imagery process that involves imaging the HWC 102 wearer's eye(s) and processing the images (e.g. through eye imaging technologies described herein) to determine in what position 3702 the eye is relative to it's neutral or forward looking position and/or the FOV 3708. The process may involve a calibration step where the user is instructed, through guidance provided in the FOV of the HWC 102, to look in certain directions such that a more accurate prediction of the eye position relative to areas of the FOV can be made. In the event the wearer's eye is determined to be looking towards the right side of the FOV 3708 (as illustrated in FIG. 21, the eye is looking out of the page) a virtual target line may be established to project what in the environment the wearer may be looking towards or at. The virtual target line may be used in connection with an image captured by camera on the HWC 102 that images the surrounding environment in front of the wearer. In embodiments, the field of view of the camera capturing the surrounding environment matches, or can be matched (e.g. digitally), to the FOV 3708 such that making the comparison is made more clear. For example, with the camera capturing the image of the surroundings in an angle that matches the FOV 3708 the virtual line can be processed (e.g. in 2d or 3d, depending on the camera images capabilities and/or the processing of the images) by projecting what surrounding environment objects align with the virtual target line. In the event there are multiple objects along the virtual target line, focal planes may be established corresponding to each of the objects such that digital content may be placed in an area in the FOV 3708 that aligns with the virtual target line and falls at a focal plane of an intersecting object. The user then may see the digital content when he focuses on the object in the environment, which is at the same focal plane. In embodiments, objects in line with the virtual target line may be established by comparison to mapped information of the surroundings.

In embodiments, the digital content that is in line with the virtual target line may not be displayed in the FOV until the eye position is in the right position. This may be a predetermined process. For example, the system may be set up such that a particular piece of digital content (e.g. an advertisement, guidance information, object information, etc.) will appear in the event that the wearer looks at a certain object(s) in the environment. A virtual target line(s) may be developed that virtually connects the wearer's eye with an object(s) in the environment (e.g. a building, portion of a building, mark on a building, gps location, etc.) and the virtual target line may be continually updated depending on the position and viewing direction of the wearer (e.g. as determined through GPS, e-compass, IMU, etc.) and the position of the object. When the virtual target line suggests that the wearer's pupil is substantially aligned with the virtual target line or about to be aligned with the virtual target line, the digital content may be displayed in the FOV 3704.

In embodiments, the time spent looking along the virtual target line and/or a particular portion of the FOV 3708 may indicate that the wearer is interested in an object in the environment and/or digital content being displayed. In the event there is no digital content being displayed at the time a predetermined period of time is spent looking at a direction, digital content may be presented in the area of the FOV 3708. The time spent looking at an object may be interpreted as a command to display information about the object, for example. In other embodiments, the content may not relate to the object and may be presented because of the indication that the person is relatively inactive. In embodiments, the digital content may be positioned in proximity to the virtual target line, but not inline with it such that the wearer's view of the surroundings are not obstructed but information can augment the wearer's view of the surroundings. In embodiments, the time spent looking along a target line in the direction of displayed digital content may be an indication of interest in the digital content. This may be used as a conversion event in advertising. For example, an advertiser may pay more for an add placement if the wearer of the HWC 102 looks at a displayed advertisement for a certain period of time. As such, in embodiments, the time spent looking at the advertisement, as assessed by comparing eye position with the content placement, target line or other appropriate position may be used to determine a rate of conversion or other compensation amount due for the presentation.

Figure 22:
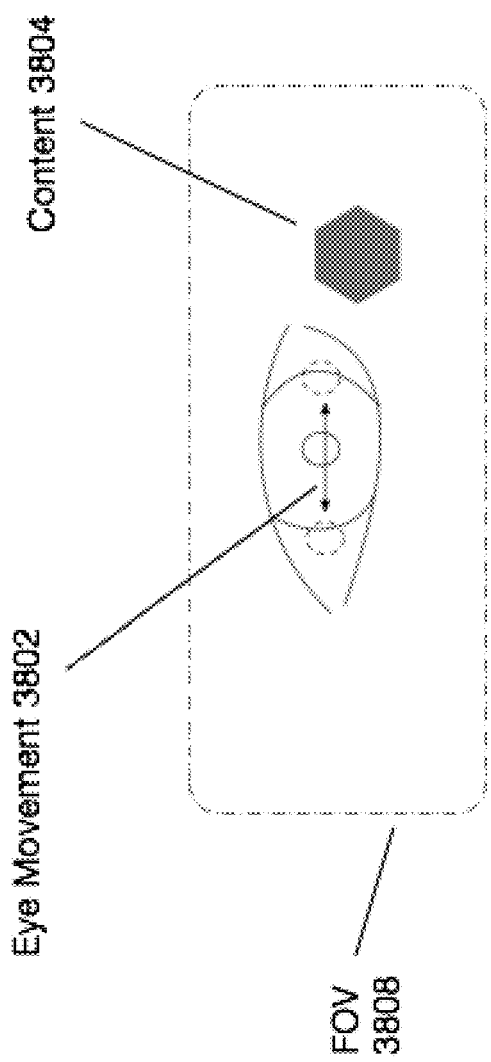
FIG. 22 illustrates content control with respect to eye movement based on eye imaging in accordance with the principles of the present disclosure.

An aspect of the disclosure relates to removing content from the FOV of the HWC 102 when the wearer of the HWC 102 apparently wants to view the surrounding environments clearly. FIG. 22 illustrates a situation where eye imagery suggests that the eye has or is moving quickly so the digital content 3804 in the FOV 3808 is removed from the FOV 3808. In this example, the wearer may be looking quickly to the side indicating that there is something on the side in the environment that has grabbed the wearer's attention. This eye movement 3802 may be captured through eye imaging techniques (e.g. as described herein) and if the movement matches a predetermined movement (e.g. speed, rate, pattern, etc.) the content may be removed from view. In embodiments, the eye movement is used as one input and HWC movements indicated by other sensors (e.g. IMU in the HWC) may be used as another indication. These various sensor movements may be used together to project an event that should cause a change in the content being displayed in the FOV.

Another aspect of the present disclosure relates to determining a focal plane based on the wearer's eye convergence. Eyes are generally converged slightly and converge more when the person focuses on something very close. This is generally referred to as convergence. In embodiments, convergence is calibrated for the wearer. That is, the wearer may be guided through certain focal plane exercises to determine how much the wearer's eyes converge at various focal planes and at various viewing angles. The convergence information may then be stored in a database for later reference. In embodiments, a general table may be used in the event there is no calibration step or the person skips the calibration step. The two eyes may then be imaged periodically to determine the convergence in an attempt to understand what focal plane the wearer is focused on. In embodiments, the eyes may be imaged to determine a virtual target line and then the eye's convergence may be determined to establish the wearer's focus, and the digital content may be displayed or altered based thereon.

Figure 23:
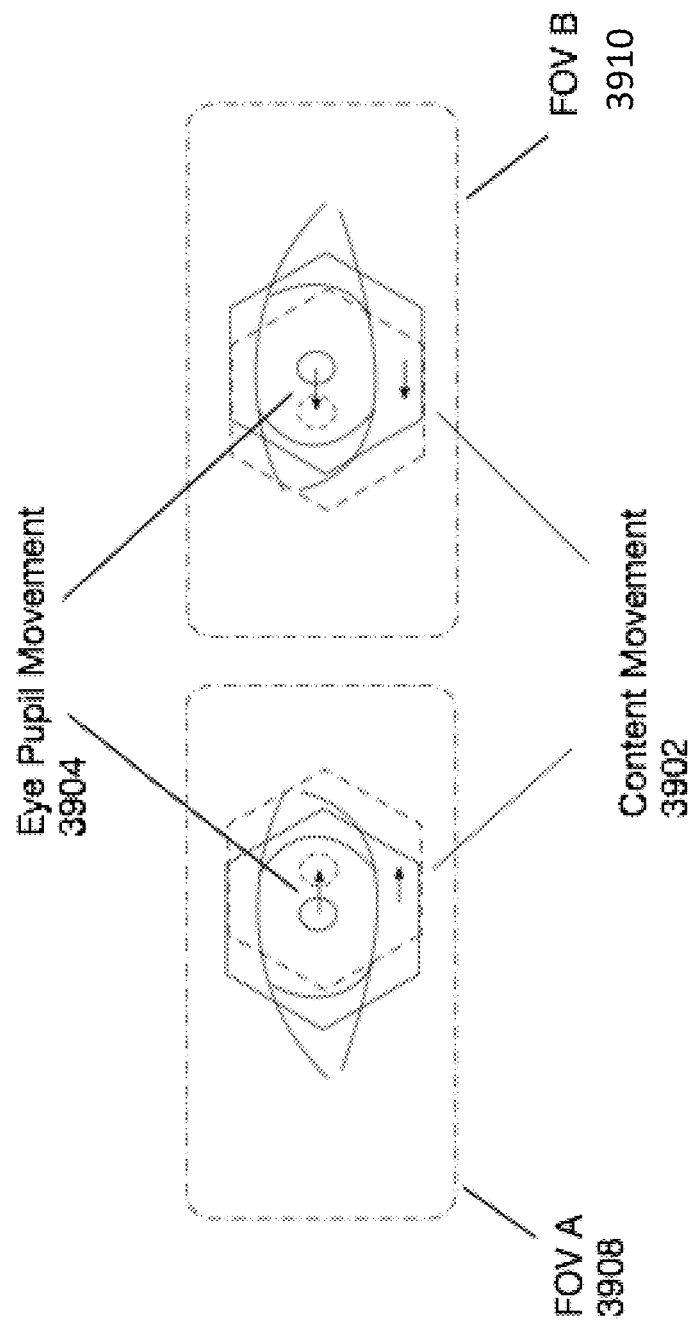
FIG. 23 illustrates eye imaging and eye convergence in accordance with the principles of the present disclosure.

FIG. 23 illustrates a situation where digital content is moved 3902 within one or both of the FOVs 3908 and 3910 to align with the convergence of the eyes as determined by the pupil movement 3904. By moving the digital content to maintain alignment, in embodiments, the overlapping nature of the content is maintained so the object appears properly to the wearer. This can be important in situations where 3D content is displayed.

An aspect of the present disclosure relates to controlling the HWC 102 based on events detected through eye imaging. A wearer winking, blinking, moving his eyes in a certain pattern, etc. may, for example, control an application of the HWC 102. Eye imaging (e.g. as described herein) may be used to monitor the eye(s) of the wearer and once a predetermined pattern is detected an application control command may be initiated.

An aspect of the disclosure relates to monitoring the health of a person wearing a HWC 102 by monitoring the wearer's eye(s). Calibrations may be made such that the normal performance, under various conditions (e.g. lighting conditions, image light conditions, etc.) of a wearer's eyes may be documented. The wearer's eyes may then be monitored through eye imaging (e.g. as described herein) for changes in their performance. Changes in performance may be indicative of a health concern (e.g. concussion, brain injury, stroke, loss of blood, etc.). If detected the data indicative of the change or event may be communicated from the HWC 102.

Aspects of the present disclosure relate to security and access of computer assets (e.g. the HWC itself and related computer systems) as determined through eye image verification. As discussed herein elsewhere, eye imagery may be compared to known person eye imagery to confirm a person's identity. Eye imagery may also be used to confirm the identity of people wearing the HWCs 102 before allowing them to link together or share files, streams, information, etc.

A variety of use cases for eye imaging are possible based on technologies described herein. An aspect of the present disclosure relates to the timing of eye image capture. The timing of the capture of the eye image and the frequency of the capture of multiple images of the eye can vary dependent on the use case for the information gathered from the eye image. For example, capturing an eye image to identify the user of the HWC may be required only when the HWC has been turned ON or when the HWC determines that the HWC has been put onto a wearer's head to control the security of the HWC and the associated information that is displayed to the user, wherein the orientation, movement pattern, stress or position of the earhorns (or other portions of the HWC) of the HWC can be used to determine that a person has put the HWC onto their head with the intention to use the HWC. Those same parameters may be monitored in an effort to understand when the HWC is dismounted from the user's head. This may enable a situation where the capture of an eye image for identifying the wearer may be completed only when a change in the wearing status is identified. In a contrasting example, capturing eye images to monitor the health of the wearer may require images to be captured periodically (e.g. every few seconds, minutes, hours, days, etc.). For example, the eye images may be taken in minute intervals when the images are being used to monitor the health of the wearer when detected movements indicate that the wearer is exercising. In a further contrasting example, capturing eye images to monitor the health of the wearer for long-term effects may only require that eye images be captured monthly. Embodiments of the disclosure relate to selection of the timing and rate of capture of eye images to be in correspondence with the selected use scenario associated with the eye images. These selections may be done automatically, as with the exercise example above where movements indicate exercise, or these selections may be set manually. In a further embodiment, the selection of the timing and rate of eye image capture is adjusted automatically depending on the mode of operation of the HWC. The selection of the timing and rate of eye image capture can further be selected in correspondence with input characteristics associated with the wearer including age and health status, or sensed physical conditions of the wearer including heart rate, chemical makeup of the blood and eye blink rate.

Figure 24:
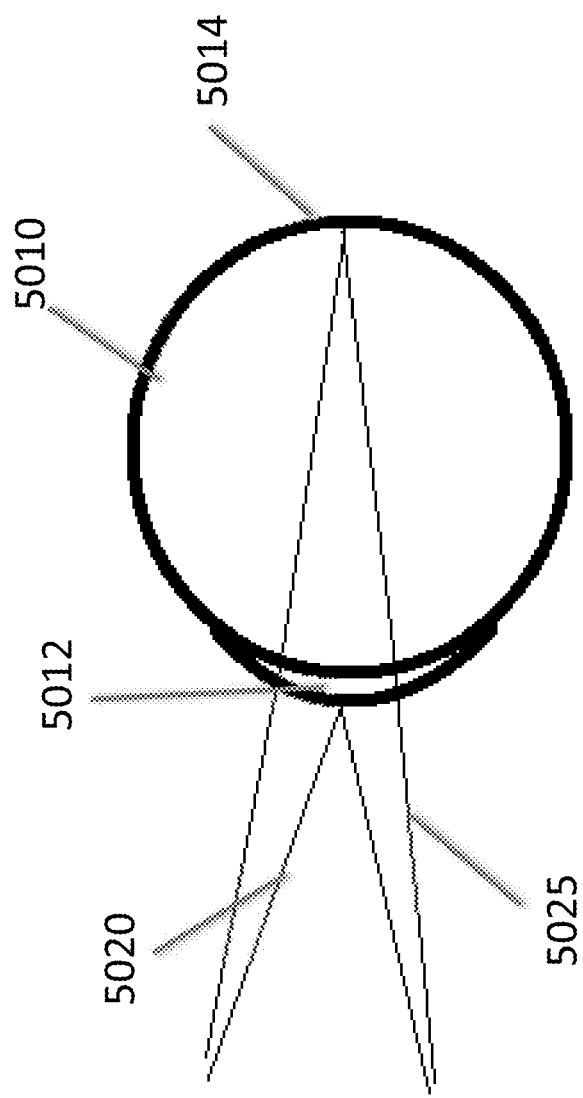
FIG. 24 illustrates light impinging an eye in accordance with the principles of the present disclosure.
Figure 25:
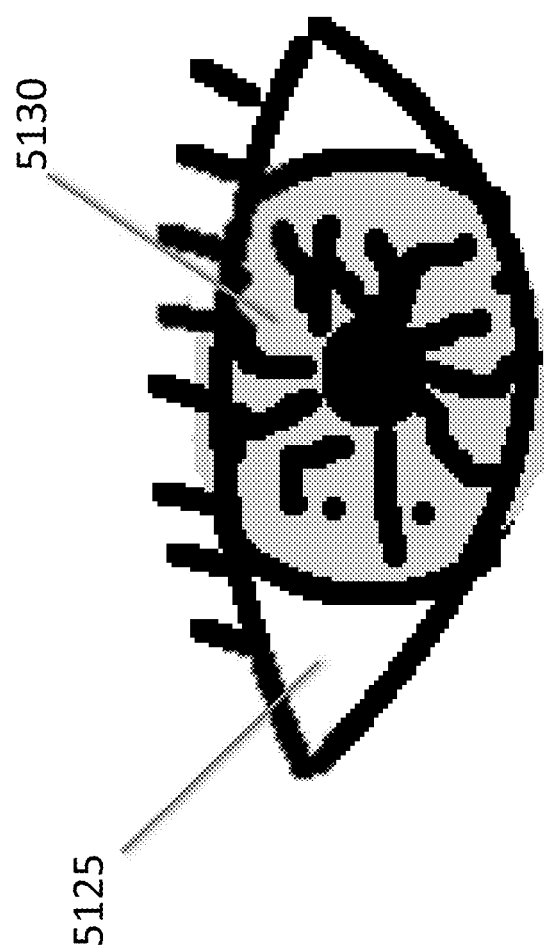
FIG. 25 illustrates a view of an eye in accordance with the principles of the present disclosure.

FIG. 24 illustrates a cross section of an eyeball of a wearer of an HWC with focus points that can be associated with the eye imaging system of the disclosure. The eyeball 5010 includes an iris 5012 and a retina 5014. Because the eye imaging system of the disclosure provides coaxial eye imaging with a display system, images of the eye can be captured from a perspective directly in front of the eye and inline with where the wearer is looking. In embodiments of the disclosure, the eye imaging system can be focused at the iris 5012 and/or the retina 5014 of the wearer, to capture images of the external surface of the iris 5012 or the internal portions of the eye, which includes the retina 5014. FIG. 24 shows light rays 5020 and 5025 that are respectively associated with capturing images of the iris 5012 or the retina 5014 wherein the optics associated with the eye imaging system are respectively focused at the iris 5012 or the retina 5014. Illuminating light can also be provided in the eye imaging system to illuminate the iris 5012 or the retina 5014. FIG. 25 shows an illustration of an eye including an iris 5130 and a sclera 5125. In embodiments, the eye imaging system can be used to capture images that include the iris 5130 and portions of the sclera 5125. The images can then be analyzed to determine color, shapes and patterns that are associated with the user. In further embodiments, the focus of the eye imaging system is adjusted to enable images to be captured of the iris 5012 or the retina 5014. Illuminating light can also be adjusted to illuminate the iris 5012 or to pass through the pupil of the eye to illuminate the retina 5014. The illuminating light can be visible light to enable capture of colors of the iris 5012 or the retina 5014, or the illuminating light can be ultraviolet (e.g. 340 nm), near infrared (e.g. 850 nm) or mid-wave infrared (e.g. 5000 nm) light to enable capture of hyperspectral characteristics of the eye.

Figure 26B:
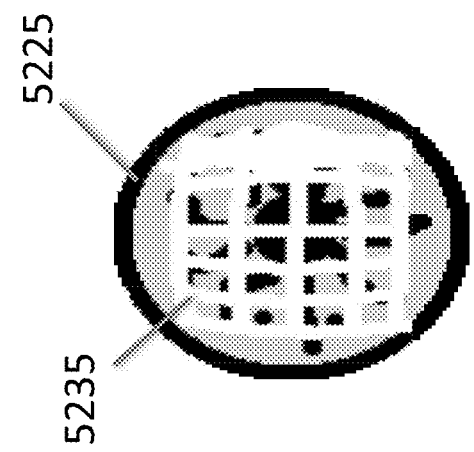
FIGS. 26a and 26b illustrate views of an eye with a structured light pattern in accordance with the principles of the present disclosure.
Figure 26A:
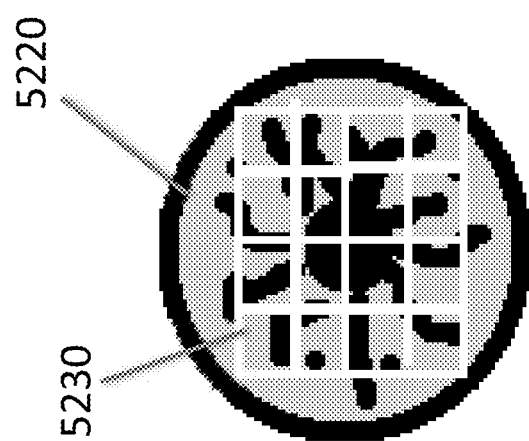

FIGS. 26a and 26b illustrate captured images of eyes where the eyes are illuminated with structured light patterns. In FIG. 26a, an eye 5220 is shown with a projected structured light pattern 5230, where the light pattern is a grid of lines. A light pattern of such as 5230 can be provided by the light source 5355 by including a diffractive or a refractive device to modify the light 5357 as are known by those skilled in the art. A visible light source can also be included for the second camera, which can include a diffractive or refractive to modify the light 5467 to provide a light pattern. FIG. 26b illustrates how the structured light pattern of 5230 becomes distorted to 5235 when the user's eye 5225 looks to the side. This distortion comes from the fact that the human eye is not completely spherical in shape, instead the iris sticks out slightly from the eyeball to form a bump in the area of the iris. As a result, the shape of the eye and the associated shape of the reflected structured light pattern is different depending on which direction the eye is pointed, when images of the eye are captured from a fixed position. Changes in the structured light pattern can subsequently be analyzed in captured eye images to determine the direction that the eye is looking.

The eye imaging system can also be used for the assessment of aspects of health of the user. In this case, information gained from analyzing captured images of the iris 5130 or sclera 5125 are different from information gained from analyzing captured images of the retina 5014. Where images of the retina 5014 are captured using light that illuminates the inner portions of the eye including the retina 5014. The light can be visible light, but in an embodiment, the light is infrared light (e.g. wavelength 1 to 5 microns) and the eye camera is an infrared light sensor (e.g. an InGaAs sensor) or a low resolution infrared image sensor that is used to determine the relative amount of light that is absorbed, reflected or scattered by the inner portions of the eye. Wherein the majority of the light that is absorbed, reflected or scattered can be attributed to materials in the inner portion of the eye including the retina where there are densely packed blood vessels with thin walls so that the absorption, reflection and scattering are caused by the material makeup of the blood. These measurements can be conducted automatically when the user is wearing the HWC, either at regular intervals, after identified events or when prompted by an external communication. In a preferred embodiment, the illuminating light is near infrared or mid infrared (e.g. 0.7 to 5 microns wavelength) to reduce the chance for thermal damage to the wearer's eye. In a further embodiment, the light source and the camera together comprise a spectrometer wherein the relative intensity of the light reflected by the eye is analyzed over a series of narrow wavelengths within the range of wavelengths provided by the light source to determine a characteristic spectrum of the light that is absorbed, reflected or scattered by the eye. For example, the light source can provide a broad range of infrared light to illuminate the eye and the camera can include: a grating to laterally disperse the reflected light from the eye into a series of narrow wavelength bands that are captured by a linear photodetector so that the relative intensity by wavelength can be measured and a characteristic absorbance spectrum for the eye can be determined over the broad range of infrared. In a further example, the light source can provide a series of narrow wavelengths of light (ultraviolet, visible or infrared) to sequentially illuminate the eye and camera includes a photodetector that is selected to measure the relative intensity of the series of narrow wavelengths in a series of sequential measurements that together can be used to determine a characteristic spectrum of the eye. The determined characteristic spectrum is then compared to known characteristic spectra for different materials to determine the material makeup of the eye. In yet another embodiment, the illuminating light is focused on the retina and a characteristic spectrum of the retina is determined and the spectrum is compared to known spectra for materials that may be present in the user's blood. For example, in the visible wavelengths 540 nm is useful for detecting hemoglobin and 660 nm is useful for differentiating oxygenated hemoglobin. In a further example, in the infrared, a wide variety of materials can be identified as is known by those skilled in the art, including: glucose, urea, alcohol and controlled substances.

Another aspect of the present disclosure relates to an intuitive user interface mounted on the HWC 102 where the user interface includes tactile feedback (otherwise referred to as haptic feedback) to the user to provide the user an indication of engagement and change. In embodiments, the user interface is a rotating element on a temple section of a glasses form factor of the HWC 102. The rotating element may include segments such that it positively engages at certain predetermined angles. This facilitates a tactile feedback to the user. As the user turns the rotating element it 'clicks' through it's predetermined steps or angles and each step causes a displayed user interface content to be changed. For example, the user may cycle through a set of menu items or selectable applications. In embodiments, the rotating element also includes a selection element, such as a pressure-induced section where the user can push to make a selection.

Figure 27:
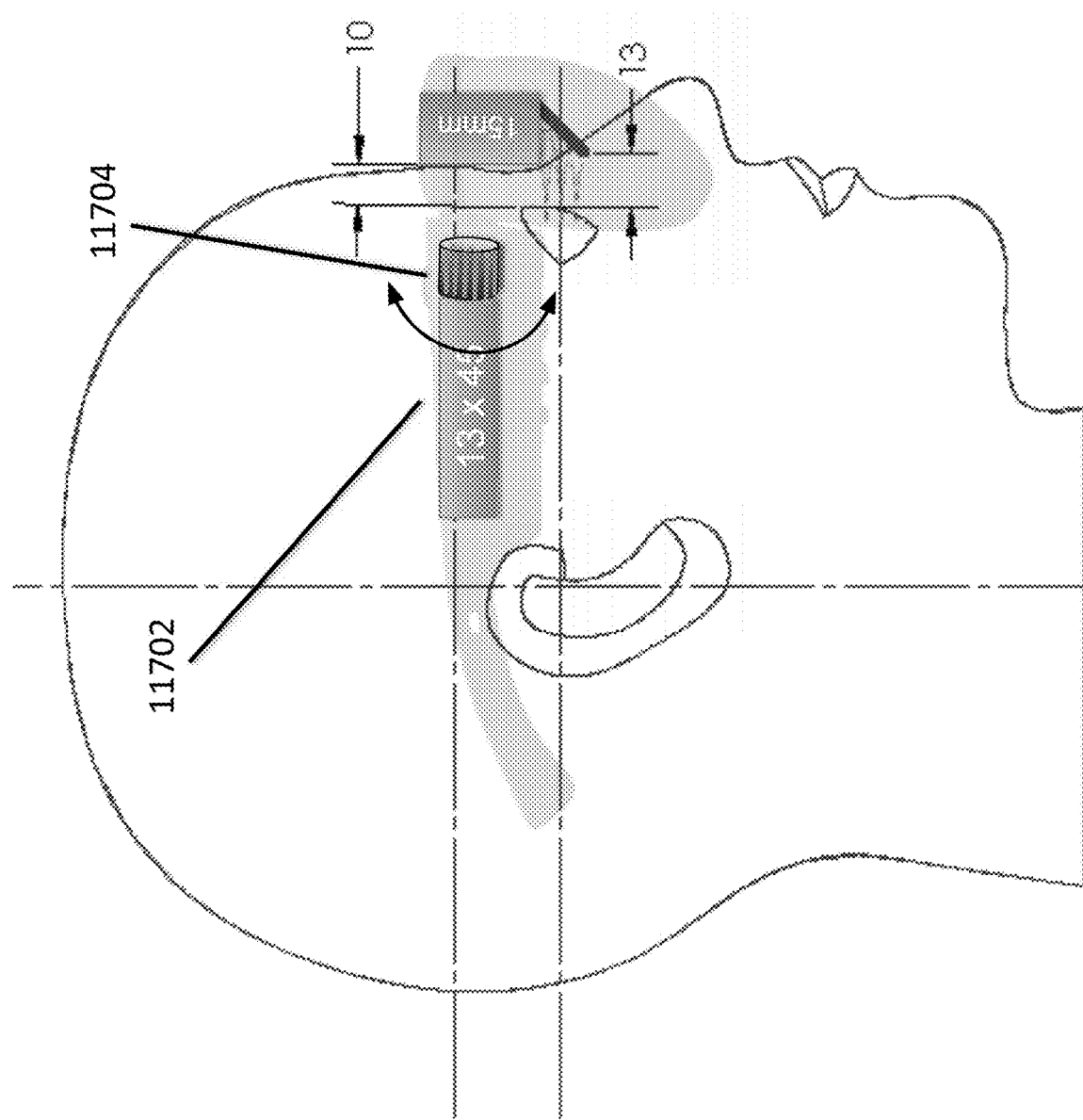
FIG. 27 illustrates a user interface in accordance with the principles of the present disclosure.
Figure 28:
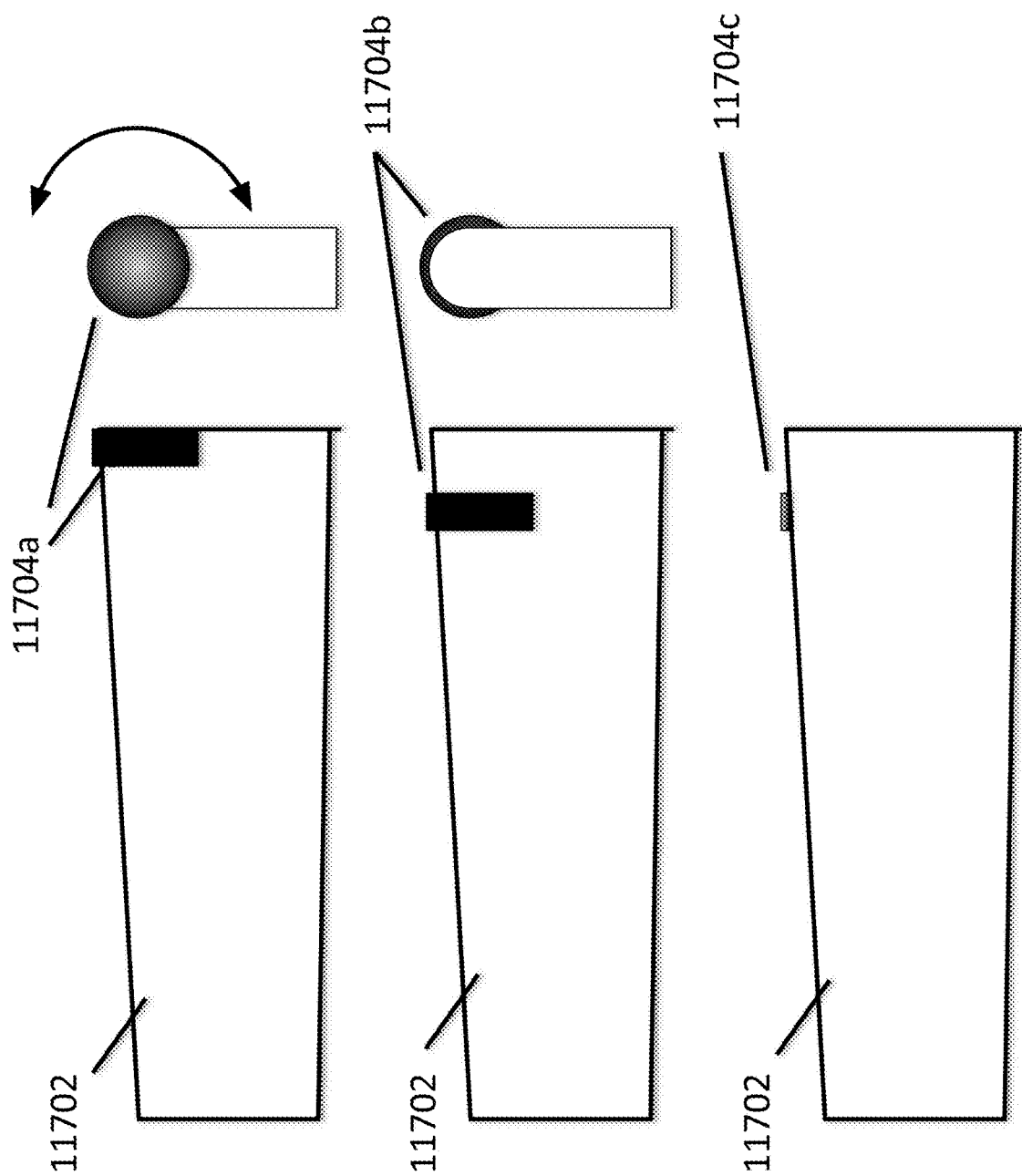
FIG. 28 illustrates a user interface in accordance with the principles of the present disclosure.

FIG. 27 illustrates a human head wearing a head-worn computer in a glasses form factor. The glasses have a temple section 11702 and a rotating user interface element 11704. The user can rotate the rotating element 11704 to cycle through options presented as content in the see-through display of the glasses. FIG. 28 illustrates several examples of different rotating user interface elements 11704a, 11704b and 11704c. Rotating element 11704a is mounted at the front end of the temple and has significant side and top exposure for user interaction. Rotating element 11704b is mounted further back and also has significant exposure (e.g. 270 degrees of touch). Rotating element 11704c has less exposure and is exposed for interaction on the top of the temple. Other embodiments may have a side or bottom exposure.

Another aspect of the present disclosure relates to a haptic system in a head-worn computer. Creating visual, audio, and haptic sensations in coordination can increase the enjoyment or effectiveness of awareness in a number of situations. For example, when viewing a movie or playing a game while digital content is presented in a computer display of a head-worn computer, it is more immersive to include coordinated sound and haptic effects. When presenting information in the head-worn computer, it may be advantageous to present a haptic effect to enhance or be the information. For example, the haptic sensation may gently cause the user of the head-worn computer believe that there is some presence on the user's right side, but out of sight. It may be a very light haptic effect to cause the 'tingling' sensation of a presence of unknown origin. It may be a high intensity haptic sensation to coordinate with an apparent explosion, either out of sight or in-sight in the computer display. Haptic sensations can be used to generate a perception in the user that objects and events are close by. As another example, digital content may be presented to the user in the computer displays and the digital content may appear to be within reach of the user. If the user reaches out his hand in an attempt to touch the digital object, which is not a real object, the haptic system may cause a sensation and the user may interpret the sensation as a touching sensation. The haptic system may generate slight vibrations near one or both temples for example and the user may infer from those vibrations that he has touched the digital object. This additional dimension in sensory feedback can be very useful and create a more intuitive and immersive user experience.

Another aspect of the present disclosure relates to controlling and modulating the intensity of a haptic system in a head-worn computer. In embodiments, the haptic system includes separate piezo strips such that each of the separate strips can be controlled separately. Each strip may be controlled over a range of vibration levels and some of the separate strips may have a greater vibration capacity than others. For example, a set of strips may be mounted in the arm of the head-worn computer (e.g. near the user's temple, ear, rear of the head, substantially along the length of the arm, etc.) and the further forward the strip the higher capacity the strip may have. The strips of varying capacity could be arranged in any number of ways, including linear, curved, compound shape, two dimensional array, one dimensional array, three dimensional array, etc.). A processor in the head-worn computer may regulate the power applied to the strips individually, in sub-groups, as a whole, etc. In embodiments, separate strips or segments of varying capacity are individually controlled to generate a finely controlled multi-level vibration system. Patterns based on frequency, duration, intensity, segment type, and/or other control parameters can be used to generate signature haptic feedback. For example, to simulate the haptic feedback of an explosion close to the user, a high intensity, low frequency, and moderate duration may be a pattern to use. A bullet whipping by the user may be simulated with a higher frequency and shorter duration. Following this disclosure, one can imagine various patterns for various simulation scenarios.

Another aspect of the present disclosure relates to making a physical connection between the haptic system and the user's head. Typically, with a glasses format, the glasses touch the user's head in several places (e.g. ears, nose, forehead, etc.) and these areas may be satisfactory to generate the necessary haptic feedback. In embodiments, an additional mechanical element may be added to better translate the vibration from the haptic system to a desired location on the user's head. For example, a vibration or signal conduit may be added to the head-worn computer such that there is a vibration translation medium between the head-worn computers internal haptic system and the user's temple area.

Figure 29:
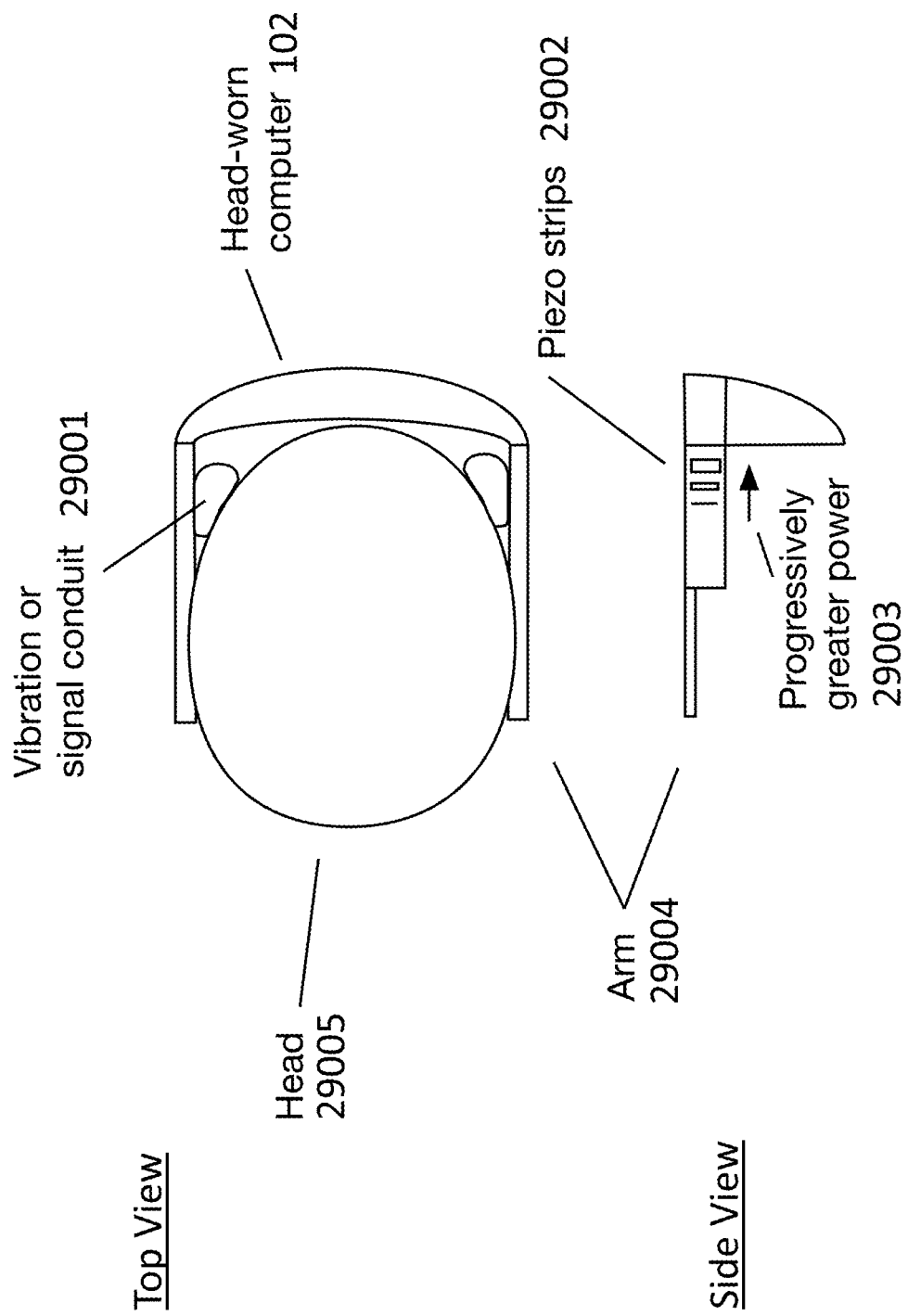

FIG. 29 illustrates a head-worn computer 102 with a haptic system comprised of piezo strips 29002. In this embodiment, the piezo strips 29002 are arranged linearly with strips of increasing vibration capacity from back to front of the arm 29004. The increasing capacity may be provided by different sized strips, for example. This arrangement can cause a progressively increased vibration power 29003 from back to front. This arrangement is provided for ease of explanation; other arrangements are contemplated by the inventors of the present application and these examples should not be construed as limiting. The head-worn computer 102 may also have a vibration or signal conduit 29001 that facilitates the physical vibrations from the haptic system to the head of the user 29005. The vibration conduit may be malleable to form to the head of the user for a tighter or more appropriate fit.

An aspect of the present invention relates to a head-worn computer, comprising: a frame adapted to hold a computer display in front of a user's eye; a processor adapted to present digital content in the computer display and to produce a haptic signal in coordination with the digital content display; and a haptic system comprised of a plurality of haptic segments, wherein each of the haptic segments is individually controlled in coordination with the haptic signal. In embodiments, the haptic segments comprise a piezo strip activated by the haptic signal to generate a vibration in the frame. The intensity of the haptic system may be increased by activating more than one of the plurality of haptic segments. The intensity may be further increased by activating more than 2 of the plurality of haptic segments. In embodiments, each of the plurality of haptic segments comprises a different vibration capacity. In embodiments, the intensity of the haptic system may be regulated depending on which of the plurality of haptic segments is activated. In embodiments, each of the plurality of haptic segments are mounted in a linear arrangement and the segments are arranged such that the higher capacity segments are at one end of the linear arrangement. In embodiments, the linear arrangement is from back to front on an arm of the head-worn computer. In embodiments, the linear arrangement is proximate a temple of the user. In embodiments, the linear arrangement is proximate an ear of the user. In embodiments, the linear arrangement is proximate a rear portion of the user's head. In embodiments, the linear arrangement is from front to back on an arm of the head-worn computer, or otherwise arranged.

An aspect of the present disclosure provides a head-worn computer with a vibration conduit, wherein the vibration conduit is mounted proximate the haptic system and adapted to touch the skin of the user's head to facilitate vibration sensations from the haptic system to the user's head. In embodiments, the vibration conduit is mounted on an arm of the head-worn computer. In embodiments, the vibration conduit touches the user's head proximate a temple of the user's head. In embodiments, the vibration conduit is made of a soft material that deforms to increase contact area with the user's head.

An aspect of the present disclosure relates to a haptic array system in a head-worn computer. The haptic array(s) that can correlate vibratory sensations to indicate events, scenarios, etc. to the wearer. The vibrations may correlate or respond to auditory, visual, proximity to elements, etc. of a video game, movie, or relationships to elements in the real world as a means of augmenting the wearer's reality. As an example, physical proximity to objects in a wearer's environment, sudden changes in elevation in the path of the wearer (e.g. about to step off a curb), the explosions in a game or bullets passing by a wearer. Haptic effects from a piezo array(s) that make contact the side of the wearer's head may be adapted to effect sensations that correlate to other events experienced by the wearer.

FIG. 29a illustrates a haptic system according to the principles of the present disclosure. In embodiments the piezo strips are mounted or deposited with varying width and thus varying force Piezo Elements on a rigid or flexible, non-conductive substrate attached, to or part of the temples of glasses, goggles, bands or other form factor. The non-conductive substrate may conform to the curvature of a head by being curved and it may be able to pivot (e.g. in and out, side to side, up and down, etc.) from a person's head. This arrangement may be mounted to the inside of the temples of a pair of glasses. Similarly, the vibration conduit, described herein elsewhere, may be mounted with a pivot. As can be seen in FIG. 29a, the piezo strips 29002 may be mounted on a substrate and the substrate may be mounted to the inside of a glasses arm, strap, etc. The piezo strips in this embodiment increase in vibration capacity as they move forward.

An aspect of the present invention relates to providing vision aids to people with vision impairments. In embodiments, the vision aids take the form of a head-worn computer with an augmented reality display system (e.g. as described herein). The head-worn computer may have a camera with magnification adjustment (e.g. either optical or digital zoom). A visually impaired person may wear the head-worn computer to image portions of the person's environment and have the images magnified or digitally manipulated such that they can be presented in the augmented reality computer display to help the person better see things in the environment. In embodiments, the head-worn computer may recognize gestures or other indications such that the user can select items (e.g. words on a page, paragraph on a page, page in a book, content) to have the items magnified or digitally manipulated and presented as digital content in the augmented reality display. The selection and presentation system may be intuitive to provide the person with a system that operates seamlessly in multiple environments.

The inventors have discovered that visual aid solutions for the visually impaired have significant limitations, are not portable, and are not intuitive to use. The inventors have discovered that using augmented reality head-worn computer display systems drastically improves the way the visually impaired interact with the physical world. By allowing a user to use a camera system in the head-worn system to image a portion of the surrounding environment in front of the user and then magnify or digitally enhance the image for presentation in the head-worn augmented reality system makes it possible for the visually impaired to better interact with objects in the surrounding environment. Magnification and digital enhancement change the view of the world for the visually impaired, and the inventors have also discovered intuitive interaction systems that make the experience even more useful and easy to use. Use of a head-worn computer that provides a displayed image overlaid onto a view of the surrounding environment enables a magnified or enhanced image of the surrounding environment to be provided in a portion of the user's field of view while still providing a view of the surrounding environment in peripheral areas of the user's field of view where high resolution is not needed to maintain an awareness of the environment.

Figure 30B:
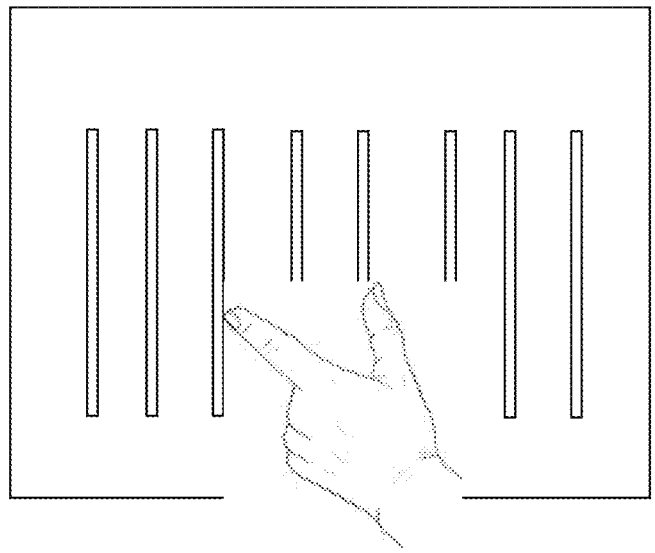
FIG. 30b illustrates a situation where the user points to a section of the document to indicate to the head-worn computer that this is the area or section the user is interested in viewing as a magnified or digitally enhanced displayed image.
Figure 30A:
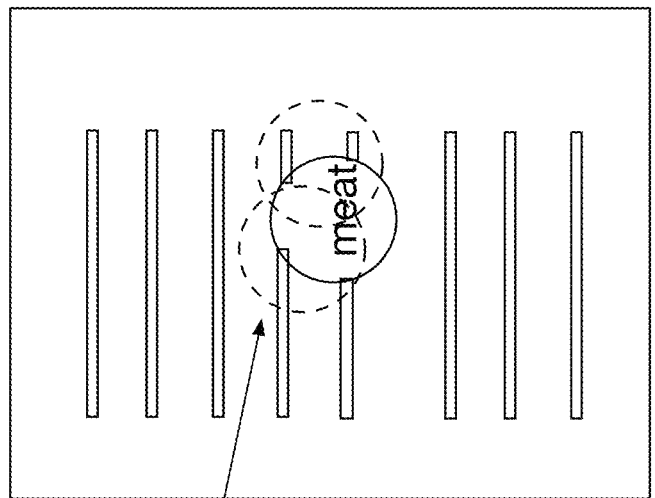
FIG. 30a illustrates an example situation where a user is viewing a document while wearing a head-worn computer and the document has writing on it.

FIG. 30a illustrates an example situation where a user is viewing a document while wearing a head-worn computer and the document has writing on it. The head-worn computer provides an augmented reality view of the document that is unmodified. Because the user cannot read the writing clearly either due to the user being visually impaired or the lighting or other conditions being challenging, the user desires to gain an improved view of the writing such as providing by having a magnified view of a portion of the document. As shown in FIG. 30a, the head-worn computer then provides the user with a magnified view of a portion of the document. The user is then viewing the document in two ways: the outer portion of the document is viewed in an unmodified state of the document, and a smaller portion is displayed to the user as a magnified displayed area, shown as the area in the solid line circle. The non-modified view can provide the person with context and orientation while viewing the magnified portion. The magnified displayed area is provided by the head-worn computer by first capturing an image of the document using a camera in the head-worn computer and then the head-worn computer digitally magnifies the portion of the captured image which is then displayed to the user. Where the camera may include a telephoto lens or a zoom lens to provide optical magnification to the captured image of the document. In addition, the camera or head-worn computer may include a capability to digitally magnify an area or portion of the captured image by using digital zoom techniques as is known to those skilled in the art. Once an area of the image is magnified, it is displayed to the user in the head-worn augmented reality display such that the user can see the magnified area of the image of the document overlaying the un-modified (e.g. see-through) view of the document. The magnified area of the image may also be displayed to the user with either a higher brightness than the see-through view or at a different focus distance than the surrounding environment so the user can focus onto the magnified area without being distracted by the unmodified see-through view. As shown in FIG. 30a, the selection of the area to be magnified and displayed to the user is determined by the head position of the user corresponding to where the user is looking. This method of using head position to determine the area to be magnified is well suited to the case wherein the camera includes a telephoto lens or a zoom lens as the user can simply move his head as needed and the area he is looking at will be captured as a magnified image of that area. A portion of the captured magnified image (e.g. the center 20% of the captured image) is then displayed to the user in the head-worn computer as a magnified view of the area. This approach based on head position also works well when an unmagnified image of the area is captured and the image is either digitally magnified or digitally enhanced in other ways to provide an improved view of the area to the user. However, as illustrated by the multiple sets of dashed line circles shown in FIG. 30a, using head position to determine the area to be magnified or digitally enhanced can have limitations because the user's head can move somewhat erratically and these movements of the head cause changes in what the imaging system is imaging and then magnifying or digitally enhancing. Depending on the size of the magnified or digitally enhanced image presented to the user and the level of magnification in the enhanced image, the desired content can move in and out of the area of enhanced content in the displayed image leading to a frustrating user experience at times. Optical stabilization of the camera lens during capture or digital image stabilization of the image after capture can be used to stabilize the magnified or digitally enhanced image that is presented to the user. The area of magnified or digitally enhanced image is preferably positioned approximately in the center of the display field of view or at least 5% of the display field of view away from the edge of the display field of view to provide substantial room within the display field of view for digital image stabilization. As such, the magnified or digitally enhanced image should comprise less than 81% (90%×90%) of the display field of view.

In embodiments, and as will be further explained below, the head-worn system may be adapted to identify content based on a user gesture or external user interface and then manage the content's presentation based on an understanding of what the user wants to view, as opposed to what the user's head is pointing at. FIG. 30b illustrates a situation where the user points to a section of the document to indicate to the head-worn computer that this is the area or section the user is interested in viewing as a magnified or digitally enhanced displayed image. The augmented reality head-worn system may then capture an image of that area and magnify or otherwise digitally enhance the image of the area and then display the magnified or digitally enhanced image in the augmented reality head-worn computer for viewing as an overlaid image onto a see-through view of the document. In embodiments, once the portion is captured, manipulated and presented it is stabilized to avoid the desired portion from floating in and out of the field of view of the augmented reality head-worn computer. For example, the portion may be maintained in the center, or other portion, of the field of view while there is an indication (e.g. persistent gesture) that the desired portion is still desirable. In embodiments, the enhanced portion may be world locked (e.g. locked to a mark, marker, word, etc.) such that it does not move as the user's head moves during the desired viewing period. In embodiments, more than one enhancement technique is used in portions of the displayed image so that the center portion of the displayed image may be enhanced using one technique such as for example magnification and the peripheral portions of the image may be contrast enhanced. In addition, an unmodified view (e.g. see-through view) may be provided that has a larger field of view than the displayed image, so that user may see a peripheral portion of the document that is unmodified, with an outer portion of the document that is enhanced using one technique such as contrast enhancement or increased brightness and a center portion of the document that is enhanced using a second technique such as magnification.

Figure 31A:
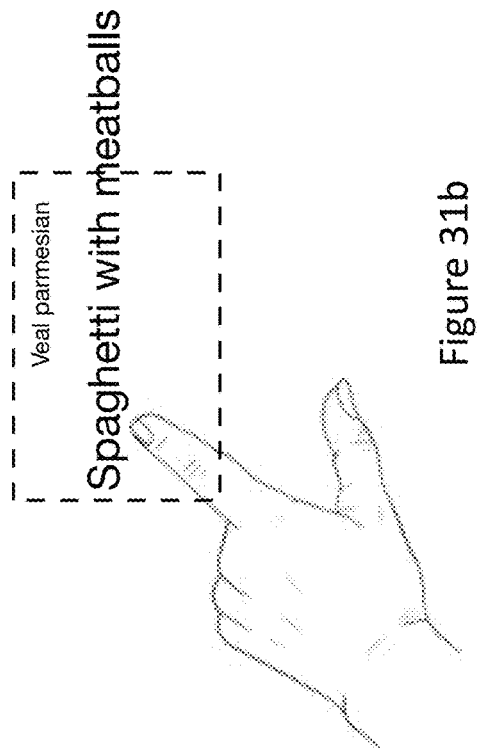
FIGS. 31a through 31c illustrate several examples of how the head-worn computer system may present information to the visually impaired user after an indication of what the user would like to look at is received.
Figure 31B:
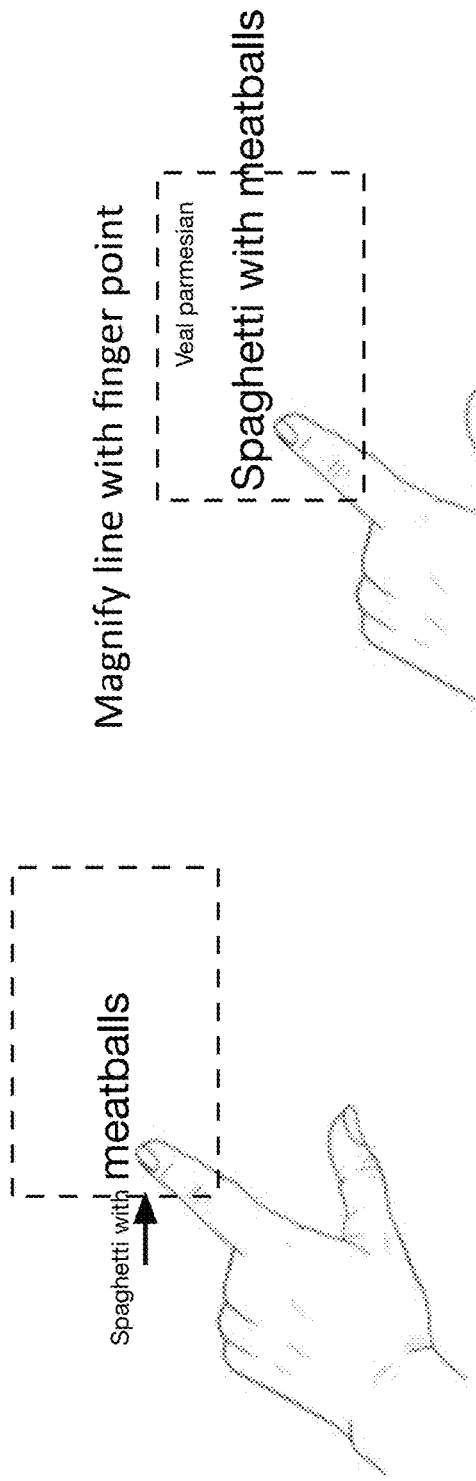
Figure 31C:
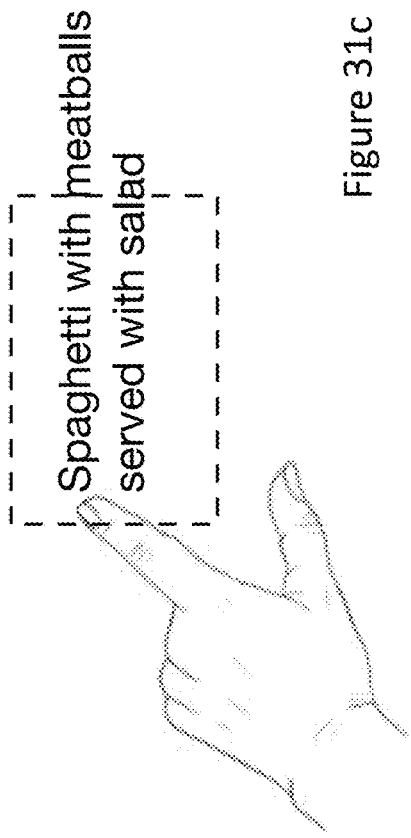

FIGS. 31a through 31c illustrate several examples of how the head-worn computer system may present information to the visually impaired user after an indication of what the user would like to look at is received. Each of these examples may be thought of as dinner menu examples, although they are not limited to menus, where the visually impaired user would like to read a portion of a menu that the user cannot readily see without aid. These dimmer menu examples are provided for ease of illustration and teaching point and should not be considered limiting use scenarios. Such systems may be used to enhance and present content of all types.

FIG. 31a illustrates a system where the user points at words on the menu and the words are magnified through the imaging system and then presented as digital content in the see-through head-worn display. As the user runs his finger under or near the words in the line, the camera in the head-worn computer captures an image of the menu and the user's finger. The processor in the head-worn computer than analyzes the captured image to identify that a pointing finger is present and the portion of the captured image that is adjacent to the finger is identified for enhancement. If the camera has captured a magnified image, the portion adjacent to the pointing finger may then be cropped for presentation as a displayed image to the user, where the displayed image is positioned within the display field of view such that it appears to be adjacent to the pointing finger as seen by the user. If the camera has captured an image that is not magnified, the portion adjacent to the pointing finger may be analyzed for word content, the word content may then be digitally magnified or digitally enhanced and the magnified or enhanced word content is displayed to the user such that the magnified or enhanced word content is positioned in the display field of view so that it appears to be adjacent to the pointing finger as seen in the augmented reality system view. This allows the user to read the line for himself by pointing and moving the finger along the line of text in the menu, which can be a significant benefit for the visually impaired. In embodiments, the indicated words may be highlighted, changed in color, underlined, bolded, or otherwise presented in an enhanced way to accomplish the task of presenting a word that the user can more easily read. In embodiments, when the portion adjacent to the pointing finger is analyzed for word content, words can be identified by the head-worn computer and the identified words can then be converted to computer generated speech which is read to the person. In embodiments, the user simply moves their finger along the line of text and the head-worn computer identifies the words and reads the words to the user as the finger moves.

In embodiments, the user uses two fingers in a gesture. Wherein one finger indicates the portion to be enhanced and the distance between the two fingers indicates the relative amount of digital zoom to be applied. The camera is then used to capture images of the menu, or other portion of the environment in front of the user, along with the gesture. The processor in the head-worn computer then analyzes the captured image to identify the gesture and then form the enhanced image for display in correspondence to the position and degree of zoom indicated by the gesture.

FIG. 31b illustrates a system where the user points to a line of text, an image is captured by the camera of the pointing finger and the adjacent text. The image is then analyzed by the head-worn computer and the word content of the line of text is determined. A digitally enhanced image of the line of text is then generated for display to the user or provided to the user as computer generated speech. The whole line of text may be enhanced and/or tracked such that the line of text is presented for the user in the see-through display in such a way that they can see and read the line of text and/or the line of text may be read to them. Because the pointing finger identifies the line of text of interest, the user may scan their head while reading the enhanced words in the line without interrupting the process of identifying the word content. In embodiments, the line may not be enhanced, but rather simply tracked through the finger pointing, translated by optical character recognition (OCR) and read to the user. In the reading modes described herein, the system may also be useful as a reading aid for non-visually impaired people, such as children or people with learning disabilities. Further, following the OCR, the identified words may be translated to a different language as desired by the user and then displayed as the translated words or read to the user as translated words. In embodiments, the word content from the line of text may be presented in different formats to better fit the word content within the display field of view (e.g. the text may be shown as multiple short lines of text).

FIG. 31c illustrates a system where the user points to a paragraph of text and then the paragraph is enhanced, similar to the word and sentence tracking illustrated in FIGS. 31a and 31b.

Figure 32:
FIG. 32 illustrates a system where the words of a line are enhanced as they are read.

FIG. 32 illustrates a system where the words of a line are enhanced as they are read. For example, when a sentence or paragraph is selected, the words that are being read may be enhanced so the user can follow along. Again, this system may be useful for the visually impaired or as a reading learning tool.

Figure 33:
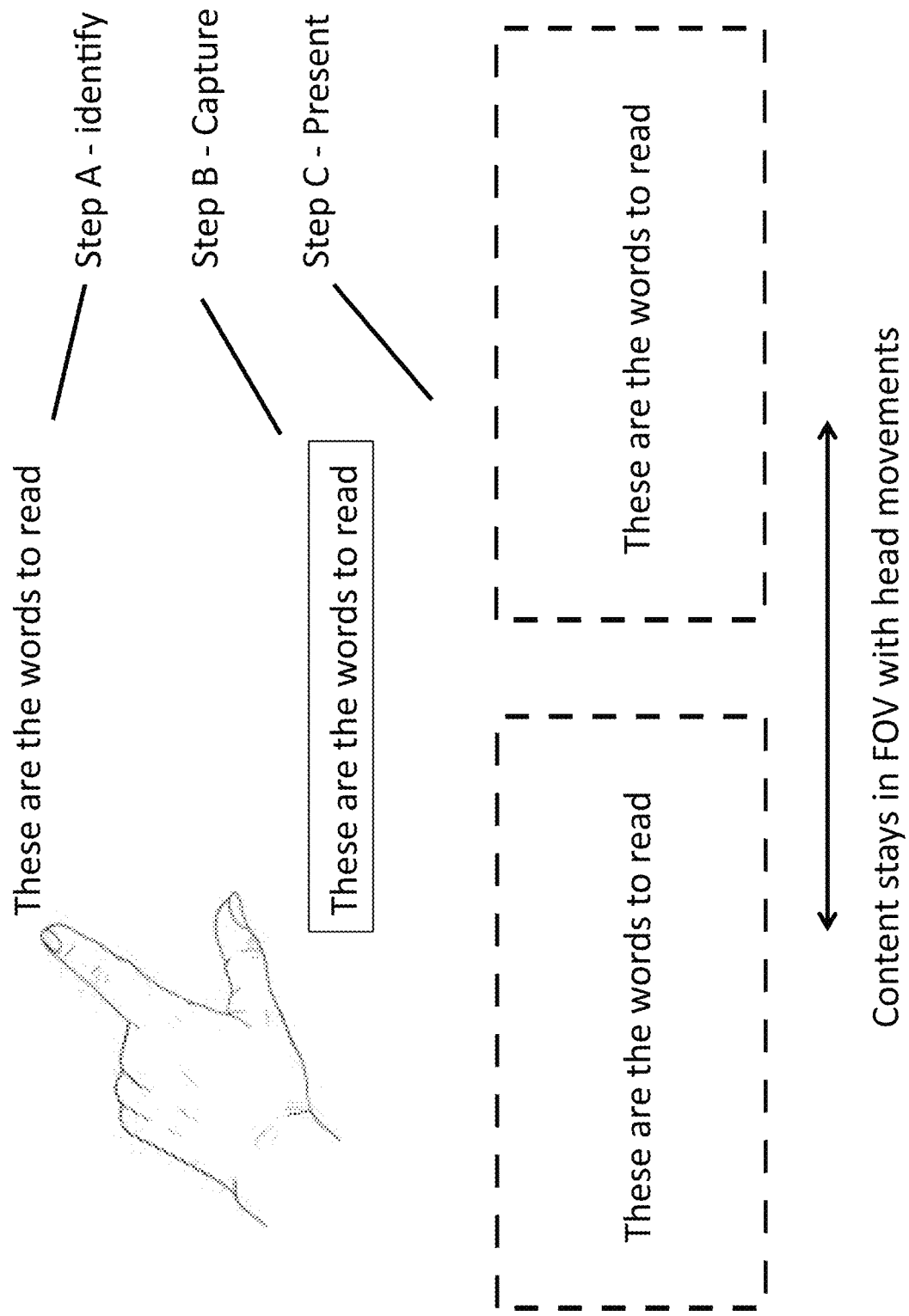
FIG. 33 illustrates a system for the stabilization of enhanced images.

FIG. 33 illustrates a system for the stabilization of enhanced images. In step A, the user identifies what they would like to select (e.g. by pointing to a word, sentence, paragraph, object, content, etc.). In this case, the user has pointed to a sentence. The head-worn computer than captures and enhances, not necessarily in that order, the sentence in Step B. Then the sentence, or sections of the sentence are presented in a field of view of the see-through computer display(s) in a fixed position within the field of view. This locks the content into position such that the user will be able to continue to see the enhanced words even as the user's head moves around. This helps stabilize the view of the content. The user then does not have to maintain a steady head to maintain a visual connection with the enhanced content. The sentence may be displayed in the same location within the display field of view as long as the gesture can be identified thereby indicating that the user is still interested in seeing an enhanced version of that sentence.

Figure 34:
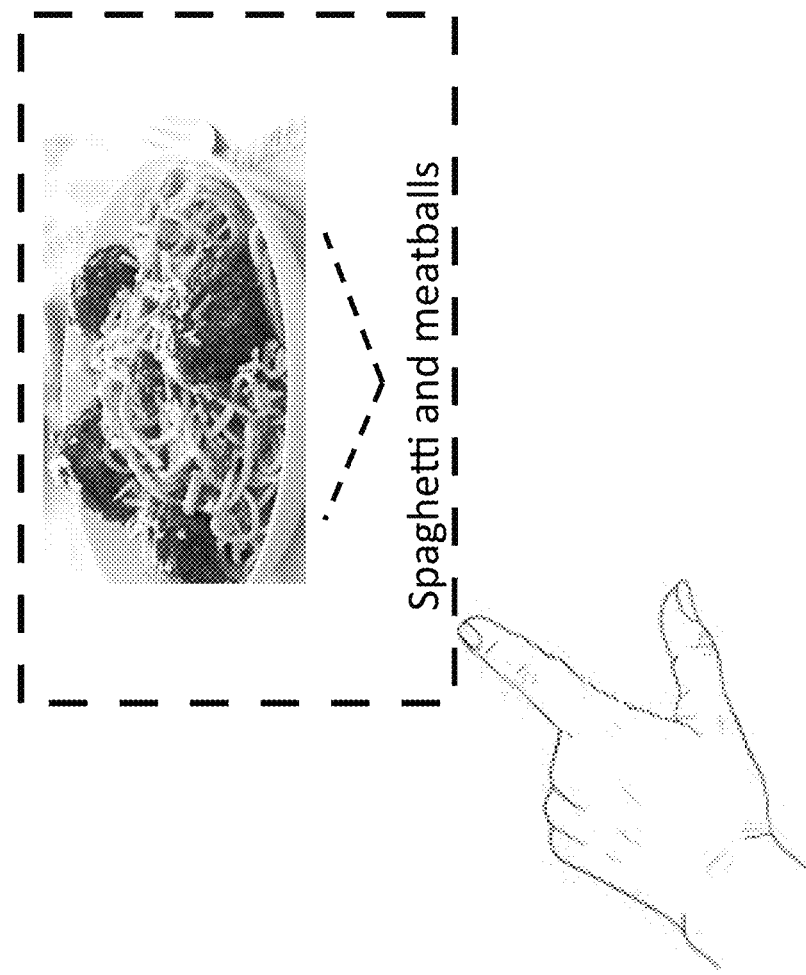
FIG. 34 illustrates a system where the indication by the user of the menu item causes a pop up of a picture, video or other content.

FIG. 34 illustrates a system where the indication by the user of the menu item causes a pop up of a picture, video or other content to illustrate the menu item based on the OCR determined word or image content, but in a visual form familiar to the user. The visually impaired could then see pictures of menu items instead of having to read the menu. This technique may also be useful when reviewing magazine content, news content, blogs, websites, etc. For example, the user may look at a tablet computer with news content and the head-worn computer could enhance the content as described herein, including presenting a video in the head-worn glasses. This avoids the problem of the visually impaired with having to manipulate the tablet itself. In other embodiments, the content is provided in physical form. The user may pick up a magazine and the head-worn computer may recognize the magazine edition so the system begins to work seamlessly when the user starts looking through the magazine. The user may have whole pages magnified so he can generally review the material and then the user may select a section. The section may include text, images, or other forms of content. If the content is text, the system may present enhanced text such that the user can read or have the text read. The system may also pop up a video when text or other forms of content are selected. The selection of the video may be made by the head-worn computer identifying, either locally or remotely, the content and then presenting an appropriate image or video.

Figure 35:
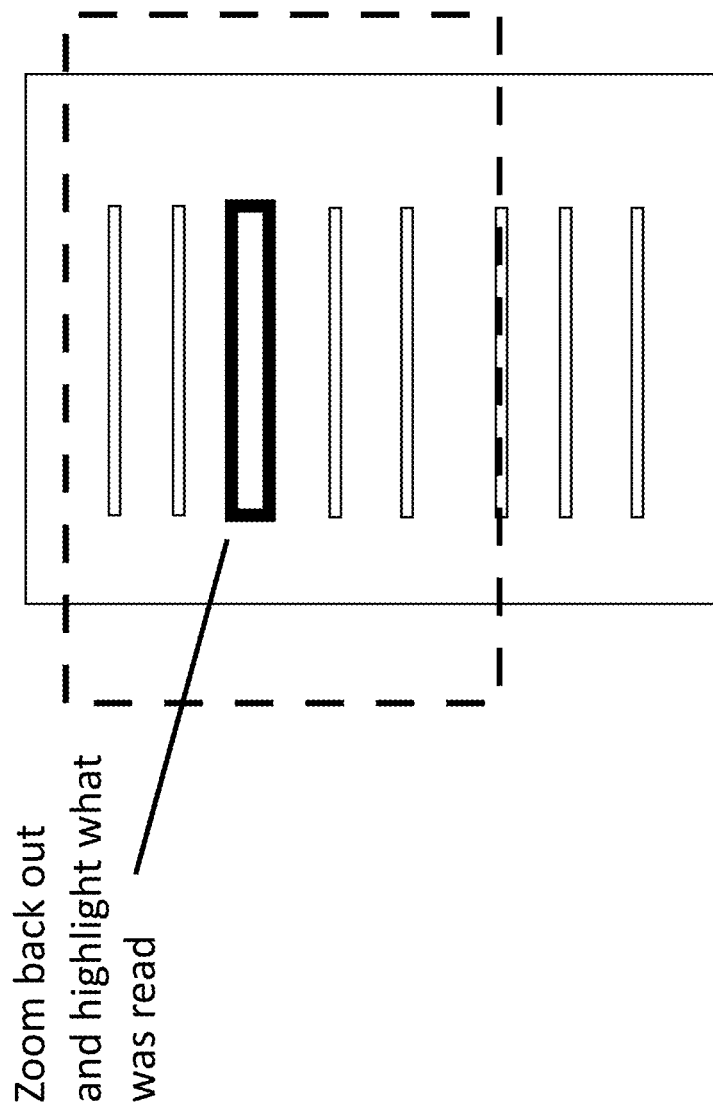
FIG. 35 illustrates a system where the user has asked or indicated that they would like to zoom back out to see a larger portion of a page for context.

FIG. 35 illustrates a system where the user has asked or indicated (e.g. through a gesture) that they would like to zoom back out to see a larger portion of a page for context. In this embodiment, a larger portion of the captured image is displayed to the user in the head-worn computer and the portion of the text, or other content, that was previously enhanced is highlighted such that the used can see what he's already zoomed in on, even if in this zoomed out mode, the user cannot read the highlighted content. In embodiments, several areas may be highlighted with different highlighting effects, numbers, text, content, etc. to help remind the user what each previously reviewed section related to.

Figure 36:
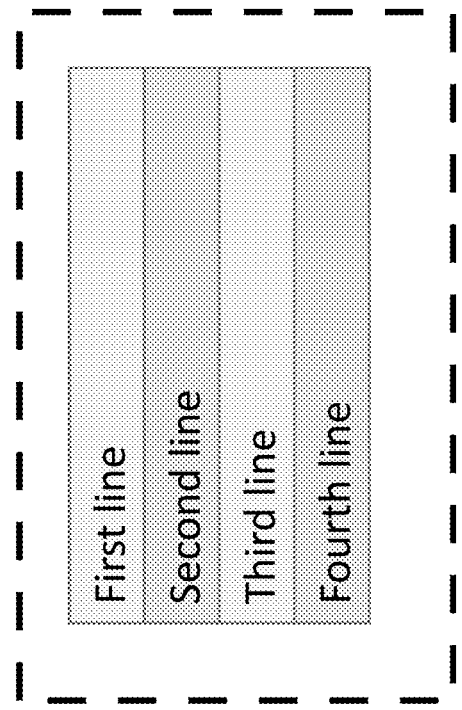
FIG. 36 illustrates a system where alternating lines of text are enhanced to help a visually impaired person separate and read the lines.

FIG. 36 illustrates a system where alternating lines of text are enhanced to help a visually impaired person separate and read the lines. In this example, the lines alternate background colors. In other embodiments, the text of each line may be enhanced differently.

Figure 38:
FIG. 38 shows an illustration of the same environment as seen in a blurred condition to illustrate what might be seen by a person with impaired vision.
Figure 37:
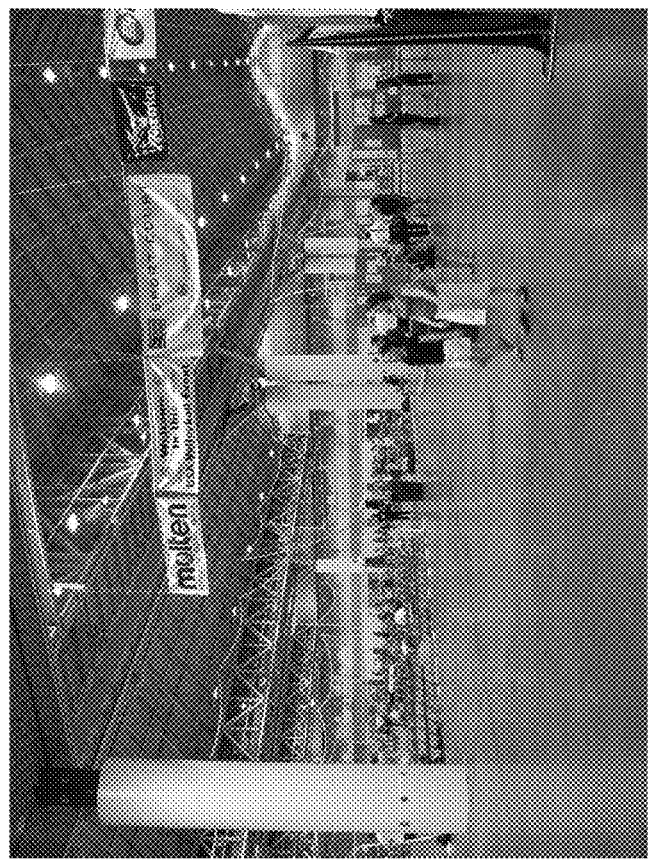
FIG. 37 shows an illustration of an environment as seen by a person that is not vision impaired.
Figure 39:
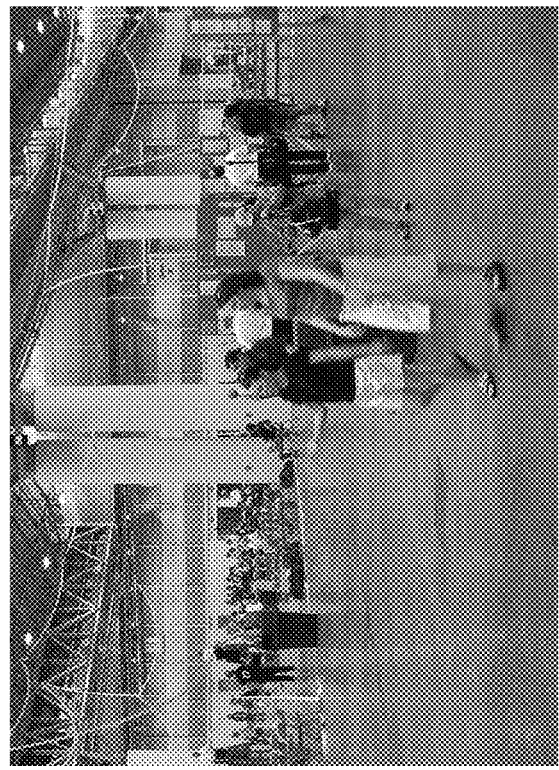
FIG. 39 shows an illustration of an image of the environment as captured by the camera in the head-worn computer.
Figure 40:
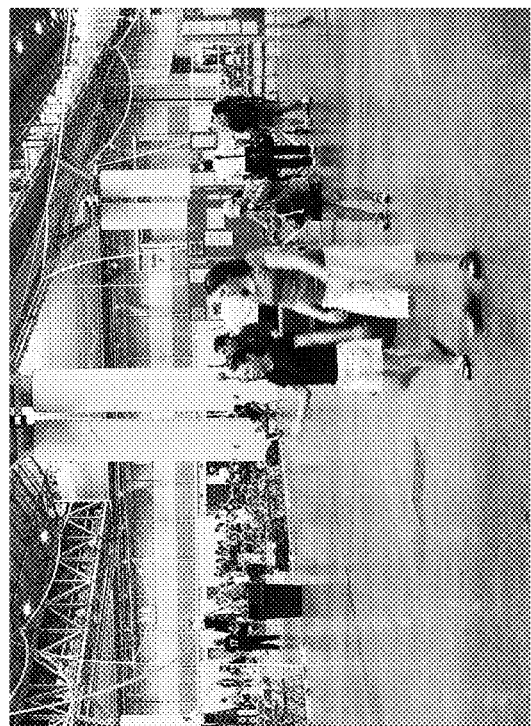
FIG. 40 shows an illustration of the captured image after being enhanced to increase contrast, sharpness and brightness.
Figure 41:
FIG. 41 shows an illustration of the enhanced version of the captured image of the environment being displayed in the head-worn computer as seen by the impaired vision user as the enhanced image overlaid onto a see-through view of the environment.

In embodiments, the entire image of the surrounding environment as captured by the camera in the head-worn computer, is enhanced without magnifying the image and the enhanced image is displayed to the user in the augmented reality head-worn computer. The enhanced image can be cropped and positioned within the display field of view, such that the angular size and position of the enhanced image when displayed in the head-worn computer matches the angular size and position of the portion of the surrounding environment included in the enhanced image as seen in the augmented reality display view of the surrounding environment. The user is therefore provided with an enhanced view of the surrounding environment so the user can better understand ongoing activities in the surrounding environment and the user can then navigate the surrounding environment better. By matching the displayed size of the enhanced image to the size of the see-through view of the surrounding environment, the user is provided with an undistorted enhanced image of the surrounding environment. FIGS. 37 thru 41 illustrate how the captured image of the environment can be enhanced and displayed to the user for improved navigation in an environment. FIG. 37 shows an illustration of an environment as seen by a person that is not vision impaired. FIG. 38 shows an illustration of the same environment as seen in a blurred condition to illustrate what might be seen by a person with impaired vision. There are many vision impairment types and this is provided for simplification of illustration only. FIG. 39 shows an illustration of an image of the environment as captured by the camera in the head-worn computer wherein the camera captures a smaller field of view than is seen by the user in a see-through view as shown in FIGS. 37 and 38. FIG. 40 shows an illustration of the captured image after being enhanced to increase contrast, sharpness and brightness. FIG. 41 shows an illustration of the enhanced version of the captured image of the environment being displayed in the head-worn computer as seen by the impaired vision user as the enhanced image overlaid onto a see-through view of the environment. Where the displayed image can be presented to the impaired vision user with a focus distance that is determined in correspondence to the user's ophthalmic prescription or other characteristics of the user's eyes, such as with a shorter focus distance for a user that is near sighted. As a result, the benefit provided to the user comes from both the enhanced image and from the ability to select the focus distance to better suit the user. To better illustrate the experience for the vision impaired user, the enhanced displayed image is shown in FIG. 41 with some blur of the displayed image, but much less than the background which is not recognizable. The benefit provided by the system to a user with impaired vision is easily recognizable in FIG. 41 for navigating an environment such as walking through the gymnasium shown in FIGS. 37 to 41.

In embodiments, portions of images captured by the camera in the head-worn computer are enhanced to suit the user's eyes capabilities by increasing the contrast, brightness, sharpness or by increasing the saturation as appropriate. The various enhancements can be adjusted to provide an improved view of the environment. Where contrast can be enhanced by increasing the luma (where luma is defined as the brightness of the pixel) of portions of the enhanced image where the luma is above a threshold and decreasing the luma of portions of the enhanced image where luma is below the threshold. Where luma can be increased or decreased for example by applying a factor (e.g. a % increase or % decrease) to the code values associated with the pixel. In this way, dark areas of the enhanced image may be made to be darker and bright areas of the enhanced image may be made to be brighter. Color saturation can also be enhanced in the enhanced image by increasing the red, green and blue digital code values associated with pixels in the enhanced image. Color contrast can be enhanced in the enhanced image by increasing the red, green and/or blue digital code values associated with pixels that have code values above a threshold and decreasing code values below the threshold. For example, in an 8 bit imaging system, code values above 120 for red, green or blue may be increased by 50% up to 256 and code values below 120 may be decreased by 50% down to 0. In a further example, the threshold 35 to 60% of the maximum code value possible in the imaging system. In this way, the color contrast is enhanced in the enhanced image by making saturated color areas more saturated and unsaturated areas are made less saturated. The advantage of these techniques of enhancing the images is that they are not computationally complex so that little power is required to enhance the images.

Figure 42:
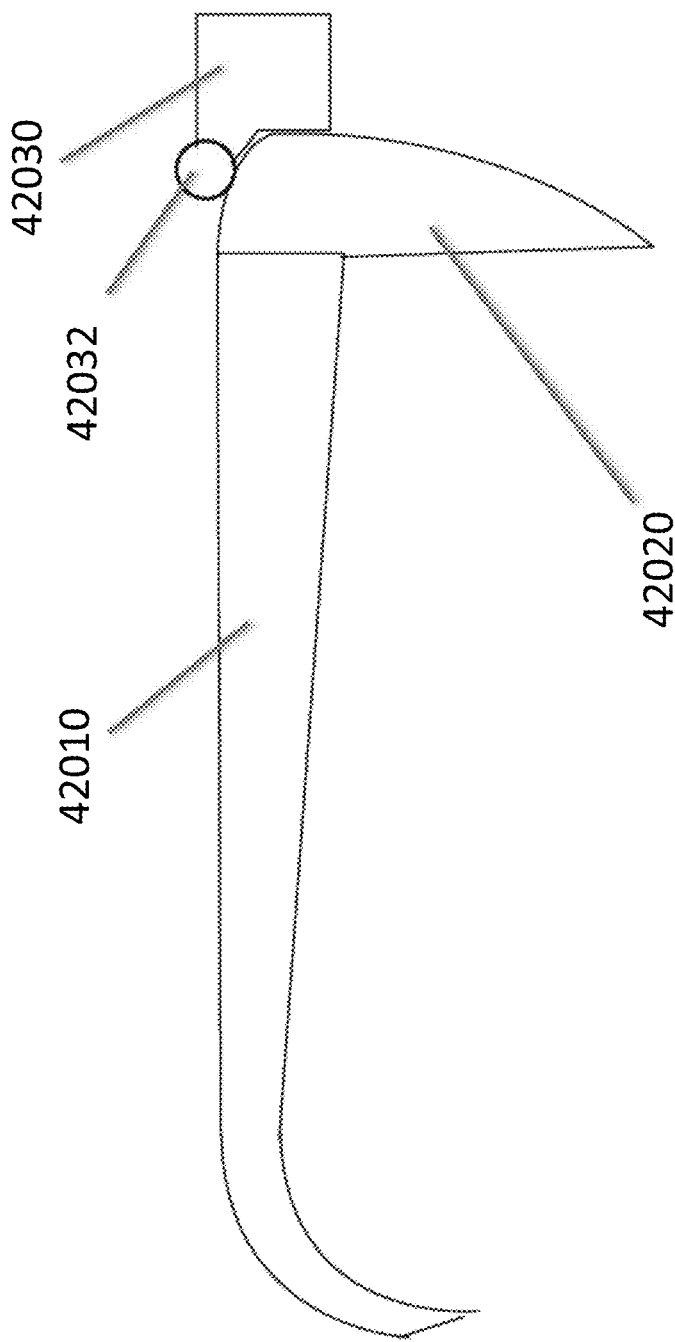
FIGS. 42 through 46 show illustrations of an example of a head-worn computer including a display system.
Figure 43:
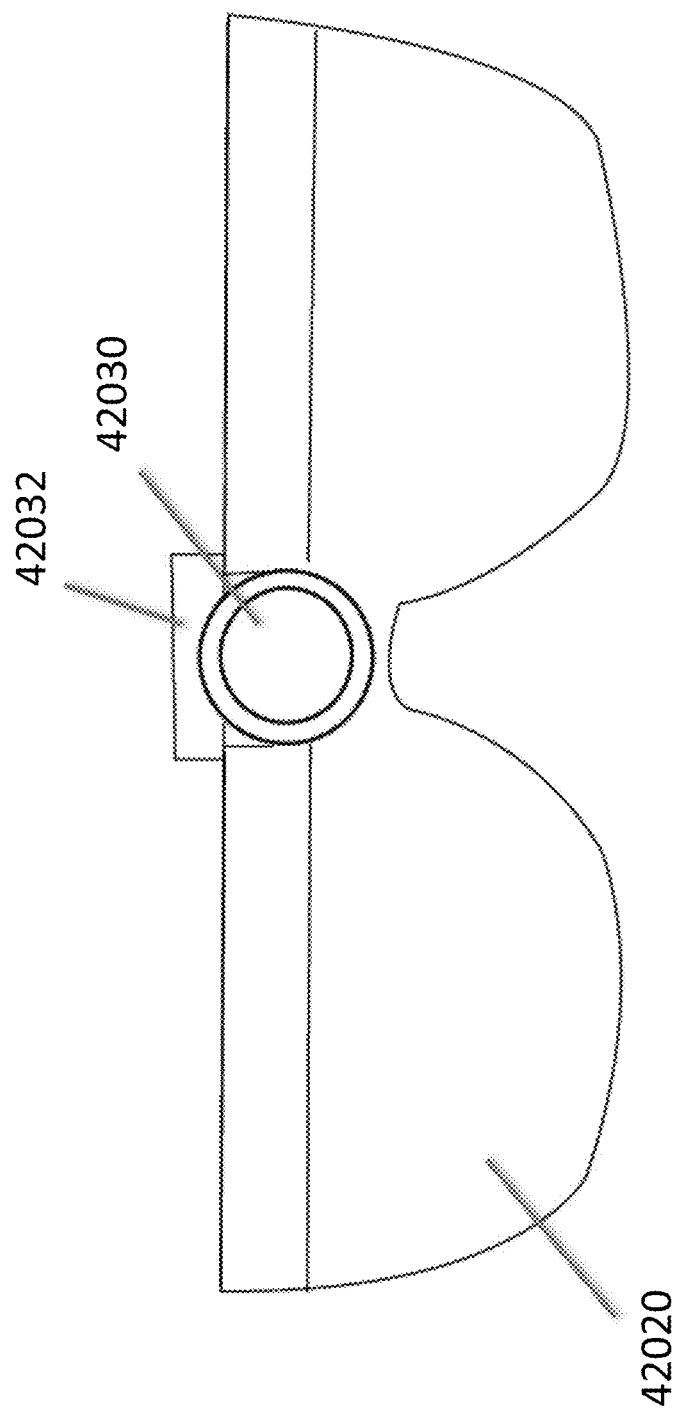
Figure 44:
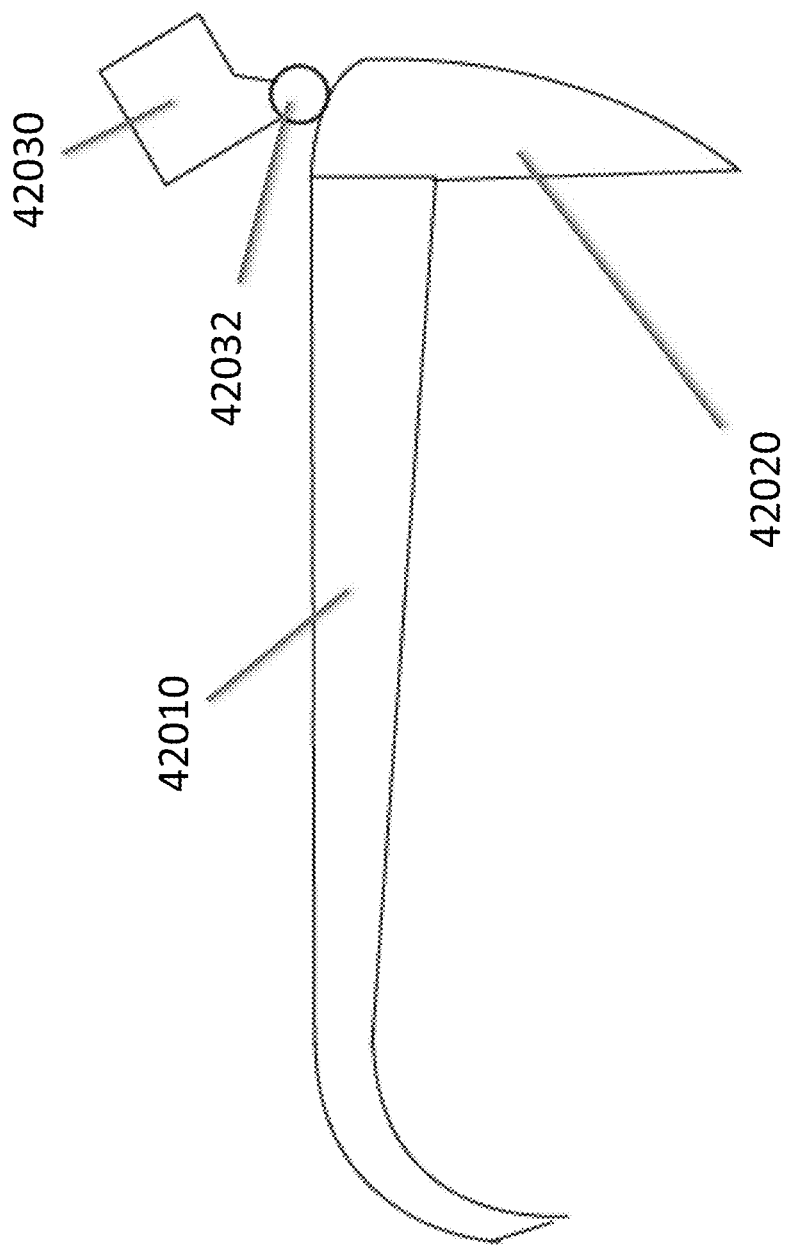
Figure 45:
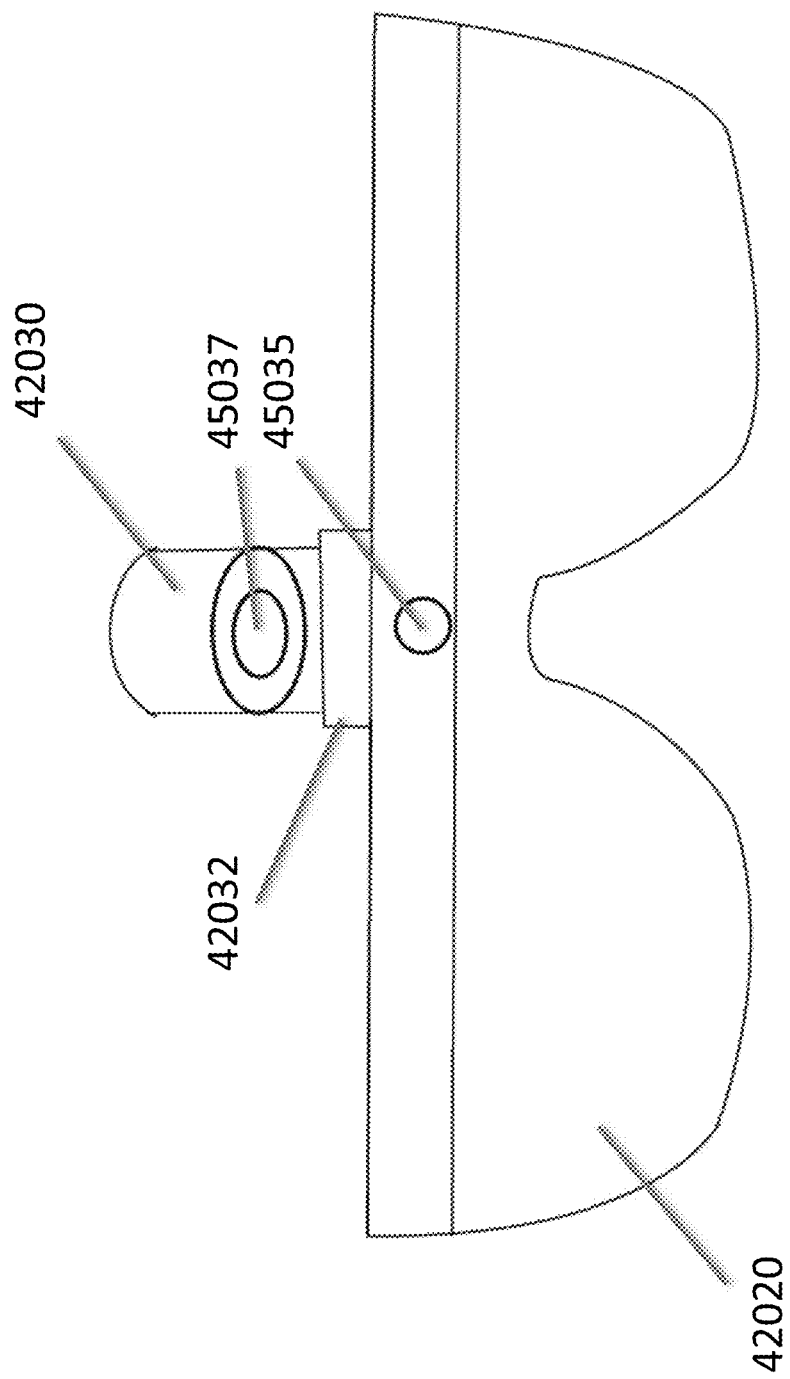

In embodiments, a removable auxiliary lens is provided for the camera on the head-worn display wherein a removable auxiliary lens is provided with a flexible mount so the auxiliary lens can be pivoted or swung out of the way. This enables the auxiliary lens to be moved in front of the camera when the user wants to be provided with a view of the surrounding environment that is different from what the camera can provide (e.g. a magnified view if the auxiliary lens is a telephoto lens) and moved to a position adjacent to the camera when the user wants to be provided with a view of the surrounding environment as provided by the camera in the head-worn display without the auxiliary lens. The flexible mount can include a pivot, a hinge or a slide to enable the auxiliary lens to be moved without being detached from the head-worn computer. FIGS. 42 through 46 show illustrations of an example of a head-worn computer including a display system 42020 that displays images and ear horns 42010 that attach the head-worn computer to the user head and position the display system 42020 in front of the user's eyes. Where the head-worn computer includes a camera 45035 with an auxillary lens 42030 that can be flipped down on a pivot 42032 to thereby position the auxiliary lens 42030 in front of the camera 45035. The auxiliary lens 42030 can be a telephoto lens or zoom lens to provide greater magnification in captured images of the environment, alternatively the auxiliary lens can be a wide angle lens such as a fish-eye lens to provide less magnification and a wider field of view in the images of the environment. FIGS. 42 and 43 show illustrations of the head-worn computer from the side and front respectively, with the auxiliary lens 42030 in the flipped down position where the auxiliary lens 42030 works in conjunction with the lens associated with the camera 45035 to enable the camera 45035 to capture images of the environment in front of the user that are different from what the camera 45035 alone can provide. FIGS. 44 and 45 show illustrations of the head-worn computer from the side and front respectively, with the auxiliary lens 42030 in the flipped up position wherein the auxiliary lens 42030 is parked so it doesn't interfere with the camera 45035 and the field of view of the smaller lens (e.g. a wide angle lens) associated with the camera 45035. By providing a flipped up position for parking the auxiliary lens 42030 and a pivot 42032 that enables easy movement of the auxiliary lens from a flipped down position for use and a flipped up position for parking, the auxiliary lens 42030 is conveniently attached to the head-worn computer and accurately aligned with the camera 45035 to provide quality images in either position. The lateral alignment of the lens surface 45037 of the auxiliary lens 42030 with the camera 45035 can be seen in FIG. 45. The alignment of lens surface 45037 to camera 45035 is such that the auxiliary lens 42030 swings on the pivot 42032 from the flipped up position to the flipped down position, the lens surface 45037 aligns in a concentric fashion with the camera 45035 so that the camera 45035 and the auxiliary lens 42030 share a common optical axis. A similar system can be provided (not shown) wherein the auxiliary lens 42030 has a sliding mount so that the auxiliary lens 42030 slides laterally from a use position to a parked position.

Figure 46:
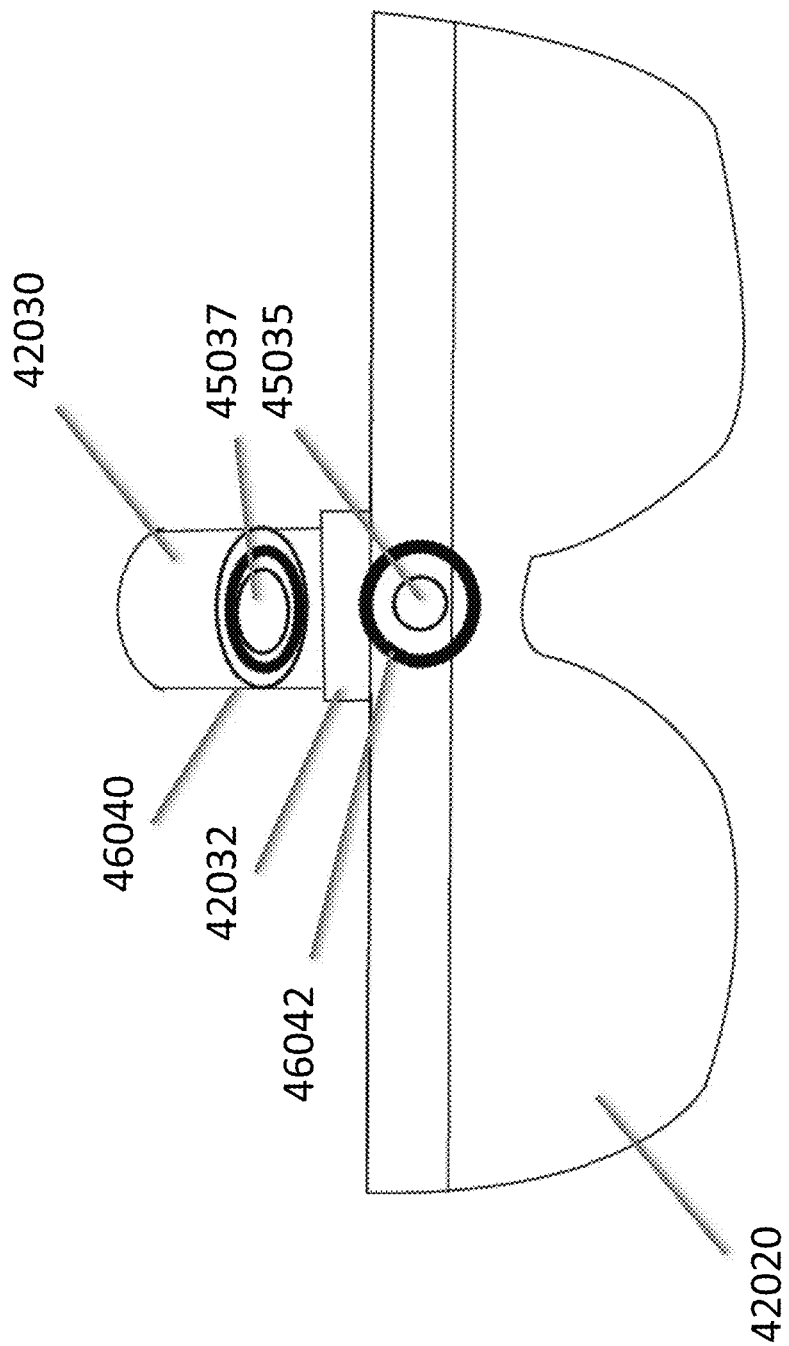

The flexible mount for the auxiliary lens can also include one or more magnetic couplers to positively and accurately position the auxiliary lens when it is positioned over the camera. Where the magnetic coupler can include a ring magnet, a tapered magnet or magnetic disks with adjacent alignment features to guide the auxiliary lens into position. The magnetic coupler can surround the rim of the auxiliary lens, so that light from the lens passes through a middle area of the magnetic coupler and the magnetic coupler then provides a more balanced force to hold the lens in place. By providing a magnetic coupler, the lens snaps into place due to the combined effects of the magnet and the alignment features. The magnetic coupler and flexible mount also allows for easy removal of the lens from in front of the camera. FIG. 46 shows an illustration of a head-worn computer with a display system 42020, an auxiliary lens 42030 on a pivot 42032 wherein a magnet 46040 is included with the auxiliary lens 42030 and a corresponding magnetic mount 46042 is provided in the frame of the display system 42020 such that when the auxiliary lens 42030 is in the flipped down position, the auxiliary lens 42030 is held in position relative to the camera 45035. The magnetic mount 46042 can include a magnetic material such as iron, or it can include a magnet with the opposite polarity of the magnet 46040 such that the magnet 46040 is attracted to the magnetic mount 46042 and the auxiliary lens 42030 is held in position relative to the camera 45035. In addition, alignment features such as interlocking tapered surfaces can be included in the magnetic mount 46042, the magnet 46040 or the faces of the auxiliary lens 42030 or the frame of the display system 42020 that is adjacent to the camera 45035.

In embodiments, the removable auxiliary lens can include a removable mount on the frame of the head-worn computer so the auxiliary lens can be attached or detached as needed. The removable mount can also include electrical connections as needed to run the auxiliary lens for cases wherein the auxiliary lens includes electronics such as for example a zoom lens motor, exposure sensors or aperture controls.

In embodiments, the auxiliary lens can be a camera system that includes a lens, an image sensor and lens controls for controlling for example zoom, exposure, autofocus and aperture. In this case, the auxiliary lens is attached to the head-worn computer with a removable mount that rigidly attaches the auxiliary lens and connects the auxiliary lens electrically to the head-worn computer. The auxiliary lens can include a variety of capabilities that enable enhanced images of the environment to be captured compared to what the camera in the head-worn computer can provide. Examples of capabilities that can be included in the auxiliary lens that are of benefit to a user with impaired vision include: an image sensor with larger pixels or a lens with a lower f # or larger aperture to provide enhanced images in low light conditions; an image sensor that includes wide spectrum pixels such as monochrome pixels or pixels that are sensitive to visible and infrared light to capture an image using a broader spectrum of available light.

Another aspect of the present disclosure relates to a miniature radar system (such as the TRX 120G available from Silicon Radar, Frankfurt Germany) mounted into the frame of the head-worn computer that can be used to measure the distance to objects adjacent to the head-worn computer within an angular field in front of the user. The measured distance information can then be used to provide feedback cues to the user, such as for example, enhanced images, audio information or haptic feedback related to the measured distance to the objects within the angular field. Then as the user moves his head from side to side, the measured distance information will change as different objects in the environment move in and out of the angular field. The user is then provided with feedback cues that communicate the distance to objects in a certain direction. By making the angular field of the radar relatively narrow (e.g. 40 degrees or less), the user is provided with a more accurate location of objects in the adjacent environment. The angular field of the radar can be reduced by adding lenses, waveguides and masks to the radar transmitter. By making the angular field narrow in both the vertical and horizontal directions, the user can be provided with feedback cues that relate the distance to objects as he moves his head from side to side and up and down to further improve the accuracy of the location and shape of objects in the adjacent environment. This is useful for visually impaired persons or people that can't see for any reason such as if the environment is dark, or the environment is hazy due to smoke, dust, fog, snow or sandstorm, as the user is navigating through the environment. In embodiments, the radar distance measurements may be combined with simultaneously gathered data related to the direction the user is looking (e.g. sight heading, compass heading and head tilt) so that a distance map or distance image can be generated by the head-worn computer. Wherein for example, objects that are located at a larger distance are shown with a different color than objects located at a shorter distance. In embodiments the radar system and a visible light sensor system (e.g. camera) operate in tandem within the head-worn computer to provide a combined image of the environment proximate the head-worn computer that shows objects along with the distance to the objects. In embodiments, the radar and visible light sensor system may operate at the same time or at different times, depending on the environmental conditions. For example, in a low light environment, the radar may provide distance measurements to objects in the environment and provide distance images in the augmented reality display to provide a user with visual indications of the locations of the objects with respect to himself. There may also be situations when the visible light sensor system can image the environment, but the radar imagery is used to augment the visible light images. In embodiments, the user may be blind (e.g. personally impaired or environmentally impaired) and the head-worn computer may not need displays, but rather the radar imagery or visible light sensor imagery may be interpreted and converted into audio commands or haptic feedback. For example, audio commands or haptic feedback which may include indications of the distance to surrounding objects and provide navigation commands or information. This can assist a blind person in walking through indoor and outdoor environments in any lighting condition. In embodiments, the radar or visual light imagery may be interpreted along with a prediction of a walking direction of a person wearing the head-worn computer such that audio commands or haptic feedback can be generated to assist the person in navigating the environment. For example, the haptic feedback can be vibration wherein the intensity of the vibration is in correspondence to the distance to an object directly in front of the user.

In embodiments, two radar devices can be mounted into the corners of the head-worn computer pointing in diverging directions so that the angular fields of measurement associated with the two radar devices only partially overlap with one another. In this way, the distance measurement information for a given adjacent object will be different for each of the two radar devices unless the user is facing so that the object is directly in front of the user. The image, audio or haptic feedback associated with the two radar devices can then be used by the user to determine when an object at a given distance is located directly in front of the user. The user can then move his head to survey the adjacent environment for objects at a given distance away.

While many of the embodiments herein describe see-through computer displays, the scope of the disclosure is not limited to see-through computer displays. In embodiments, the head-worn computer may have a display that is not see-through. For example, the head-worn computer may have a sensor system (e.g. camera, ultrasonic system, radar, etc.) that images the environment proximate the head-worn computer and then presents the images to the user such that the user can understand the local environment through the images as opposed to seeing the environment directly. In embodiments, the local environment images may be augmented with additional information and content such that an augmented image of the environment is presented to the user. In general, in this disclosure, such see-through and non-see through systems may be referred to as head-worn augmented reality systems, augmented reality displays, augmented reality computer displays, etc.

Although embodiments of HWC have been described in language specific to features, systems, computer processes and/or methods, the appended claims are not necessarily limited to the specific features, systems, computer processes and/or methods described. Rather, the specific features, systems, computer processes and/or and methods are disclosed as non-limited example implementations of HWC. All documents referenced herein are hereby incorporated by reference.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, all the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, stand-alone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

We claim:

1. A head-worn computer including a processor, comprising:
a sensor system comprising a camera, the sensor system adapted to detect a gesture comprising a user touching a document at a first region of the document; and
an augmented reality display, wherein:
the camera is adapted to capture an image of the document in response to the sensor system detecting the gesture; and the processor is adapted to enhance a portion of the captured image corresponding to the first region of the document and to present the enhanced portion of the captured image via the augmented reality display concurrent with presenting, via the augmented reality display, a second region of the document different from the first region.

2. The head-worn computer of claim 1, wherein enhancing a portion of the captured image comprises applying a digital zoom to the portion of the captured image.

3. The head-worn computer of claim 1, wherein the camera includes a telephoto lens and the captured image is captured via the telephone lens, and wherein enhancing a portion of the captured image comprises cropping the captured image.

4. The head-worn computer of claim 1, wherein the camera is further adapted to capture the image of the document via a lens using optical image stabilization.

5. A method comprising:
presenting, to a user of a wearable device via a transmissive display of the wearable device, a first view including a view of a first region of a document and a view of a second region of the document, the second region different from the first region;
detecting, via one or more sensors of the wearable device, an identification of the first region by the user;
capturing an image of the view of the first region;
enhancing a visibility of the image to produce an enhanced image of the first region;
presenting, to the user via the transmissive display, a second view including the enhanced image of the first region and the view of the second region.

6. The method of claim 5, wherein the identification of the first region comprises the user touching the document at the first region.

7. The method of claim 5, wherein enhancing the visibility of the image comprises magnifying the first view of the first region.

8. The method of claim 5, wherein the wearable device comprises a camera, and capturing the image comprises capturing the image via the camera.

9. The method of claim 5, wherein the wearable device further comprises a telephoto lens and enhancing the visibility of the image comprises magnifying the image via the telephoto lens.

10. The method of claim 5, wherein the enhanced image is associated with a first focal length and the view of the second region is associated with a second focal length different from the first focal length.

11. The method of claim 5, wherein presenting the second view comprises presenting the enhanced image overlapping the view of the second region.

12. The method of claim 5, wherein the image is captured using a lens and enhancing the visibility of the image comprises applying optical stabilization to the lens.

13. The method of claim 5, wherein presenting the second view comprises presenting the enhanced image in the center of the second view and maintaining the presentation of the enhanced image in the center of the second view.

14. The method of claim 5, wherein the enhanced image is associated with a first field of view and the view of the second region is associated with a second field of view different from the first field of view.

15. The method of claim 5, further comprising detecting text in the image, wherein enhancing the visibility of the image comprises enhancing the readability of the text.

16. The method of claim 15, further comprising presenting, to the user via a speaker of the wearable device, speech corresponding to the text.

17. The method of claim 5, wherein enhancing the visibility of the image comprises adjusting at least one of a contrast, a brightness, a sharpness, or a saturation of the image.

18. A wearable device comprising:
a transmissive display;
one or more sensors, the one or more sensors comprising a camera; and
one or more processors configured to perform:
presenting, to a user of the wearable device via the transmissive display, a first view including a view of a first region of a document and a view of a second region of the document, the second region different from the first region;
detecting, via the one or more sensors, an identification of the first region by the user;
capturing, via the camera, an image of the view of the first region;
enhancing a visibility of the image to produce an enhanced image of the first region; and
presenting, to the user via the transmissive display, a second view including the enhanced image of the first region and the view of the second region.

19. The wearable device of claim 18, wherein the identification of the first region comprises the user touching the document at the first region.

20. The wearable device of claim 18, wherein:
the wearable device further comprises a speaker;
the one or more processors are further configured to perform:
detecting text in the image; and
presenting, to the user via the speaker, speech corresponding to the text.

21. A non-transitory computer-readable storage medium storing instructions that, when executed, perform the following operations:
presenting, to a user of a wearable device via a transmissive display of the wearable device, a first view including a view of a first region of a document and a view of a second region of the document, the second region different from the first region;
detecting, via one or more sensors of the wearable device, an identification of the first region by the user;
capturing an image of the view of the first region;
enhancing a visibility of the image to produce an enhanced image of the first region;
presenting, to the user via the transmissive display, a second view including the enhanced image of the first region and the view of the second region.

22. The non-transitory computer-readable storage medium of claim 21, wherein the identification of the first region comprises the user touching the document at the first region.

* * * * *